US012640154B2

(12) United States Patent
Gao et al.

(10) Patent No.: US 12,640,154 B2
(45) Date of Patent: May 26, 2026

(54) STYLIZING TEXT-TO-SPEECH (TTS) VOICE RESPONSE FOR ASSISTANT SYSTEMS

(71) Applicant: Meta Platforms Technologies, LLC, Menlo Park, CA (US)

(72) Inventors: Yang Gao, Menlo Park, CA (US); Weiyi Zheng, Mountain View, CA (US); Zhaojun Yang, Bellevue, WA (US); Thilo Wolfgang Koehler, Mountain View, CA (US); Christian Fuegen, Sunnyvale, CA (US); Qing He, Sunnyvale, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/069,884

(22) Filed: Dec. 21, 2022

(65) Prior Publication Data

US 2023/0118412 A1 Apr. 20, 2023

Related U.S. Application Data

(63) Continuation of application No. 16/790,497, filed on Feb. 13, 2020, now Pat. No. 11,562,744.

(51) Int. Cl.
*G10L 15/02* (2006.01)
*G10L 15/22* (2006.01)
*G10L 15/26* (2006.01)
(52) U.S. Cl.
CPC .............. *G10L 15/26* (2013.01); *G10L 15/02* (2013.01); *G10L 15/22* (2013.01); *G10L 2015/025* (2013.01)
(58) Field of Classification Search
CPC ......... G10L 15/02; G10L 15/22; G10L 15/26; G10L 2015/025
See application file for complete search history.

(56) References Cited

U.S. PATENT DOCUMENTS 7,024,348 B1 4/2006 Scholz et al.
7,124,123 B1 10/2006 Roskind et al.
(Continued)

FOREIGN PATENT DOCUMENTS

AU 2017203668 A1 1/2018
CN 111028827 A * 4/2020 ............. G10L 15/26
(Continued)

OTHER PUBLICATIONS

Tachibana, Makoto, et al. "Speech synthesis with various emotional expressions and speaking styles by style interpolation and morphing." IEICE transactions on information and systems 88.11 (2005): 2484-2491. (Year: 2005).*
(Continued)

*Primary Examiner* — Jesse S Pullias
*Assistant Examiner* — Oluwadamilola M Ogunbiyi
(74) *Attorney, Agent, or Firm* — Morgan, Lewis & Bockius LLP

(57) ABSTRACT

In one embodiment, a method includes receiving a voice input having first audio features at a client system, generating a text response corresponding to the voice input, wherein the text response is associated with style features, generating an output audio waveform of the text response by a text-to-speech model on the client system, wherein the output audio waveform is generated based on the first audio features and the style features, wherein the output audio waveform comprises second audio features, and rendering the output audio waveform at the client system in response to the voice input.

20 Claims, 13 Drawing Sheets

800

810 Receive voice input from user

820 Determine a first style of the voice input based on one or more first features extracted from the voice input 830 Select a second style having one or more second features for a voice response based on the first style 840 Generate the voice response based on one or more of the second features of the second cyle 850 Provide the voice response in response to the voice input

(56) References Cited

U.S. PATENT DOCUMENTS

| | | | |
|---|---|---|---|
| 7,158,678 | B2 | 1/2007 | Nagel et al. |
| 7,397,912 | B2 | 7/2008 | Aasman et al. |
| 7,415,413 | B2 | 8/2008 | Eide et al. |
| 8,027,451 | B2 | 9/2011 | Arendsen et al. |
| 8,560,564 | B1 | 10/2013 | Hoelzle et al. |
| 8,677,377 | B2 | 3/2014 | Cheyer et al. |
| 8,935,192 | B1 | 1/2015 | Ventilla et al. |
| 8,983,383 | B1 | 3/2015 | Haskin |
| 9,154,739 | B1 | 10/2015 | Nicolaou et al. |
| 9,299,059 | B1 | 3/2016 | Marra et al. |
| 9,304,736 | B1 | 4/2016 | Whiteley et al. |
| 9,338,242 | B1 | 5/2016 | Suchland et al. |
| 9,338,493 | B2 | 5/2016 | Van Os et al. |
| 9,390,724 | B2 | 7/2016 | List |
| 9,418,658 | B1 | 8/2016 | David et al. |
| 9,472,206 | B2 | 10/2016 | Ady |
| 9,479,931 | B2 | 10/2016 | Ortiz, Jr. et al. |
| 9,576,574 | B2 | 2/2017 | Van Os |
| 9,659,577 | B1 | 5/2017 | Langhammer |
| 9,747,895 | B1 | 8/2017 | Jansche et al. |
| 9,792,281 | B2 | 10/2017 | Sarikaya |
| 9,830,924 | B1 * | 11/2017 | Degges, Jr. ............. G10L 15/22 |
| 9,858,925 | B2 | 1/2018 | Gruber et al. |
| 9,865,260 | B1 | 1/2018 | Vuskovic et al. |
| 9,875,233 | B1 | 1/2018 | Tomkins et al. |
| 9,875,741 | B2 | 1/2018 | Gelfenbeyn et al. |
| 9,886,953 | B2 | 2/2018 | Lemay et al. |
| 9,990,591 | B2 | 6/2018 | Gelfenbeyn et al. |
| 10,042,032 | B2 | 8/2018 | Scott et al. |
| 10,134,395 | B2 | 11/2018 | Typrin |
| 10,199,051 | B2 | 2/2019 | Binder et al. |
| 10,241,752 | B2 | 3/2019 | Lemay et al. |
| 10,276,170 | B2 | 4/2019 | Gruber et al. |
| 10,382,866 | B2 * | 8/2019 | Min ......................... H04R 3/12 |
| 10,706,837 | B1 | 7/2020 | Chicote et al. |
| 10,891,947 | B1 * | 1/2021 | Le Chevalier .......... G06F 3/167 |
| 2002/0184030 | A1 * | 12/2002 | Brittan .................... G10L 13/08 |
| | | | 704/E13.011 |
| 2002/0184031 | A1 * | 12/2002 | Brittan .................... G10L 13/00 |
| | | | 704/E15.04 |
| 2005/0141997 | A1 | 6/2005 | Rast |
| 2005/0169440 | A1 | 8/2005 | Agapi et al. |
| 2007/0112570 | A1 | 5/2007 | Kaneyasu |
| 2008/0240379 | A1 | 10/2008 | Maislos et al. |
| 2010/0161327 | A1 * | 6/2010 | Chandra ............. G10L 15/1807 |
| | | | 704/235 |
| 2012/0246191 | A1 | 9/2012 | Xiong |
| 2012/0265528 | A1 | 10/2012 | Gruber et al. |
| 2013/0185066 | A1 * | 7/2013 | Tzirkel-Hancock ......................... |
| | | | G10L 21/003 |
| | | | 381/71.4 |
| 2013/0268839 | A1 | 10/2013 | Lefebvre et al. |
| 2013/0275138 | A1 | 10/2013 | Gruber et al. |
| 2013/0275164 | A1 | 10/2013 | Gruber et al. |
| 2014/0052446 | A1 | 2/2014 | Mori et al. |
| 2014/0164506 | A1 | 6/2014 | Tesch et al. |
| 2015/0179168 | A1 | 6/2015 | Hakkani-Tur et al. |
| 2015/0186359 | A1 * | 7/2015 | Fructuoso ............... G10L 25/30 |
| | | | 704/8 |
| 2016/0092160 | A1 | 3/2016 | Graff et al. |
| 2016/0093289 | A1 | 3/2016 | Pollet |
| 2016/0225370 | A1 | 8/2016 | Kannan et al. |
| 2016/0255082 | A1 | 9/2016 | Rathod |
| 2016/0328096 | A1 | 11/2016 | Tran et al. |
| 2016/0343368 | A1 | 11/2016 | Yassa et al. |
| 2016/0378849 | A1 | 12/2016 | Myslinski |
| 2016/0378861 | A1 | 12/2016 | Eledath et al. |
| 2017/0091168 | A1 | 3/2017 | Bellegarda et al. |
| 2017/0132019 | A1 | 5/2017 | Karashchuk et al. |
| 2017/0353469 | A1 | 12/2017 | Selekman et al. |
| 2017/0359707 | A1 | 12/2017 | Diaconu et al. |
| 2017/0365277 | A1 * | 12/2017 | Park .................... G10L 15/1815 |

| | | | |
|---|---|---|---|
| 2018/0018562 | A1 | 1/2018 | Jung |
| 2018/0018987 | A1 | 1/2018 | Zass |
| 2018/0061400 | A1 | 3/2018 | Carbune et al. |
| 2018/0096071 | A1 | 4/2018 | Green |
| 2018/0096072 | A1 | 4/2018 | He et al. |
| 2018/0107917 | A1 | 4/2018 | Hewavitharana et al. |
| 2018/0122372 | A1 * | 5/2018 | Wanderlust ............. G10L 15/22 |
| 2018/0144761 | A1 * | 5/2018 | Amini .................... G06V 20/40 |
| 2018/0184203 | A1 * | 6/2018 | Piechowiak ......... H04R 25/554 |
| 2018/0189629 | A1 | 7/2018 | Yatziv et al. |
| 2018/0254034 | A1 | 9/2018 | Li |
| 2018/0277145 | A1 * | 9/2018 | Yamaya .................. G10L 25/63 |
| 2019/0005021 | A1 | 1/2019 | Miller et al. |
| 2019/0080698 | A1 | 3/2019 | Miller |
| 2019/0147849 | A1 | 5/2019 | Talwar et al. |
| 2019/0172443 | A1 * | 6/2019 | Shechtman ........... G10L 13/047 |
| 2019/0172454 | A1 * | 6/2019 | Kitajima ................. G06F 3/167 |
| 2019/0279629 | A1 * | 9/2019 | Okamoto .............. G06V 20/59 |
| 2019/0287512 | A1 * | 9/2019 | Zoller ................... G10L 13/027 |
| 2019/0295533 | A1 * | 9/2019 | Wang ..................... G10L 15/22 |
| 2019/0311718 | A1 * | 10/2019 | Huber ................... G10L 15/22 |
| 2019/0348020 | A1 | 11/2019 | Clark et al. |
| 2019/0355354 | A1 * | 11/2019 | Geng ...................... G10L 15/22 |
| 2019/0392851 | A1 * | 12/2019 | Kim ........................ G06F 3/165 |
| 2020/0005763 | A1 * | 1/2020 | Chae ..................... G10L 13/047 |
| 2020/0005764 | A1 | 1/2020 | Chae |
| 2020/0041803 | A1 * | 2/2020 | Reyes ................... G06V 40/10 |
| 2020/0066251 | A1 | 2/2020 | Kumano et al. |
| 2020/0075036 | A1 * | 3/2020 | Shin ........................ G10L 25/78 |
| 2020/0098358 | A1 * | 3/2020 | Rakshit ................. G06F 16/243 |
| 2020/0152194 | A1 * | 5/2020 | Jeong ..................... G10L 13/08 |
| 2020/0152197 | A1 * | 5/2020 | Penilla .................. H04L 67/125 |
| 2020/0160833 | A1 * | 5/2020 | Nakagawa ................ G06F 3/16 |
| 2020/0184967 | A1 | 6/2020 | Gupta et al. |
| 2020/0233958 | A1 | 7/2020 | Yao et al. |
| 2020/0234693 | A1 * | 7/2020 | Sung ...................... G10L 15/22 |
| 2020/0294502 | A1 | 9/2020 | Kurihara et al. |
| 2020/0302927 | A1 | 9/2020 | Andruszkiewicz et al. |
| 2020/0302946 | A1 * | 9/2020 | Jhawar ................. H04R 1/1083 |
| 2020/0314577 | A1 * | 10/2020 | Asfaw .................... H04R 3/005 |
| 2020/0342852 | A1 | 10/2020 | Kim et al. |
| 2020/0402497 | A1 | 12/2020 | Semenov et al. |
| 2021/0035551 | A1 | 2/2021 | Stanton et al. |
| 2021/0049996 | A1 | 2/2021 | Chae |
| 2021/0049997 | A1 * | 2/2021 | Yun ........................ G10L 25/48 |
| 2021/0056972 | A1 * | 2/2021 | Dube ...................... G10L 15/26 |
| 2021/0074261 | A1 | 3/2021 | Yang et al. |
| 2021/0082304 | A1 * | 3/2021 | Daley .................... G06V 40/20 |
| 2021/0082427 | A1 * | 3/2021 | Fujita ..................... G10L 15/08 |
| 2021/0090551 | A1 | 3/2021 | Jang et al. |
| 2021/0104220 | A1 * | 4/2021 | Mennicken ............. G06F 3/165 |
| 2021/0117553 | A1 | 4/2021 | Shpurov et al. |
| 2021/0117712 | A1 | 4/2021 | Huang et al. |
| 2021/0125610 | A1 * | 4/2021 | Cheung .............. G06F 16/9535 |
| 2021/0142796 | A1 | 5/2021 | Saito |
| 2021/0151029 | A1 | 5/2021 | Gururani et al. |
| 2021/0192332 | A1 * | 6/2021 | Gangotri ............. G06N 3/0895 |
| 2021/0225357 | A1 | 7/2021 | Zhao et al. |
| 2021/0329389 | A1 * | 10/2021 | Pandey ................. G06F 3/162 |
| 2022/0215184 | A1 * | 7/2022 | Freitag ................. G06F 40/226 |
| 2022/0229524 | A1 | 7/2022 | Mckenzie et al. |

FOREIGN PATENT DOCUMENTS

| | | | | | |
|---|---|---|---|---|---|
| EP | | 2530870 | A1 | 12/2012 | |
| EP | | 3122001 | A1 | 1/2017 | |
| JP | | 2003271194 | A | 9/2003 | |
| RU | | 2338248 | C1 | 11/2008 | |
| WO | WO-2011055830 | A1 * | 5/2011 | ......... G10L 21/0208 |
| WO | | 2012116241 | A2 | 8/2012 | |
| WO | | 2016195739 | A1 | 12/2016 | |
| WO | | 2017053208 | A1 | 3/2017 | |
| WO | | 2017116488 | A1 | 7/2017 | |
| WO | WO-2020143652 | A1 * | 7/2020 | ............ G10L 15/02 |

(56)                  References Cited

FOREIGN PATENT DOCUMENTS

WO      WO-2020230926 A1 *  11/2020    ............... G06N 3/08
WO          2021003810 A1     1/2021

OTHER PUBLICATIONS

Vaswani A., et al., "Attention Is All You Need," Advances in Neural Information Processing Systems, December (NIPS), Dec. 4, 2017, pp. 5998-6008.

Vries H.D., et al., "Talk The Walk: Navigating New York City Through Grounded Dialogue," arXiv prepnnt arXiv: 1807.03367, Dec. 23, 2018, 23 Pages.

Wang P., et al., "FVQA: Fact-Based Visual Question Answering," IEEE Transactions on Pattern Analysis and Machine Intelligence, Aug. 8, 2017, pp. 2413-2427.

Wang Y., et al., "Style Tokens: Unsupervised Style Modeling, Control and Transfer in End-to-End Speech Synthesis," ICML 2018, Mar. 23, 2018, 11 Pages.

Wang Y., et al., "Uncovering Latent Style Factors for Expressive Speech Synthesis," arXiv pre print arXiv: 1711.00520, Nov. 1, 2017, 5 Pages.

Wang Z., et al., "Knowledge Graph Embedding by Translating on Hyperplanes," 28th AAAI Conference on Artificial Intelligence, Jun. 21, 2014, 8 Pages.

Wei W., et al., "Airdialogue: An Environment for Goal-Oriented Dialogue Research," Proceedings of the 2018 Conference on Empirical Methods in Natural Language Processing, Nov. 4, 2018, 11 Pages.

Welbl J., et al., "Constructing Datasets for Multi-Hop Reading Comprehension Across Documents," Transactions of the Association for Computational Linguistics, Jun. 11, 2018, vol. 6, pp. 287-302.

Weston J., et al., "Memory Networks," arXiv preprint arXiv: 1410.3916, Nov. 29, 2015, 15 Pages.

"What is Conversational AI?," Glia Blog [Online], Sep. 13, 2017 [Retrieved on Jun. 14, 2019], 3 Pages, Retrieved from Internet: URL: https://blog.salemove.com/what-is-conversational-ai/.

Wikipedia, "Dialog Manager," Dec. 16, 2006-Mar. 13, 2018 [Retrieved on Jun. 14, 2019], 8 Pages, Retrieved from Internet: https://en.wikipedia.org/wiki/Dialog_manager.

Wikipedia, "Natural-Language Understanding," Nov. 11, 2018-Apr. 3, 2019 [Retrieved on Jun. 14, 2019], 5 Pages, Retrieved from Internet: URL: https://en.wikipedia.org/wiki/Natural-language_understanding.

Wikipedia, "Speech Synthesis," Jan. 24, 2004-Jun. 5, 2019 [Retrieved on Jun. 14, 2019], 19 Pages, Retrieved from Internet: URL: https://en.wikipedia.org/wiki/Speech_synthesis.

Wikipedia, "Question Answering," Feb. 15, 2018 [Retrieved on Jun. 14, 2019], 6 Pages, Retrieved from Internet: URL: https://en.wikipedia.org/wiki/Question_answering.

Williams J.D., et al., "Hybrid Code Networks: Practical and Efficient End-to-End Dialog Control with Supervised and Reinforcement Learning," arXiv preprint arXiv: 1702.03274, Apr. 24, 2017, 13 Pages.

Wu Q., et al., "Image Captioning and Visual Question Answering Based on Attributes and External Knowledge," IEEE Transactions on Pattern Analysis and Machine Intelligence, Dec. 16, 2016, vol. 40 (6), 14 Pages.

Xu K., et al., "Question Answering on Freebase via Relation Extraction and Textual Evidence," Proceedings of the 54th Annual Meeting of the Association for Computational Linguistics, Jun. 9, 2016, 11 Pages.

Yamagishi J., et al., "Modeling of Various Speaking Styles and Emotions for HMM-based Speech Synthesis," 8th European Conference on Speech Communication and Technology, Jan. 2003, 4 pages.

Yamagishi J., et al., "Speaking Style Adaptation using Context Clustering Decision Tree for HMM-based Speech Synthesis," 2004 IEEE International Conference on Acoustics, Speech, and Signal Processing, May 17, 2004, vol. 1, 4 Pages.

Yang Z., et al., "Hierarchical Attention Networks for Document Classification," Proceedings of the 2016 Conference of the North American Chapter of the Association for Computational Linguistics, Jun. 12-17, 2016, 10 Pages.

Yang Z., et al., "HOTPOTQA: A Dataset for Diverse, Explainable Multi-Hop Question Answering," Proceedings of the 2018 Conference on Empirical Methods in Natural Language Processing, Sep. 25, 2018, 12 Pages.

Yin W., et al., "Simple Question Answering by Attentive Convolutional Neural Network," arXiv preprint arXiv: 1606.03391, Oct. 11, 2016, 11 Pages.

Yoon S., et al., "Multimodal Speech Emotion Recognition Using Audio and Text," 2018 IEEE Spoken Language Technology Workshop (SET), Dec. 18, 2018, 7 Pages.

Young T., et al., "Augmenting End-to-End Dialogue Systems with Commonsense Knowledge," The Thirty-Second AAAI Conference on Artificial Intelligence, Apr. 26, 2018, 8 Pages.

Zhang S., et al., "Personalizing Dialogue Agents: I Have a Dog, Do You Have Pets Too?," Facebook AI Research, Sep. 25, 2018, 16 Pages.

Jiang L., et al., "MemexQA: Visual Memex Question Answering," arXiv preprint arXiv: 1708.01336, Aug. 4, 2017, 10 Pages.

Jung H., et al., "Learning What to Remember: Long-term Episodic Memory Networks for Learning from Streaming Data," arXiv preprint arXiv: 1812.04227, Dec. 11, 2018, 10 Pages.

Kartsaklis D., et al., "Mapping Text to Knowledge Graph Entities using Multi-Sense LSTMs," Department of Theoretical and Applied Linguistics, Aug. 23, 2018, 12 Pages.

King S., "The Blizzard Challenge 2017," In Proceedings Blizzard Challenge, Aug. 2017, pp. 1-17.

Kottur S., et al., "Visual Coreference Resolution in Visual Dialog using Neural Module Networks," In Proceedings of the European Conference on Computer Vision (ECCV), Sep. 6, 2018, pp. 153-169.

Kumar A., et al., "Ask Me Anything: Dynamic Memory Networks for Natural Language Processing," International Conference on Machine Learning, Jan. 6, 2016, 10 Pages.

Lao N., et al., "Random Walk Inference and Learning in a Large Scale Knowledge Base," Proceedings of the Conference on Empirical Methods in Natural Language Processing Association for Computational Linguistics, Jul. 27, 2011, 11 Pages.

Lee C.C., et al., "Emotion Recognition using a Hierarchical Binary Decision Tree Approach," Speech Communication, Nov. 1, 2011, vol. 53, pp. 1162-1171.

Li J., et al., "A Persona-based Neural Conversation Model," arXiv preprint arXiv: 1603.06155, Jun. 8, 2016, 10 Pages.

Li Y., et al., "Adaptive Batch Normalization for Practical Domain Adaptation," Pattern Recognition, Aug. 2018, vol. 80, pp. 109-117.

Locatello F., et al., "Challenging Common Assumptions in the Unsupervised Learning of Disentangled Representations," ICLR 2019, Nov. 29, 2018, 37 Pages.

Long Y., et al., "A Knowledge Enhanced Generative Conversational Service Agent," DSTC6 Workshop, Dec. 2017, 6 Pages.

Mccross T., "Dialog Management," Feb. 15, 2018 [Retrieved on Jun. 14, 2019], 12 Pages, Retrieved from Internet: https://tutorials.botsfloor.com/dialog-management-799c20a39aad.

Miller A.H., et al., "PARLAI: A Dialog Research Software Platform," Facebook AI Research, May 18, 2017, 7 Pages.

Moon S., et al., "Completely Heterogeneous Transfer Learning with Attention—What and What Not to Transfer," Proceedings of the Twenty-Sixth International Joint Conference on Artificial Intelligence, IJCAI, Aug. 19, 2017, 7 Pages.

Moon S., et al., "Multimodal Named Entity Recognition for Short Social Media Posts," Feb. 2018, 9 Pages.

Moon S., et al., "Multimodal Transfer Deep Learning with Applications in Audio-Visual Recognition," Dec. 9, 2014, 6 Pages.

Moon S., et al., "Zeroshot Multimodal Named Entity Disambiguation for Noisy Social Media Posts," Proceedings of the 56th Annual Meeting of the Association for Computational Linguistics, Jul. 15-20, 2018, vol. 1, 9 Pages.

(56) References Cited

OTHER PUBLICATIONS

Mower E., et al., "A Framework for Automatic Human Emotion Classification using Emotion Profiles," IEEE Transactions on Audio, Speech and Language Processing, Jul. 2011, vol. 19.5, pp. 1057-1070.

Nickel M., et al., "Holographic Embeddings of Knowledge Graphs," Proceedings of Thirtieth AAAI Conference on Artificial Intelligence, Mar. 2, 2016, 7 Pages.

Oord A.V.D., et al., "WaveNet: A Generative Model for Raw Audio," arXiv preprint, arXiv: 1609.03499, Sep. 19, 2016, pp. 1-15.

Ostendorf M., et al., "Human Language Technology: Opportunities and Challenges," IEEE International Conference on Acoustics Speech and Signal Processing, Mar. 23, 2005, 5 Pages.

Ott M., et al., "New Advances in Natural Language Processing to Better Connect People," [online], Aug. 14, 2019, 12 Pages, Retrieved from the Internet: URL: https://ai.facebook.com/blog/new-advances-in-natural-language-processing-to-better-connect-people/.

"Overview of Language Technology," Feb. 15, 2018, 1 Page, Retrieved from Internet: URL: https://www.dfki.de/lt/lt-general.php.

Parthasarathi P., et al., "Extending Neural Generative Conversational Model using External Knowledge Sources," Computational and Language, Sep. 14, 2018, 6 Pages.

Pennington J., et al., "GLOVE: Global Vectors for Word Representation," Proceedings of the 2014 Conference on Empirical Methods in Natural Language Processing (EMNLP), Oct. 24-29, 2014, 12 Pages.

Poliak A., et al., "Efficient, Compositional, Order-Sensitive n-gram Embeddings," Proceedings of the 15th Conference of the European Chapter of the Association for Computational Linguistics, Apr. 3-7, 2017, vol. 2, pp. 503-508.

Rajpurkar P., et al., "Know What You Don't Know: Unanswerable Questions for SQuAD," arXiv preprint arXiv: 1806.03822, Jun. 11, 2018, 9 Pages.

Rajpurkar P., et al., "SQuAD: 100,000+ Questions for Machine Comprehension of Text," arXiv preprint arXiv: 1606.05250, Oct. 11, 2016, 10 Pages.

Reddy S., et al., "COQA: A Conversational Question Answering Challenge," Transactions of the Association for Computational Linguistics, May 29, 2019, vol. 7, pp. 249-266.

Salem Y., et al., "History-Guided Conversational Recommendation," Proceedings of the 23rd International Conference on World Wide Web, ACM, Apr. 7-11, 2014, 6 Pages.

Scherer K.R., et al., "Vocal Cues in Emotion Encoding and Decoding," Motivation and emotion, Jun. 1, 1991, vol. 15 (2), 27 Pages.

Seo M., et al., "Bidirectional Attention Flow for Machine Comprehension," arXiv preprint arXiv:1611.01603, Jun. 21, 2018, 13 Pages.

Shah P., et al., "Bootstrapping a Neural Conversational Agent with Dialogue Selfplay Crowdsourcing and On-line Reinforcement Learning," Proceedings of the 2018 Conference of the North American Chapter of the Association for Computational Linguistics: Human Language Technologies, Jun. 2018, vol. 3 (Industry Papers), 11 Pages.

Shen J., et al., "Natural TTS Synthesis by Conditioning Wavenet on Mel Spectrogram Predictions," 2018 IEEE International Conference on Acoustics Speech and Signal Processing, Apr. 15, 2018, 5 Pages.

Skerry-Ryan R.J., et al., "Towards End-to-End Prosody Transfer for Expressive Speech Synthesis with Tacotron," Proceeding s of the 35th International Conference on Machine Learning, Stockholm, Sweden, PMLR 80, Mar. 2018, 10 pages.

Sukhbaatar S., et al., "End-to-End Memory Networks," Advances in Neural Information Processing Systems, Nov. 24, 2015, 9 Pages.

Sun Y., et al., "Conversational Recommender System," The 41st International ACM SIGIR Conference on Research & Development in Information Retrieval, ACM, Jul. 8-12, 2018, 10 Pages.

Sutskever I., et al., "Sequence to Sequence Learning with Neural Networks," Advances in Neural Information Processing Systems, Sep. 10, 2014, 9 Pages.

Tachibana M., et al., "HMM-based Speech Synthesis with Various Speaking Styles using Model Interpolation," Speech Prosody, Mar. 2004, 4 pages.

Tits N., et al., "Visualization and Interpretation of Latent Spaces for Controlling Expressive Speech Synthesis Through Audio Analysis," Interspeech 2019, Mar. 27, 2019, 5 Pages.

Tran K., et al., "Recurrent Memory Networks for Language Modeling," arXiv preprint arXiv: 1601.01272, Apr. 22, 2016, 11 Pages.

Trigeorgis G., et al., "Adieu Features? End-to-End Speech Emotion Recognition Using a Deep Convolutional Recurrent Network," 2016 IEEE International Conference on Acoustics, Speech and Signal Processing (ICASSP), Mar. 20, 2016, 5 Pages.

Turniski F., et al., "Analysis of 3G and 4G Download Throughput in Pedestrian Zones," Proceedings Elmar—2013, Sep. 12, 2016, pp. 9-12, XP032993723.

U.S. Appl. No. 62/660,876, inventors Kumar; Anuj et al., filed Apr. 20, 2018.

U.S. Appl. No. 62/675,090, inventors Hanson; Michael Robert et al., filed May 22, 2018.

U.S. Appl. No. 62/747,628, inventors Liu; Honglei et al., filed Oct. 18, 2018.

U.S. Appl. No. 62/749,608, inventors Challa; Ashwini et al., filed Oct. 23, 2018.

U.S. Appl. No. 62/750,746, inventors Liu; Honglei et al., filed Oct. 25, 2018.

U.S. Appl. No. 62/923,342, inventors Hanson; Michael Robert et al., filed Oct. 18, 2019.

Co-pending U.S. Appl. No. 16/182,542, inventors Michael; Hanson et al., filed Nov. 6, 2018.

Co-pending U.S. Appl. No. 16/183,650, inventors Xiaohu; Liu et al., filed Nov. 7, 2018.

Co-pending U.S. Appl. No. 16/192,538, inventor Koukoumidis; Emmanouil, filed Nov. 15, 2018.

Co-pending U.S. Appl. No. 16/222,923, inventors Jason; Schissel et al., filed Dec. 17, 2018.

Co-pending U.S. Appl. No. 16/222,957, inventors Emmanouil; Koukoumidis et al., filed Dec. 17, 2018.

Co-pending U.S. Appl. No. 16/229,828, inventors Xiaohu; Liu et al., filed Dec. 21, 2018.

Co-pending U.S. Appl. No. 16/247,439, inventors Xiaohu; Liu et al., filed Jan. 14, 2019.

Co-pending U.S. Appl. No. 16/264,173, inventors Ashwini; Challa et al., filed Jan. 31, 2019.

Co-pending U.S. Appl. No. 16/376,832, inventors Liu; Honglei et al., filed Apr. 5, 2019.

Co-pending U.S. Appl. No. 16/388,130, inventors Xiaohu; Liu et al., filed Apr. 18, 2019.

Co-pending U.S. Appl. No. 16/389,634, inventors Crook; Paul Anthony et al., filed Apr. 19, 2019.

Co-pending U.S. Appl. No. 16/389,708, inventors William; Crosby Presant et al., filed Apr. 19, 2019.

Co-pending U.S. Appl. No. 16/389,728, inventors William; Presant et al., filed Apr. 19, 2019.

Co-pending U.S. Appl. No. 16/389,738, inventors Peng; Fuchun et al., filed Apr. 19, 2019.

Co-pending U.S. Appl. No. 16/389,769, inventors Honglei; Liu et al., filed Apr. 19, 2019.

Co-pending U.S. Appl. No. 16/434,010, inventors Dogaru; Sergiu et al., filed Jun. 6, 2019.

Co-pending U.S. Appl. No. 16/552,559, inventors Seungwhan; Moon et al., filed Aug. 27, 2019.

Co-pending U.S. Appl. No. 16/557,055, inventors Moon; Seungwhan et al., filed Aug. 30, 2019.

Co-pending U.S. Appl. No. 16/659,070, inventors Lisa; Xiaoyi Huang et al., filed Oct. 21, 2019.

Co-pending U.S. Appl. No. 16/659,203, inventors Huang; Lisa Xiaoyi et al., filed Oct. 21, 2019.

Co-pending U.S. Appl. No. 16/659,419, inventor Huang; Lisa Xiaoyi, filed Oct. 21, 2019.

Co-pending U.S. Appl. No. 16/703,700, inventors Ahmed; Aly et al., filed Dec. 4, 2019.

Co-pending U.S. Appl. No. 16/733,044, inventors Francislav; P. Penov et al., filed Jan. 2, 2020.

(56)           References Cited

OTHER PUBLICATIONS

Co-pending U.S. Appl. No. 16/741,630, inventors Crook; Paul Anthony et al., filed Jan. 13, 2020.
Co-pending U.S. Appl. No. 16/741,642, inventors Fuchun; Peng et al., filed Jan. 13, 2020.
Co-pending U.S. Appl. No. 16/742,668, inventors Xiaohu; Liu et al., filed Jan. 14, 2020.
Co-pending U.S. Appl. No. 16/742,769, inventors Liu; Xiaohu et al., filed Jan. 14, 2020.
Co-Pending U.S. Appl. No. 15/953,957, filed Apr. 16, 2018, 117 pages.
Dalton J., et al., "Vote Goat: Conversational Movie Recommendation," The 41st International ACM SIGIR Conference on Research Development in Information Retrieval, ACM, Jul. 2018, 5 Pages.
Dettmers T., et al., "Convolutional 2D Knowledge Graph Embeddings," Thirty-Second AAAI Conference on Artificial Intelligence, Apr. 25, 2018, 8 Pages.
Dinan E., et al., "Advances in Conversational AI," [online], Aug. 2, 2019, 12 Pages, Retrieved from the Internet: URL: https://ai.facebook.com/blog/advances-in-conversational-ai/.
Dubey M., et al., "EARL: Joint Entity and Relation Linking for Question Answering Over Knowledge Graphs," International Semantic Web Conference, Springer, Cham, Jun. 25, 2018, 16 Pages.
Dubin R., et al., "Adaptation Logic for HTTP Dynamic Adaptive Streaming using Geo-Predictive Crowdsourcing," Springer, Feb. 5, 2016, 11 Pages.
Duchi J., et al., "Adaptive Subgradient Methods for Online Learning and Stochastic Optimization," Journal of Machine Learning Research, Jul. 2011, vol. 12, pp. 2121-2159.
Dyer C., et al., "Recurrent Neural Network Grammars," Proceedings of NAACL-HLT, San Diego, California, Jun. 12-17, 2016, pp. 199-209.
Ganin Y., et al., "Domain-Adversarial Training of Neural Networks," Journal of Machine Learning Research, Jan. 2016, vol. 17, pp. 2096-2030.
Gao Y., "Demo for Interactive Text-to-Speech via Semi-Supervised Style Transfer Learning," Interspeech [Online], 2019 [Retrieved on Oct. 21, 2019], 3 Pages, Retrieved from Internet: URL: https://yolanda-gao.github.io/Interactive-Style-TTS/.
Ghazvininejad M., et al., "A Knowledge-Grounded Neural Conversation Model," Thirty-Second AAAI Conference on Artificial Intelligence, Apr. 27, 2018, 8 Pages.
Glass J., "A Brief Introduction to Automatic Speech Recognition," Nov. 13, 2007, 22 Pages, Retrieved from Internet: http://www.cs.columbia.edu/~mcollins/6864/slides/asr.pdf.
Goetz J., et al., "Active Federated Learning," Machine Learning, Sep. 27, 2019, 5 Pages.
Google Allo Makes Conversations Eeasier, Productive, and more Expressive, May 19, 2016 [Retrieved on Jul. 11, 2019], 13 Pages, Retrieved from Internet: URL: https://www.trickyways.com/2016/05/google-allo-makes-conversations-eeasier-productive-expressive/.
Han K., et al., "Speech Emotion Recognition using Deep Neural Network and Extreme Learning Machine," Fifteenth Annual Conference of the International Speech Communication Association, Sep. 2014, 5 pages.
He H., et al., "Learning Symmetric Collaborative Dialogue Agents with Dynamic Knowledge Graph Embeddings," Proceedings of the 55th Annual Meeting of the Association for Computational Linguistics, Apr. 24, 2017, 18 Pages.
Henderson M., et al., "The Second Dialog State Tracking Challenge," Proceedings of the 15th Annual Meeting of the Special Interest Group on Discourse and Dialogue (SJGDL4L), Jun. 18-20, 2014, 10 Pages.
Henter G.E., et al., "Principles for Learning Controllable TTS from Annotated and Latent Variation," Interspeech, Aug. 20-24, 2017, 5 Pages.
Hodari Z., et al., "Learning Interpretable Control Dimensions for Speech Synthesis by Using External Data," Interspeech, Sep. 2-6, 2018, 5 Pages.

Honglei L., et al., "Explore-Exploit: A Framework for Interactive and Online Learning," Dec. 1, 2018, 7 pages.
Hsiao W., et al., "Fashion++: Minimal Edits for Outfit Improvement," Computer Vision and Pattern Recognition, Apr. 19, 2019, 17 Pages.
Huang S., "Word2Vec and FastText Word Embedding with Gensim," Towards Data Science [Online], Feb. 4, 2018 [Retrieved on Jun. 14, 2019], 11 Pages, Retrieved from Internet: URL: https://towardsdatascience.com/word-embedding-with-word2vec-and-fasttext-a209c1d3e12c.
Hudson D.A., et al., "GQA: A New Dataset for Real-world Visual Reasoning and Compositional Question Answering," Proceedings of the IEEE Conference on Computer Vision and Pattern Recognition, May 10, 2019, 18 Pages.
Agrawal A., et al., "VQA: Visual Question Answering," International Journal of Computer Vision, Oct. 2016, pp. 1-25.
Bahdanau D., et al., "Neural Machine Translation by Jointly Learning to Align and Translate," Conference paper at International Conference on Learning Representations, arXiv preprint arXiv:1409.0473v7, Mar. 2015, 15 pages.
Bailey K., "Conversational AI and the Road Ahead," TechCrunch [Online], Feb. 15, 2018 [Retrieved on Jun. 14, 2019], 13 Pages, Retrieved from Internet: URL: https://techcrunch.com/2017/02/25/conversational-ai-and-the-road-ahead/.
Banse R., et al., "Acoustic Profiles in Vocal Emotion Expression," Journal of Personality and Social Psychology, Mar. 1996, vol. 70 (3), pp. 614-636.
Bast H., et al., "Easy Access to the Freebase Dataset," Proceedings of the 23rd International Conference on World Wide Web, ACM, Apr. 7-11, 2014, 4 Pages.
Bauer L., et al., "Commonsense for Generative Multi-Hop Question Answering Tasks," 2018 Empirical Methods in Natural Language Processing, Jun. 1, 2019, 22 Pages.
Bordes A., et al., "Learning End-to-End Goal-Oriented Dialog," Facebook AI, New York, USA, Mar. 30, 2017, 15 Pages.
Bordes A., et al., "Translating Embeddings for Modeling Multi-Relational Data," Advances in Neural Information Processing Systems, Dec. 5, 2013, 9 Pages.
Bordes A., "Large-Scale Simple Question Answering with Memory Networks," arXiv preprint arXiv:1506.02075, Jun. 5, 2015, 10 Pages.
Bui D., et al., "Federated User Representation Learning," Machine Leaning, Sep. 27, 2019, 10 Pages.
Busso C., et al., "IEMOCAP: Interactive Emotional Dyadic Motion Capture Database," Language Resources and Evaluation, Dec. 1, 2008, vol. 42 (4), 30 Pages.
Calrke P., et al., "Think You have Solved Question Answering? Try ARC, the AI2 Reasoning Challenge," Allen Instituite for Artificial Intelligence, Seattle, WA, USA, Mar. 14, 2018, 10 Pages.
Carlson A., et al., "Toward an Architecture for Never-Ending Language Learning," Twenty-Fourth AAAI Conference on Artificial intelligence, Jul. 5, 2010, 8 Pages.
Challa A., et al., "Generate, Filter, and Rank: Grammaticality Classification for Production-Ready NLG Systems," Facebook Conversational AI, Apr. 9, 2019, 10 Pages.
"Chat Extensions," [online], Apr. 18, 2017, 8 Pages, Retrieved from the Internet: URL: https://developers.facebook.com/docs/messenger-platform/guides/chat-extensions/.
Chen C.Y., et al., "Gunrock: Building a Human-Like Social Bot by Leveraging Large Scale Real User Data," 2nd Proceedings of Alexa Price, 2018, 19 Pages.
Chen Y., et al., "Jointly Modeling Inter-Slot Relations by Random Walk on Knowledge Graphs for Unsupervised Spoken Language Understanding," Proceedings of the 2015 Conference of the North American Chapter of the Association for Computational Linguistics, Human Language Technologies, May 31-Jun. 5, 2015, 11 Pages.
Choi E., et al., "QuAC: Question Answering in Context," Allen Instituite for Artificial Intelligence, Aug. 28, 2018, 11 Pages.
Conneau A., et al., "Supervised Learning of Universal Sentence Representations from Natural Language Inference Data," Conference: Proceedings of the 2017 Conference on Empirical Methods in Natural Language Processing, Jul. 8, 2018, 12 Pages.

(56)             References Cited

OTHER PUBLICATIONS

Co-pending U.S. Appl. No. 14/593,723, inventors Colin; Patrick Treseler et al., filed Jan. 9, 2015.
Co-pending U.S. Appl. No. 15/808,638, inventors Ryan; Brownhill et al., filed Nov. 9, 2017.
Co-pending U.S. Appl. No. 15/966,455, inventor Scott; Martin, filed Apr. 30, 2018.
Co-pending U.S. Appl. No. 15/967,193, inventors Testuggine; Davide et al., filed Apr. 30, 2018.
Co-pending U.S. Appl. No. 15/967,239, inventors Vivek; Natarajan et al., filed Apr. 30, 2018.
Co-pending U.S. Appl. No. 15/967,279, inventors Fuchun; Peng et al., filed Apr. 30, 2018.
Co-pending U.S. Appl. No. 15/967,290, inventors Fuchun; Peng et al., filed Apr. 30, 2018.
Co-pending U.S. Appl. No. 15/967,342, inventors Vivek; Natarajan et al., filed Apr. 30, 2018.
Co-pending U.S. Appl. No. 16/011,062, inventors Jinsong; Yu et al., filed Jun. 18, 2018.
Co-pending U.S. Appl. No. 16/025,317, inventors Gupta; Sonal et al., filed Jul. 2, 2018.
Co-pending U.S. Appl. No. 16/036,827, inventors Emmanouil; Koukoumidis et al., filed Jul. 16, 2018.
Co-pending U.S. Appl. No. 16/038,120, inventors Schissel; Jason et al., filed Jul. 17, 2018.
Co-pending U.S. Appl. No. 16/048,049, inventor Markku; Salkola, filed Jul. 27, 2018.
Co-pending U.S. Appl. No. 16/048,072, inventor Salkola; Markku, filed Jul. 27, 2018.
Co-pending U.S. Appl. No. 16/048,101, inventor Salkola; Markku , filed Jul. 27, 2018.
Co-pending U.S. Appl. No. 16/053,600, inventors Vivek; Natarajan et al., filed Aug. 2, 2018.
Co-pending U.S. Appl. No. 16/057,414, inventors Kahn; Jeremy Gillmor et al., filed Aug. 7, 2018.
Co-pending U.S. Appl. No. 16/103,775, inventors Zheng; Zhou et al., filed Aug. 14, 2018.
Co-pending U.S. Appl. No. 16/107,601, inventor Rajesh; Krishna Shenoy, filed Aug. 21, 2018.
Co-pending U.S. Appl. No. 16/107,847, inventors Rajesh; Krishna Shenoy et al., filed Aug. 21, 2018.
Co-pending U.S. Appl. No. 16/118,169, inventors Baiyang; Liu et al., filed Aug. 30, 2018.
Co-pending U.S. Appl. No. 16/121,393, inventors Zhou; Zheng et al., filed Sep. 4, 2018.
Co-pending U.S. Appl. No. 16/127,173, inventors Zheng; Zhou et al., filed Sep. 10, 2018.
Co-pending U.S. Appl. No. 16/129,638, inventors Vivek; Natarajan et al., filed Sep. 12, 2018.
Co-pending U.S. Appl. No. 16/135,752, inventors Liu; Xiaohu et al., filed Sep. 19, 2018.
Co-pending U.S. Appl. No. 16/150,069, inventors Jiedan; Zhu et al., filed Oct. 2, 2018.
Co-pending U.S. Appl. No. 16/150,184, inventors Francislav; P. Penov et al., filed Oct. 2, 2018.
Co-pending U.S. Appl. No. 16/151,040, inventors Brian; Nelson et al., filed Oct. 3, 2018.
Co-pending U.S. Appl. No. 16/168,536, inventors Dumoulin; Benoit F et al., filed Oct. 23, 2018.
Co-pending U.S. Appl. No. 16/176,081, inventors Anusha; Balakrishnan et al., filed Oct. 31, 2018.
Co-pending U.S. Appl. No. 16/176,312, inventors Koukoumidis; Emmanouil et al., filed Oct. 31, 2018.

* cited by examiner server-side process client-side process

MULTIMODAL STYLE CLASSIFIER 500

STYLE EMBEDDED TTS FRAMEWORK 600

CONFUSION MATRIX 710 ON IEMOCAP DATA

CONFUSION MATRIX 720 ON INTERNAL LABELED DATA

800

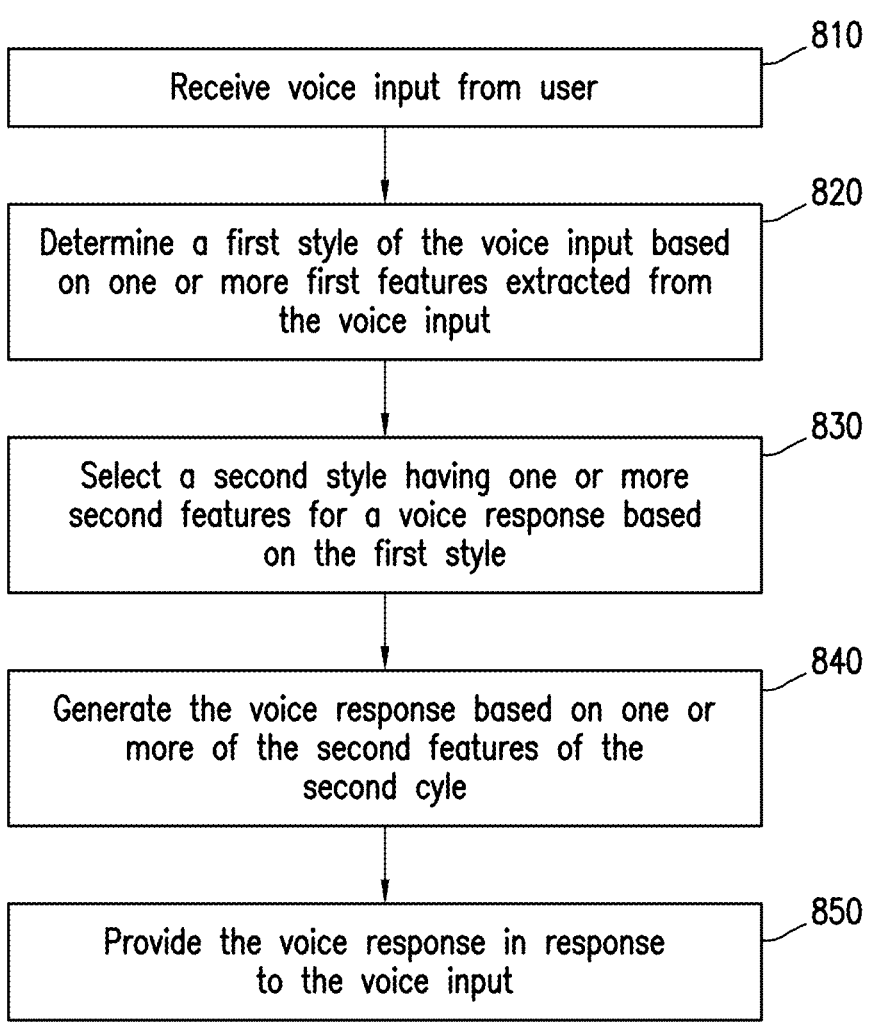

810

Receive voice input from user

820

Determine a first style of the voice input based on one or more first features extracted from the voice input

830

Select a second style having one or more second features for a voice response based on the first style

840

Generate the voice response based on one or more of the second features of the second cyle

850

Provide the voice response in response to the voice input

FIG. 8

STYLIZING TEXT-TO-SPEECH (TTS) VOICE RESPONSE FOR ASSISTANT SYSTEMS

PRIORITY

This application is a continuation under 35 U.S.C. § 120 of U.S. patent application Ser. No. 16/790,497, filed 13 Feb. 2020, which is incorporated herein by reference.

TECHNICAL FIELD

This disclosure generally relates to databases and file management within network environments, and in particular relates to hardware and software for smart assistant systems.

BACKGROUND

An assistant system can provide information or services on behalf of a user based on a combination of user input, location awareness, and the ability to access information from a variety of online sources (such as weather conditions, traffic congestion, news, stock prices, user schedules, retail prices, etc.). The user input may include text (e.g., online chat), especially in an instant messaging application or other applications, voice, images, motion, or a combination of them. The assistant system may perform concierge-type services (e.g., making dinner reservations, purchasing event tickets, making travel arrangements) or provide information based on the user input. The assistant system may also perform management or data-handling tasks based on online information and events without user initiation or interaction. Examples of those tasks that may be performed by an assistant system may include schedule management (e.g., sending an alert to a dinner date that a user is running late due to traffic conditions, update schedules for both parties, and change the restaurant reservation time). The assistant system may be enabled by the combination of computing devices, application programming interfaces (APIs), and the proliferation of applications on user devices.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. profile/news feed posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, the assistant system may assist a user to obtain information or services. The assistant system may enable the user to interact with it with multi-modal user input (such as voice, text, image, video, motion) in stateful and multi-turn conversations to get assistance. As an example and not by way of limitation, the assistant system may support both audio (verbal) input and nonverbal input, such as vision, location, gesture, motion, or hybrid/multi-modal input. The assistant system may create and store a user profile comprising both personal and contextual information associated with the user. In particular embodiments, the assistant system may analyze the user input using natural-language understanding. The analysis may be based on the user profile of the user for more personalized and context-aware understanding. The assistant system may resolve entities associated with the user input based on the analysis. In particular embodiments, the assistant system may interact with different agents to obtain information or services that are associated with the resolved entities. The assistant system may generate a response for the user regarding the information or services by using natural-language generation. Through the interaction with the user, the assistant system may use dialog-management techniques to manage and advance the conversation flow with the user. In particular embodiments, the assistant system may further assist the user to effectively and efficiently digest the obtained information by summarizing the information. The assistant system may also assist the user to be more engaging with an online social network by providing tools that help the user interact with the online social network (e.g., creating posts, comments, messages). The assistant system may additionally assist the user to manage different tasks such as keeping track of events. In particular embodiments, the assistant system may proactively execute, without a user input, tasks that are relevant to user interests and preferences based on the user profile, at a time relevant for the user. In particular embodiments, the assistant system may check privacy settings to ensure that accessing a user's profile or other user information and executing different tasks are permitted subject to the user's privacy settings.

In particular embodiments, the assistant system may assist the user via a hybrid architecture built upon both client-side processes and server-side processes. The client-side processes and the server-side processes may be two parallel workflows for processing a user input and providing assistance to the user. In particular embodiments, the client-side processes may be performed locally on a client system associated with a user. By contrast, the server-side processes may be performed remotely on one or more computing systems. In particular embodiments, an arbitrator on the client system may coordinate receiving user input (e.g., an audio signal), determine whether to use client-side processes, server-side processes, or both, to respond to the user input, and analyze the processing results from each process. The arbitrator may instruct agents on the client-side or server-side to execute tasks associated with the user input based on the aforementioned analyses. The execution results may be further rendered as output to the client system. By leveraging both client-side and server-side processes, the assistant system can effectively assist a user with optimal usage of computing resources while at the same time protecting user privacy and enhancing security.

In particular embodiments, the assistant system may utilize an interactive text-to-speech (TTS) process based on prosody transfer, in which a user's speech style is detected and responded to appropriately during conversations involving machine-generated speech. Machine-generated speech is usually monotonic and out of context, functioning much like an answering machine—the output being delivered in the same style, regardless of the tone/speed/volume of the user. However, stylizing that machine-generated speech may enable users to experience a more natural interaction with an assistant system, thus reducing fatigue and building trust. Accordingly, style embeddings may be extracted from a user's audio query and/or from corresponding response text, to build a customized TTS voice that matches or otherwise corresponds to the style of the speaking user based on various inputs (e.g., the user's audio input, background noise, time, etc.).

With increasing interests in interactive speech systems, speech emotion recognition and multi-style text-to-speech (TTS) synthesis are becoming increasingly important. Both may be combined so that extracted style embeddings may be applied to a customized TTS voice, thus generating a TTS response that matches or otherwise corresponds to a speaking style of the input query. In particular embodiments, in order to extract the style embeddings, a multi-modal style classification model may be trained using acoustic and textual features of speech utterances. In cases where there is a limited amount of labeled data, an emotional recognition dataset (e.g., the interactive emotional dyadic motion capture database (IEMOCAP)) may be combined with a small labeled subset of internal TTS dataset for style model training. As an example and not by way of limitation, a softmax layer from the style classifier may generate a style prediction, and this style embedding extraction model may then be applied to generate soft style labels for an unlabeled internal TTS dataset. With this semi-supervised approach, reliable style embeddings may be extracted to train the multi-style TTS system. This controllable multi-style TTS system may thus generate responses with particular features depending on a given target style embedding, which may be extracted from the input query or manually assigned. Although this disclosure describes particular types of data and models, this disclosure contemplates the use of any suitable types of data and models.

In particular embodiments, when a voice input is received from a user, a first style of the voice input may be determined, based on first features extracted from the voice input. Subsequently, a second style for a voice response having second features may be selected based on the first style. Finally, the voice response may be generated based on the second features of the second style, and the voice response may be provided in response to the voice input.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 8 illustrates an example method for generating a voice response in a style corresponding to the style of a user query.

DESCRIPTION OF EXAMPLE EMBODIMENTS

System Overview

Figure 1:
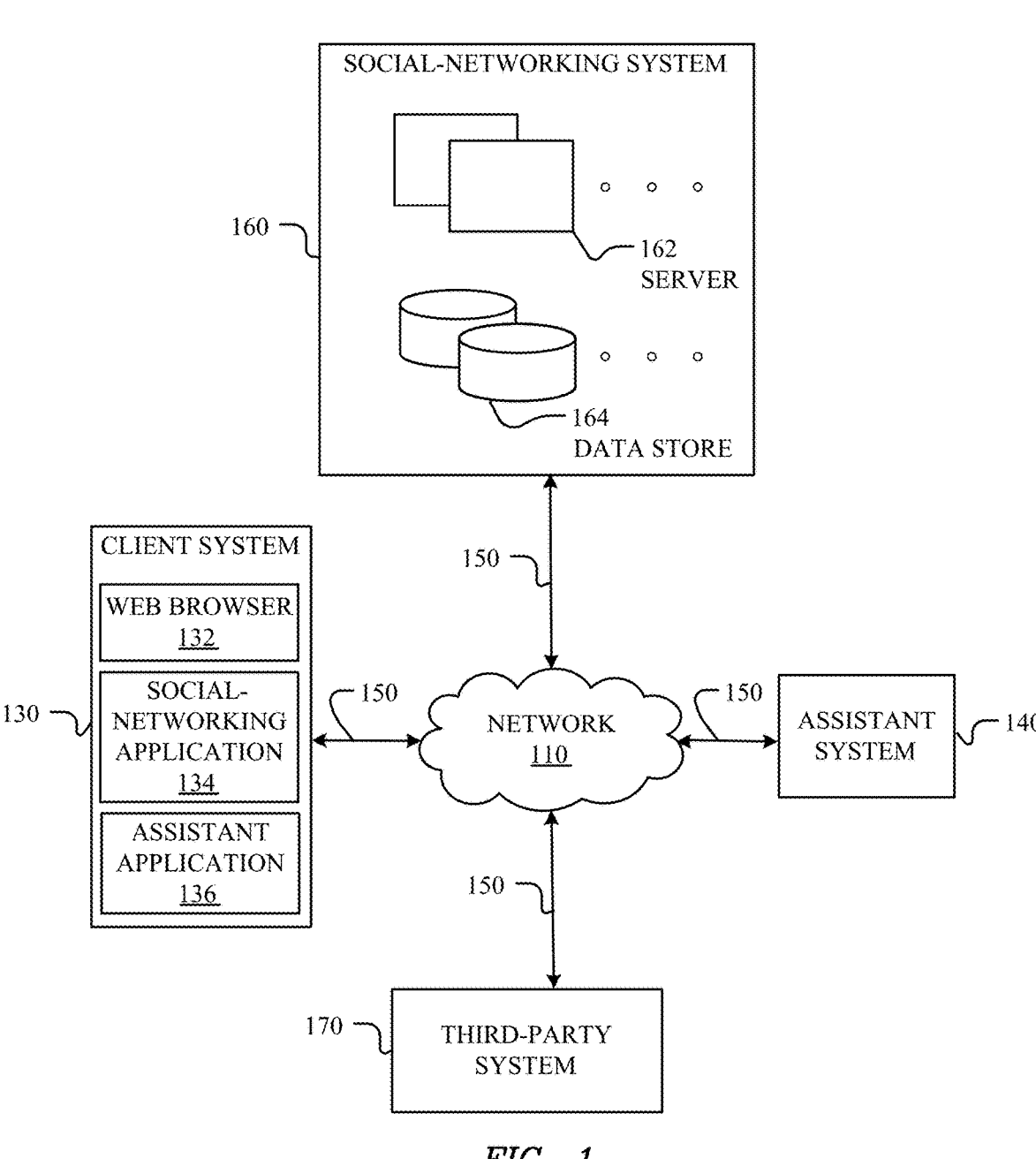
FIG. 1 illustrates an example network environment associated with an assistant system.

FIG. 1 illustrates an example network environment 100 associated with an assistant system. Network environment 100 includes a client system 130, an assistant system 140, a social-networking system 160, and a third-party system 170 connected to each other by a network 110. Although FIG. 1 illustrates a particular arrangement of a client system 130, an assistant system 140, a social-networking system 160, a third-party system 170, and a network 110, this disclosure contemplates any suitable arrangement of a client system 130, an assistant system 140, a social-networking system 160, a third-party system 170, and a network 110. As an example and not by way of limitation, two or more of a client system 130, a social-networking system 160, an assistant system 140, and a third-party system 170 may be connected to each other directly, bypassing a network 110. As another example, two or more of a client system 130, an assistant system 140, a social-networking system 160, and a third-party system 170 may be physically or logically co-located with each other in whole or in part. Moreover, although FIG. 1 illustrates a particular number of client systems 130, assistant systems 140, social-networking systems 160, third-party systems 170, and networks 110, this disclosure contemplates any suitable number of client systems 130, assistant systems 140, social-networking systems 160, third-party systems 170, and networks 110. As an example and not by way of limitation, network environment 100 may include multiple client systems 130, assistant systems 140, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, an assistant system 140, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, smart speaker, virtual reality (VR) headset, augment reality (AR) smart glasses, other suitable electronic device, or any suitable combination thereof. In particular embodiments, the client system 130 may be a smart assistant device. More information on smart assistant devices may be found in U.S. patent application Ser. No. 15/949,011, filed 9 Apr. 2018, U.S. patent application Ser. No. 16/153,574, filed 5 Oct. 2018, U.S. Design PATENT Application No. 29/631,910, filed 3 Jan. 2018, U.S. Design patent application Ser. No. 29/631,747, filed 2 Jan. 2018, U.S. Design patent application Ser. No. 29/631, 913, filed 3 Jan. 2018, and U.S. Design patent application Ser. No. 29/631,914, filed 3 Jan. 2018, each of which is incorporated by reference. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, and may have one or more add-ons, plug-ins, or other extensions. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts, combinations of markup language and scripts, and the like. Herein, reference to a web interface encompasses one or more corresponding source files (which a browser may use to render the web interface) and vice versa, where appropriate.

In particular embodiments, a client system 130 may include a social-networking application 134 installed on the client system 130. A user at a client system 130 may use the social-networking application 134 to access on online social network. The user at the client system 130 may use the social-networking application 134 to communicate with the user's social connections (e.g., friends, followers, followed accounts, contacts, etc.). The user at the client system 130 may also use the social-networking application 134 to interact with a plurality of content objects (e.g., posts, news articles, ephemeral content, etc.) on the online social network. As an example and not by way of limitation, the user may browse trending topics and breaking news using the social-networking application 134.

In particular embodiments, a client system 130 may include an assistant application 136. A user at a client system 130 may use the assistant application 136 to interact with the assistant system 140. In particular embodiments, the assistant application 136 may comprise a stand-alone application. In particular embodiments, the assistant application 136 may be integrated into the social-networking application 134 or another suitable application (e.g., a messaging application). In particular embodiments, the assistant application 136 may be also integrated into the client system 130, an assistant hardware device, or any other suitable hardware devices. In particular embodiments, the assistant application 136 may be accessed via the web browser 132. In particular embodiments, the user may provide input via different modalities. As an example and not by way of limitation, the modalities may include audio, text, image, video, motion, orientation, etc. The assistant application 136 may communicate the user input to the assistant system 140. Based on the user input, the assistant system 140 may generate responses. The assistant system 140 may send the generated responses to the assistant application 136. The assistant application 136 may then present the responses to the user at the client system 130. The presented responses may be based on different modalities such as audio, text, image, and video. As an example and not by way of limitation, the user may verbally ask the assistant application 136 about the traffic information (i.e., via an audio modality) by speaking into a microphone of the client system 130. The assistant application 136 may then communicate the request to the assistant system 140. The assistant system 140 may accordingly generate a response and send it back to the assistant application 136. The assistant application 136 may further present the response to the user in text and/or images on a display of the client system 130.

In particular embodiments, an assistant system 140 may assist users to retrieve information from different sources. The assistant system 140 may also assist user to request services from different service providers. In particular embodiments, the assist system 140 may receive a user request for information or services via the assistant application 136 in the client system 130. The assist system 140 may use natural-language understanding to analyze the user request based on user's profile and other relevant information. The result of the analysis may comprise different entities associated with an online social network. The assistant system 140 may then retrieve information or request services associated with these entities. In particular embodiments, the assistant system 140 may interact with the social-networking system 160 and/or third-party system 170 when retrieving information or requesting services for the user. In particular embodiments, the assistant system 140 may generate a personalized communication content for the user using natural-language generating techniques. The personalized communication content may comprise, for example, the retrieved information or the status of the requested services. In particular embodiments, the assistant system 140 may enable the user to interact with it regarding the information or services in a stateful and multi-turn conversation by using dialog-management techniques. The functionality of the assistant system 140 is described in more detail in the discussion of FIG. 2 below.

In particular embodiments, the social-networking system 160 may be a network-addressable computing system that can host an online social network. The social-networking system 160 may generate, store, receive, and send social-networking data, such as, for example, user profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, an assistant system 140, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes-which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects. In particular embodiments, a third-party content provider may use one or more third-party agents to provide content objects and/or services. A third-party agent may be an implementation that is hosted and executing on the third-party system 170.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow, for example, an assistant system 140 or a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Assistant Systems

Figure 2:
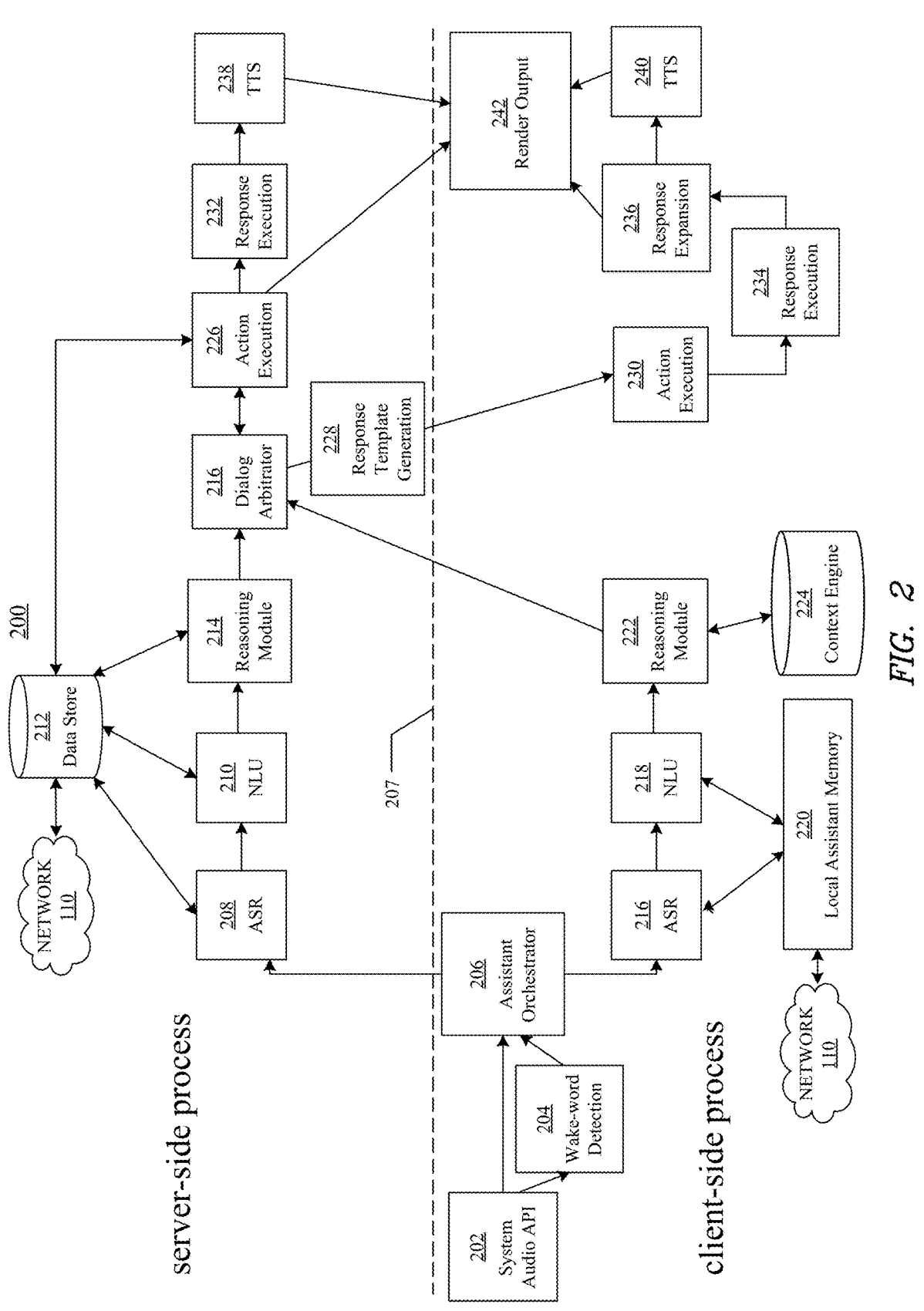
FIG. 2 illustrates an example architecture of the assistant system.

FIG. 2 illustrates an example architecture of an assistant system 140. In particular embodiments, the assistant system 140 may assist a user to obtain information or services. The assistant system 140 may enable the user to interact with it with multi-modal user input (such as voice, text, image, video, motion) in stateful and multi-turn conversations to get assistance. As an example and not by way of limitation, the assistant system 140 may support both audio input (verbal) and nonverbal input, such as vision, location, gesture, motion, or hybrid/multi-modal input. The assistant system 140 may create and store a user profile comprising both personal and contextual information associated with the user. In particular embodiments, the assistant system 140 may analyze the user input using natural-language understanding. The analysis may be based on the user profile of the user for more personalized and context-aware understanding. The assistant system 140 may resolve entities associated with the user input based on the analysis. In particular embodiments, the assistant system 140 may interact with different agents to obtain information or services that are associated with the resolved entities. The assistant system 140 may generate a response for the user regarding the information or services by using natural-language generation. Through the interaction with the user, the assistant system 140 may use dialog management techniques to manage and forward the conversation flow with the user. In particular embodiments, the assistant system 140 may further assist the user to effectively and efficiently digest the obtained information by summarizing the information. The assistant system 140 may also assist the user to be more engaging with an online social network by providing tools that help the user interact with the online social network (e.g., creating posts, comments, messages). The assistant system 140 may additionally assist the user to manage different tasks such as keeping track of events. In particular embodiments, the assistant system 140 may proactively execute, without a user input, pre-authorized tasks that are relevant to user interests and preferences based on the user profile, at a time relevant for the user. In particular embodiments, the assistant system 140 may check privacy settings to ensure that accessing a user's profile or other user information and executing different tasks are permitted subject to the user's privacy settings. More information on assisting users subject to privacy settings may be found in U.S. patent application Ser. No. 16/182,542, filed 6 Nov. 2018, which is incorporated by reference.

In particular embodiments, the assistant system 140 may assist user via a hybrid architecture built upon both client-side process and server-side process. The client-side process and the server-side process may be two parallel workflows for processing a user input and providing assistances to the user. In particular embodiments, the client-side process may be performed locally on a client system 130 associated with a user. By contrast, the server-side process may be performed remotely on one or more computing systems. In particular embodiments, an assistant orchestrator on the client system 130 may coordinate receiving user input (e.g., audio signal) and determining whether to use client-side process or server-side process or both to respond to the user input. A dialog arbitrator may analyze the processing results from each process. The dialog arbitrator may instruct agents on the client-side or server-side to execute tasks associated with the user input based on the aforementioned analyses. The execution results may be further rendered as output to the client system 130. By leveraging both client-side and server-side processes, the assistant system 140 can effectively assist a user with optimal usage of computing resources while at the same time protecting user privacy and enhancing security.

In particular embodiments, the assistant system 140 may receive a user input from a client system 130 associated with the user. In particular embodiments, the user input may be a user-generated input that is sent to the assistant system 140 in a single turn. The user input may be verbal, nonverbal, or a combination thereof. As an example and not by way of limitation, the nonverbal user input may be based on the user's voice, vision, location, activity, gesture, motion, or a combination thereof. If the user input is based on the user's voice (e.g., the user may speak to the client system 130), such user input may be first processed by a system audio API 202 (application programming interface). The system audio API 202 may conduct echo cancellation, noise removal, beam forming, and self-user voice activation, speaker identification, voice activity detection (VAD), and any other acoustic techniques to generate audio data that is readily processable by the assistant system 140. In particular embodiments, the system audio API 202 may perform wake-word detection 204 from the user input. As an example and not by way of limitation, a wake-word may be "hey assistant". If such wake-word is detected, the assistant system 140 may be activated accordingly. In alternative embodiments, the user may activate the assistant system 140 via a visual signal without a wake-word. The visual signal may be received at a low-power sensor (e.g., a camera) that can detect various visual signals. As an example and not by way of limitation, the visual signal may be a barcode, a QR code or a universal product code (UPC) detected by the client system 130. As another example and not by way of limitation, the visual signal may be the user's gaze at an object. As yet another example and not by way of limitation, the visual signal may be a user gesture, e.g., the user pointing at an object.

In particular embodiments, the audio data from the system audio API 202 may be sent to an assistant orchestrator 206. The assistant orchestrator 206 may be executing on the client system 130. In particular embodiments, the assistant orchestrator 206 may determine whether to respond to the user input by using a client-side process or a server-side process. As indicated in FIG. 2, the client-side process is illustrated below the dashed line 207 whereas the server-side process is illustrated above the dashed line 207. The assistant orchestrator 206 may also determine to respond to the user input by using both the client-side process and the server-side process simultaneously. Although FIG. 2 illustrates the assistant orchestrator 206 as being a client-side process, the assistant orchestrator 206 may be a server-side process or may be a hybrid process split between client- and server-side processes.

In particular embodiments, the server-side process may be as follows after audio data is generated from the system audio API 202. The assistant orchestrator 206 may send the audio data to a remote computing system that hosts different modules of the assistant system 140 to respond to the user input. In particular embodiments, the audio data may be received at a remote automatic speech recognition (ASR) module 208. The ASR module 208 may allow a user to dictate and have speech transcribed as written text, have a document synthesized as an audio stream, or issue commands that are recognized as such by the system. The ASR module 208 may use statistical models to determine the most likely sequences of words that correspond to a given portion of speech received by the assistant system 140 as audio input. The models may include one or more of hidden Markov models, neural networks, deep learning models, or any combination thereof. The received audio input may be encoded into digital data at a particular sampling rate (e.g., 16, 44.1, or 96 kHz) and with a particular number of bits representing each sample (e.g., 8, 16, of 24 bits).

In particular embodiments, the ASR module 208 may comprise different components. The ASR module 208 may comprise one or more of a grapheme-to-phoneme (G2P) model, a pronunciation learning model, a personalized acoustic model, a personalized language model (PLM), or an end-pointing model. In particular embodiments, the G2P model may be used to determine a user's grapheme-to-phoneme style, e.g., what it may sound like when a particular user speaks a particular word. The personalized acoustic model may be a model of the relationship between audio signals and the sounds of phonetic units in the language. Therefore, such personalized acoustic model may identify how a user's voice sounds. The personalized acoustical model may be generated using training data such as training speech received as audio input and the corresponding phonetic units that correspond to the speech. The personalized acoustical model may be trained or refined using the voice of a particular user to recognize that user's speech. In particular embodiments, the personalized language model may then determine the most likely phrase that corresponds to the identified phonetic units for a particular audio input. The personalized language model may be a model of the probabilities that various word sequences may occur in the language. The sounds of the phonetic units in the audio input may be matched with word sequences using the personalized language model, and greater weights may be assigned to the word sequences that are more likely to be phrases in the language. The word sequence having the highest weight may be then selected as the text that corresponds to the audio input. In particular embodiments, the personalized language model may be also used to predict what words a user is most likely to say given a context. In particular embodiments, the end-pointing model may detect when the end of an utterance is reached.

In particular embodiments, the output of the ASR module 208 may be sent to a remote natural-language understanding (NLU) module 210. The NLU module 210 may perform named entity resolution (NER). The NLU module 210 may additionally consider contextual information when analyzing the user input. In particular embodiments, an intent and/or a slot may be an output of the NLU module 210. An intent may be an element in a pre-defined taxonomy of semantic intentions, which may indicate a purpose of a user interacting with the assistant system 140. The NLU module 210 may classify a user input into a member of the pre-defined taxonomy, e.g., for the input "Play Beethoven's 5th," the NLU module 210 may classify the input as having the intent [IN:play_music]. In particular embodiments, a domain may denote a social context of interaction, e.g., education, or a namespace for a set of intents, e.g., music. A slot may be a named sub-string corresponding to a character string within the user input, representing a basic semantic entity. For example, a slot for "pizza" may be [SL:dish]. In particular embodiments, a set of valid or expected named slots may be conditioned on the classified intent. As an example and not by way of limitation, for the intent [IN:play_music], a valid slot may be [SL:song_name]. In particular embodiments, the NLU module 210 may additionally extract information from one or more of a social graph, a knowledge graph, or a concept graph, and retrieve a user's profile from one or more remote data stores 212. The NLU module 210 may further process information from these different sources by determining what information to aggregate, annotating n-grams of the user input, ranking the n-grams with confidence scores based on the aggregated information, and formulating the ranked n-grams into features that can be used by the NLU module 210 for understanding the user input.

In particular embodiments, the NLU module 210 may identify one or more of a domain, an intent, or a slot from the user input in a personalized and context-aware manner. As an example and not by way of limitation, a user input may comprise "show me how to get to the coffee shop". The NLU module 210 may identify the particular coffee shop that the user wants to go based on the user's personal information and the associated contextual information. In particular embodiments, the NLU module 210 may comprise a lexicon of a particular language and a parser and grammar rules to partition sentences into an internal representation. The NLU module 210 may also comprise one or more programs that perform naive semantics or stochastic semantic analysis to the use of pragmatics to understand a user input. In particular embodiments, the parser may be based on a deep learning architecture comprising multiple long-short term memory (LSTM) networks. As an example and not by way of limitation, the parser may be based on a recurrent neural network grammar (RNNG) model, which is a type of recurrent and recursive LSTM algorithm. More information on natural-language understanding may be found in U.S. patent application Ser. No. 16/011,062, filed 18 Jun. 2018, U.S. patent application Ser. No. 16/025,317, filed 2 Jul. 2018, and U.S. patent application Ser. No. 16/038,120, filed 17 Jul. 2018, each of which is incorporated by reference.

In particular embodiments, the output of the NLU module 210 may be sent to a remote reasoning module 214. The reasoning module 214 may comprise a dialog manager and an entity resolution component. In particular embodiments, the dialog manager may have complex dialog logic and product-related business logic. The dialog manager may manage the dialog state and flow of the conversation between the user and the assistant system 140. The dialog manager may additionally store previous conversations between the user and the assistant system 140. In particular embodiments, the dialog manager may communicate with the entity resolution component to resolve entities associated with the one or more slots, which supports the dialog manager to advance the flow of the conversation between the user and the assistant system 140. In particular embodiments, the entity resolution component may access one or more of the social graph, the knowledge graph, or the concept graph when resolving the entities. Entities may include, for example, unique users or concepts, each of which may have a unique identifier (ID). As an example and not by way of limitation, the knowledge graph may comprise a plurality of entities. Each entity may comprise a single record associated with one or more attribute values. The particular record may be associated with a unique entity identifier. Each record may have diverse values for an attribute of the entity. Each attribute value may be associated with a confidence probability. A confidence probability for an attribute value represents a probability that the value is accurate for the given attribute. Each attribute value may be also associated with a semantic weight. A semantic weight for an attribute value may represent how the value semantically appropriate for the given attribute considering all the available information. For example, the knowledge graph may comprise an entity of a book "Alice's Adventures", which includes information that has been extracted from multiple content sources (e.g., an online social network, online encyclopedias, book review sources, media databases, and entertainment content sources), and then deduped, resolved, and fused to generate the single unique record for the knowledge graph. The entity may be associated with a "fantasy" attribute value which indicates the genre of the book "Alice's Adventures". More information on the knowledge graph may be found in U.S. patent application Ser. No. 16/048,049, filed 27 Jul. 2018, and U.S. patent application Ser. No. 16/048,101, filed 27 Jul. 2018, each of which is incorporated by reference.

In particular embodiments, the entity resolution component may check the privacy constraints to guarantee that the resolving of the entities does not violate privacy policies. As an example and not by way of limitation, an entity to be resolved may be another user who specifies in his/her privacy settings that his/her identity should not be searchable on the online social network, and thus the entity resolution component may not return that user's identifier in response to a request. Based on the information obtained from the social graph, the knowledge graph, the concept graph, and the user profile, and subject to applicable privacy policies, the entity resolution component may therefore resolve the entities associated with the user input in a personalized, context-aware, and privacy-aware manner. In particular embodiments, each of the resolved entities may be associated with one or more identifiers hosted by the social-networking system 160. As an example and not by way of limitation, an identifier may comprise a unique user identifier (ID) corresponding to a particular user (e.g., a unique username or user ID number). In particular embodiments, each of the resolved entities may be also associated with a confidence score. More information on resolving entities may be found in U.S. patent application Ser. No. 16/048,049, filed 27 Jul. 2018, and U.S. patent application Ser. No. 16/048,072, filed 27 Jul. 2018, each of which is incorporated by reference.

In particular embodiments, the dialog manager may conduct dialog optimization and assistant state tracking. Dialog optimization is the problem of using data to understand what the most likely branching in a dialog should be. As an example and not by way of limitation, with dialog optimization the assistant system 140 may not need to confirm who a user wants to call because the assistant system 140 has high confidence that a person inferred based on dialog optimization would be very likely whom the user wants to call. In particular embodiments, the dialog manager may use reinforcement learning for dialog optimization. Assistant state tracking aims to keep track of a state that changes over time as a user interacts with the world and the assistant system 140 interacts with the user. As an example and not by way of limitation, assistant state tracking may track what a user is talking about, whom the user is with, where the user is, what tasks are currently in progress, and where the user's gaze is at, etc., subject to applicable privacy policies. In particular embodiments, the dialog manager may use a set of operators to track the dialog state. The operators may comprise the necessary data and logic to update the dialog state. Each operator may act as delta of the dialog state after processing an incoming request. In particular embodiments, the dialog manager may further comprise a dialog state tracker and an action selector. In alternative embodiments, the dialog state tracker may replace the entity resolution component and resolve the references/mentions and keep track of the state.

In particular embodiments, the reasoning module 214 may further conduct false trigger mitigation. The goal of false trigger mitigation is to detect false triggers (e.g., wake-word) of assistance requests and to avoid generating false records when a user actually does not intend to invoke the assistant system 140. As an example and not by way of limitation, the reasoning module 214 may achieve false trigger mitigation based on a nonsense detector. If the nonsense detector determines that a wake-word makes no sense at this point in the interaction with the user, the reasoning module 214 may determine that inferring the user intended to invoke the assistant system 140 may be incorrect. In particular embodiments, the output of the reasoning module 214 may be sent a remote dialog arbitrator 216.

In particular embodiments, each of the ASR module 208, NLU module 210, and reasoning module 214 may access the remote data store 212, which comprises user episodic memories to determine how to assist a user more effectively. More information on episodic memories may be found in U.S. patent application Ser. No. 16/552,559, filed 27 Aug. 2019, which is incorporated by reference. The data store 212 may additionally store the user profile of the user. The user profile of the user may comprise user profile data including demographic information, social information, and contextual information associated with the user. The user profile data may also include user interests and preferences on a plurality of topics, aggregated through conversations on news feed, search logs, messaging platforms, etc. The usage of a user profile may be subject to privacy constraints to ensure that a user's information can be used only for his/her benefit, and not shared with anyone else. More information on user profiles may be found in U.S. patent application Ser. No. 15/967,239, filed 30 Apr. 2018, which is incorporated by reference.

In particular embodiments, parallel to the aforementioned server-side process involving the ASR module 208, NLU module 210, and reasoning module 214, the client-side process may be as follows. In particular embodiments, the output of the assistant orchestrator 206 may be sent to a local ASR module 216 on the client system 130. The ASR module 216 may comprise a personalized language model (PLM), a G2P model, and an end-pointing model. Because of the limited computing power of the client system 130, the assistant system 140 may optimize the personalized language model at run time during the client-side process. As an example and not by way of limitation, the assistant system 140 may pre-compute a plurality of personalized language models for a plurality of possible subjects a user may talk about. When a user requests assistance, the assistant system 140 may then swap these pre-computed language models quickly so that the personalized language model may be optimized locally by the assistant system 140 at run time based on user activities. As a result, the assistant system 140 may have a technical advantage of saving computational resources while efficiently determining what the user may be talking about. In particular embodiments, the assistant system 140 may also re-learn user pronunciations quickly at run time.

In particular embodiments, the output of the ASR module 216 may be sent to a local NLU module 218. In particular embodiments, the NLU module 218 herein may be more compact compared to the remote NLU module 210 supported on the server-side. When the ASR module 216 and NLU module 218 process the user input, they may access a local assistant memory 220. The local assistant memory 220 may be different from the user memories stored on the data store 212 for the purpose of protecting user privacy. In particular embodiments, the local assistant memory 220 may be syncing with the user memories stored on the data store 212 via the network 110. As an example and not by way of limitation, the local assistant memory 220 may sync a calendar on a user's client system 130 with a server-side calendar associate with the user. In particular embodiments, any secured data in the local assistant memory 220 may be only accessible to the modules of the assistant system 140 that are locally executing on the client system 130.

In particular embodiments, the output of the NLU module 218 may be sent to a local reasoning module 222. The reasoning module 222 may comprise a dialog manager and an entity resolution component. Due to the limited computing power, the reasoning module 222 may conduct on-device learning that is based on learning algorithms particularly tailored for client systems 130. As an example and not by way of limitation, federated learning may be used by the reasoning module 222. Federated learning is a specific category of distributed machine learning approaches which trains machine learning models using decentralized data residing on end devices such as mobile phones. In particular embodiments, the reasoning module 222 may use a particular federated learning model, namely federated user representation learning, to extend existing neural-network personalization techniques to federated learning. Federated user representation learning can personalize models in federated learning by learning task-specific user representations (i.e., embeddings) or by personalizing model weights. Federated user representation learning is a simple, scalable, privacy-preserving, and resource-efficient. Federated user representation learning may divide model parameters into federated and private parameters. Private parameters, such as private user embeddings, may be trained locally on a client system 130 instead of being transferred to or averaged on a remote server. Federated parameters, by contrast, may be trained remotely on the server. In particular embodiments, the reasoning module 222 may use another particular federated learning model, namely active federated learning to transmit a global model trained on the remote server to client systems 130 and calculate gradients locally on these client systems 130. Active federated learning may enable the reasoning module to minimize the transmission costs associated with downloading models and uploading gradients. For active federated learning, in each round client systems are selected not uniformly at random, but with a probability conditioned on the current model and the data on the client systems to maximize efficiency. In particular embodiments, the reasoning module 222 may use another particular federated learning model, namely federated Adam. Conventional federated learning model may use stochastic gradient descent (SGD) optimizers. By contrast, the federated Adam model may use moment-based optimizers. Instead of using the averaged model directly as what conventional work does, federated Adam model may use the averaged model to compute approximate gradients. These gradients may be then fed into the federated Adam model, which may de-noise stochastic gradients and use a per-parameter adaptive learning rate. Gradients produced by federated learning may be even noisier than stochastic gradient descent (because data may be not independent and identically distributed), so federated Adam model may help even more deal with the noise. The federated Adam model may use the gradients to take smarter steps towards minimizing the objective function. The experiments show that conventional federated learning on a benchmark has 1.6% drop in ROC (Receiver Operating Characteristics) curve whereas federated Adam model has only 0.4% drop. In addition, federated Adam model has no increase in communication or on-device computation. In particular embodiments, the reasoning module 222 may also perform false trigger mitigation. This false trigger mitigation may help detect false activation requests, e.g., wake-word, on the client system 130 when the user's speech input comprises data that is subject to privacy constraints. As an example and not by way of limitation, when a user is in a voice call, the user's conversation is private and the false trigger detection based on such conversation can only occur locally on the user's client system 130.

In particular embodiments, the assistant system 140 may comprise a local context engine 224. The context engine 224 may process all the other available signals to provide more informative cues to the reasoning module 222. As an example and not by way of limitation, the context engine 224 may have information related to people, sensory data from client system 130 sensors (e.g., microphone, camera) that are further analyzed by computer vision technologies, geometry constructions, activity data, inertial data (e.g., collected by a VR headset), location, etc. In particular embodiments, the computer vision technologies may comprise human skeleton reconstruction, face detection, facial recognition, hand tracking, eye tracking, etc. In particular embodiments, geometry constructions may comprise constructing objects surrounding a user using data collected by a client system 130. As an example and not by way of limitation, the user may be wearing AR glasses and geometry construction may aim to determine where the floor is, where the wall is, where the user's hands are, etc. In particular embodiments, inertial data may be data associated with linear and angular motions. As an example and not by way of limitation, inertial data may be captured by AR glasses which measures how a user's body parts move.

In particular embodiments, the output of the local reasoning module 222 may be sent to the dialog arbitrator 216. The dialog arbitrator 216 may function differently in three scenarios. In the first scenario, the assistant orchestrator 206 determines to use server-side process, for which the dialog arbitrator 216 may transmit the output of the reasoning module 214 to a remote action execution module 226. In the second scenario, the assistant orchestrator 206 determines to use both server-side process and client-side process, for which the dialog arbitrator 216 may aggregate output from both reasoning modules (i.e., remote reasoning module 214 and local reasoning module 222) of both processes and analyze them. As an example and not by way of limitation, the dialog arbitrator 216 may perform ranking and select the best reasoning result for responding to the user input. In particular embodiments, the dialog arbitrator 216 may further determine whether to use agents on the server-side or on the client-side to execute relevant tasks based on the analysis. In the third scenario, the assistant orchestrator 206 determines to use client-side process and the dialog arbitrator 216 needs to evaluate the output of the local reasoning module 222 to determine if the client-side process can complete the task of handling the user input.

In particular embodiments, for the first and second scenarios mentioned above, the dialog arbitrator 216 may determine that the agents on the server-side are necessary to execute tasks responsive to the user input. Accordingly, the dialog arbitrator 216 may send necessary information regarding the user input to the action execution module 226. The action execution module 226 may call one or more agents to execute the tasks. In alternative embodiments, the action selector of the dialog manager may determine actions to execute and instruct the action execution module 226 accordingly. In particular embodiments, an agent may be an implementation that serves as a broker across a plurality of content providers for one domain. A content provider may be an entity responsible for carrying out an action associated with an intent or completing a task associated with the intent. In particular embodiments, the agents may comprise first-party agents and third-party agents. In particular embodiments, first-party agents may comprise internal agents that are accessible and controllable by the assistant system 140 (e.g. agents associated with services provided by the online social network, such as messaging services or photo-share services). In particular embodiments, third-party agents may comprise external agents that the assistant system 140 has no control over (e.g., third-party online music application agents, ticket sales agents). The first-party agents may be associated with first-party providers that provide content objects and/or services hosted by the social-networking system 160. The third-party agents may be associated with third-party providers that provide content objects and/or services hosted by the third-party system 170. In particular embodiments, each of the first-party agents or third-party agents may be designated for a particular domain. As an example and not by way of limitation, the domain may comprise weather, transportation, music, etc. In particular embodiments, the assistant system 140 may use a plurality of agents collaboratively to respond to a user input. As an example and not by way of limitation, the user input may comprise "direct me to my next meeting." The assistant system 140 may use a calendar agent to retrieve the location of the next meeting. The assistant system 140 may then use a navigation agent to direct the user to the next meeting.

In particular embodiments, for the second and third scenarios mentioned above, the dialog arbitrator 216 may determine that the agents on the client-side are capable of executing tasks responsive to the user input but additional information is needed (e.g., response templates) or that the tasks can be only handled by the agents on the server-side. If the dialog arbitrator 216 determines that the tasks can be only handled by the agents on the server-side, the dialog arbitrator 216 may send necessary information regarding the user input to the action execution module 226. If the dialog arbitrator 216 determines that the agents on the client-side are capable of executing tasks but response templates are needed, the dialog arbitrator 216 may send necessary information regarding the user input to a remote response template generation module 228. The output of the response template generation module 228 may be further sent to a local action execution module 230 executing on the client system 130.

In particular embodiments, the action execution module 230 may call local agents to execute tasks. A local agent on the client system 130 may be able to execute simpler tasks compared to an agent on the server-side. As an example and not by way of limitation, multiple device-specific implementations (e.g., real-time calls for a client system 130 or a messaging application on the client system 130) may be handled internally by a single agent. Alternatively, these device-specific implementations may be handled by multiple agents associated with multiple domains. In particular embodiments, the action execution module 230 may additionally perform a set of general executable dialog actions. The set of executable dialog actions may interact with agents, users and the assistant system 140 itself. These dialog actions may comprise dialog actions for slot request, confirmation, disambiguation, agent execution, etc. The dialog actions may be independent of the underlying implementation of the action selector or dialog policy. Both tree-based policy and model-based policy may generate the same basic dialog actions, with a callback function hiding any action selector specific implementation details.

In particular embodiments, the output from the remote action execution module 226 on the server-side may be sent to a remote response execution module 232. In particular embodiments, the action execution module 226 may communicate back to the dialog arbitrator 216 for more information. The response execution module 232 may be based on a remote conversational understanding (CU) composer. In particular embodiments, the output from the action execution module 226 may be formulated as a <k, c, u, d> tuple, in which k indicates a knowledge source, c indicates a communicative goal, u indicates a user model, and d indicates a discourse model. In particular embodiments, the CU composer may comprise a natural-language generator (NLG) and a user interface (UI) payload generator. The natural-language generator may generate a communication content based on the output of the action execution module 226 using different language models and/or language templates. In particular embodiments, the generation of the communication content may be application specific and also personalized for each user. The CU composer may also determine a modality of the generated communication content using the UI payload generator. In particular embodiments, the NLG may comprise a content determination component, a sentence planner, and a surface realization component. The content determination component may determine the communication content based on the knowledge source, communicative goal, and the user's expectations. As an example and not by way of limitation, the determining may be based on a description logic. The description logic may comprise, for example, three fundamental notions which are individuals (representing objects in the domain), concepts (describing sets of individuals), and roles (representing binary relations between individuals or concepts). The description logic may be characterized by a set of constructors that allow the natural-language generator to build complex concepts/roles from atomic ones. In particular embodiments, the content determination component may perform the following tasks to determine the communication content. The first task may comprise a translation task, in which the input to the natural-language generator may be translated to concepts. The second task may comprise a selection task, in which relevant concepts may be selected among those resulted from the translation task based on the user model. The third task may comprise a verification task, in which the coherence of the selected concepts may be verified. The fourth task may comprise an instantiation task, in which the verified concepts may be instantiated as an executable file that can be processed by the natural-language generator. The sentence planner may determine the organization of the communication content to make it human understandable. The surface realization component may determine specific words to use, the sequence of the sentences, and the style of the communication content. The UI payload generator may determine a preferred modality of the communication content to be presented to the user. In particular embodiments, the CU composer may check privacy constraints associated with the user to make sure the generation of the communication content follows the privacy policies. More information on natural-language generation may be found in U.S. patent application Ser. No. 15/967,279, filed 30 Apr. 2018, and U.S. patent application Ser. No. 15/966,455, filed 30 Apr. 2018, each of which is incorporated by reference.

In particular embodiments, the output from the local action execution module 230 on the client system 130 may be sent to a local response execution module 234. The response execution module 234 may be based on a local conversational understanding (CU) composer. The CU composer may comprise a natural-language generation (NLG) module. As the computing power of a client system 130 may be limited, the NLG module may be simple for the consideration of computational efficiency. Because the NLG module may be simple, the output of the response execution module 234 may be sent to a local response expansion module 236. The response expansion module 236 may further expand the result of the response execution module 234 to make a response more natural and contain richer semantic information.

In particular embodiments, if the user input is based on audio signals, the output of the response execution module 232 on the server-side may be sent to a remote text-to-speech (TTS) module 238. Similarly, the output of the response expansion module 236 on the client-side may be sent to a local TTS module 240. Both TTS modules may convert a response to audio signals. In particular embodiments, the output from the response execution module 232, the response expansion module 236, or the TTS modules on both sides, may be finally sent to a local render output module 242. The render output module 242 may generate a response that is suitable for the client system 130. As an example and not by way of limitation, the output of the response execution module 232 or the response expansion module 236 may comprise one or more of natural-language strings, speech, actions with parameters, or rendered images or videos that can be displayed in a VR headset or AR smart glasses. As a result, the render output module 242 may determine what tasks to perform based on the output of CU composer to render the response appropriately for displaying on the VR headset or AR smart glasses. For example, the response may be visual-based modality (e.g., an image or a video clip) that can be displayed via the VR headset or AR smart glasses. As another example, the response may be audio signals that can be played by the user via VR headset or AR smart glasses. As yet another example, the response may be augmented-reality data that can be rendered VR headset or AR smart glasses for enhancing user experience.

In particular embodiments, the assistant system 140 may have a variety of capabilities including audio cognition, visual cognition, signals intelligence, reasoning, and memories. In particular embodiments, the capability of audio recognition may enable the assistant system 140 to understand a user's input associated with various domains in different languages, understand a conversation and be able to summarize it, perform on-device audio cognition for complex commands, identify a user by voice, extract topics from a conversation and auto-tag sections of the conversation, enable audio interaction without a wake-word, filter and amplify user voice from ambient noise and conversations, understand which client system 130 (if multiple client systems 130 are in vicinity) a user is talking to.

In particular embodiments, the capability of visual cognition may enable the assistant system 140 to perform face detection and tracking, recognize a user, recognize most people of interest in major metropolitan areas at varying angles, recognize majority of interesting objects in the world through a combination of existing machine-learning models and one-shot learning, recognize an interesting moment and auto-capture it, achieve semantic understanding over multiple visual frames across different episodes of time, provide platform support for additional capabilities in people, places, objects recognition, recognize full set of settings and micro-locations including personalized locations, recognize complex activities, recognize complex gestures to control a client system 130, handle images/videos from egocentric cameras (e.g., with motion, capture angles, resolution, etc.), accomplish similar level of accuracy and speed regarding images with lower resolution, conduct one-shot registration and recognition of people, places, and objects, and perform visual recognition on a client system 130.

In particular embodiments, the assistant system 140 may leverage computer vision techniques to achieve visual cognition. Besides computer vision techniques, the assistant system 140 may explore options that can supplement these techniques to scale up the recognition of objects. In particular embodiments, the assistant system 140 may use supplemental signals such as optical character recognition (OCR) of an object's labels, GPS signals for places recognition, signals from a user's client system 130 to identify the user. In particular embodiments, the assistant system 140 may perform general scene recognition (home, work, public space, etc.) to set context for the user and reduce the computer-vision search space to identify top likely objects or people. In particular embodiments, the assistant system 140 may guide users to train the assistant system 140. For example, crowdsourcing may be used to get users to tag and help the assistant system 140 recognize more objects over time. As another example, users can register their personal objects as part of initial setup when using the assistant system 140. The assistant system 140 may further allow users to provide positive/negative signals for objects they interact with to train and improve personalized models for them.

In particular embodiments, the capability of signals intelligence may enable the assistant system 140 to determine user location, understand date/time, determine family locations, understand users' calendars and future desired locations, integrate richer sound understanding to identify setting/context through sound alone, build signals intelligence models at run time which may be personalized to a user's individual routines.

In particular embodiments, the capability of reasoning may enable the assistant system 140 to have the ability to pick up any previous conversation threads at any point in the future, synthesize all signals to understand micro and personalized context, learn interaction patterns and preferences from users' historical behavior and accurately suggest interactions that they may value, generate highly predictive proactive suggestions based on micro-context understanding, understand what content a user may want to see at what time of a day, understand the changes in a scene and how that may impact the user's desired content.

In particular embodiments, the capabilities of memories may enable the assistant system 140 to remember which social connections a user previously called or interacted with, write into memory and query memory at will (i.e., open dictation and auto tags), extract richer preferences based on prior interactions and long-term learning, remember a user's life history, extract rich information from egocentric streams of data and auto catalog, and write to memory in structured form to form rich short, episodic and long-term memories.

Figure 3:
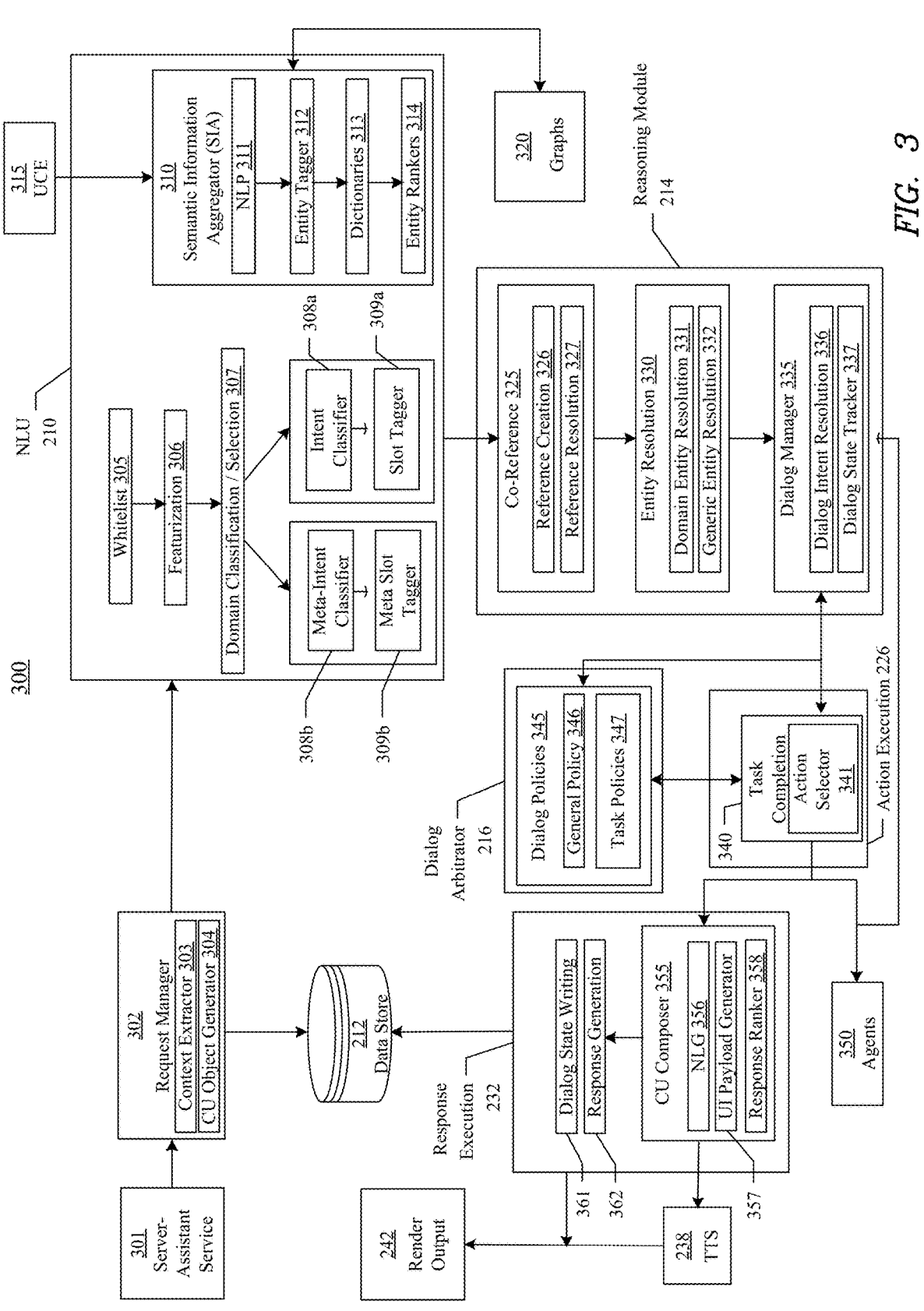
FIG. 3 illustrates an example flow diagram of server-side processes of the assistant system.

FIG. 3 illustrates an example diagram flow of server-side processes of the assistant system 140. In particular embodiments, a server-assistant service module 301 may access a request manager 302 upon receiving a user request. In alternative embodiments, the user request may be first processed by the remote ASR module 208 if the user request is based on audio signals. In particular embodiments, the request manager 302 may comprise a context extractor 303 and a conversational understanding object generator (CU object generator) 304. The context extractor 303 may extract contextual information associated with the user request. The context extractor 303 may also update contextual information based on the assistant application 136 executing on the client system 130. As an example and not by way of limitation, the update of contextual information may comprise content items are displayed on the client system 130. As another example and not by way of limitation, the update of contextual information may comprise whether an alarm is set on the client system 130. As another example and not by way of limitation, the update of contextual information may comprise whether a song is playing on the client system 130. The CU object generator 304 may generate particular content objects relevant to the user request. The content objects may comprise dialog-session data and features associated with the user request, which may be shared with all the modules of the assistant system 140. In particular embodiments, the request manager 302 may store the contextual information and the generated content objects in data store 212 which is a particular data store implemented in the assistant system 140.

In particular embodiments, the request manger 302 may send the generated content objects to the remote NLU module 210. The NLU module 210 may perform a plurality of steps to process the content objects. At step 305, the NLU module 210 may generate a whitelist for the content objects. In particular embodiments, the whitelist may comprise interpretation data matching the user request. At step 306, the NLU module 210 may perform a featurization based on the whitelist. At step 307, the NLU module 210 may perform domain classification/selection on user request based on the features resulted from the featurization to classify the user request into predefined domains. The domain classification/selection results may be further processed based on two related procedures. At step 308a, the NLU module 210 may process the domain classification/selection result using an intent classifier. The intent classifier may determine the user's intent associated with the user request. In particular embodiments, there may be one intent classifier for each domain to determine the most possible intents in a given domain. As an example and not by way of limitation, the intent classifier may be based on a machine-learning model that may take the domain classification/selection result as input and calculate a probability of the input being associated with a particular predefined intent. At step 308b, the NLU module 210 may process the domain classification/ selection result using a meta-intent classifier. The meta-intent classifier may determine categories that describe the user's intent. In particular embodiments, intents that are common to multiple domains may be processed by the meta-intent classifier. As an example and not by way of limitation, the meta-intent classifier may be based on a machine-learning model that may take the domain classification/selection result as input and calculate a probability of the input being associated with a particular predefined meta-intent. At step 309a, the NLU module 210 may use a slot tagger to annotate one or more slots associated with the user request. In particular embodiments, the slot tagger may annotate the one or more slots for the n-grams of the user request. At step 309b, the NLU module 210 may use a meta slot tagger to annotate one or more slots for the classification result from the meta-intent classifier. In particular embodiments, the meta slot tagger may tag generic slots such as references to items (e.g., the first), the type of slot, the value of the slot, etc. As an example and not by way of limitation, a user request may comprise "change 500 dollars in my account to Japanese yen." The intent classifier may take the user request as input and formulate it into a vector. The intent classifier may then calculate probabilities of the user request being associated with different predefined intents based on a vector comparison between the vector representing the user request and the vectors representing different predefined intents. In a similar manner, the slot tagger may take the user request as input and formulate each word into a vector. The intent classifier may then calculate probabilities of each word being associated with different predefined slots based on a vector comparison between the vector representing the word and the vectors representing different predefined slots. The intent of the user may be classified as "changing money". The slots of the user request may comprise "500", "dollars", "account", and "Japanese yen". The meta-intent of the user may be classified as "financial service". The meta slot may comprise "finance".

In particular embodiments, the NLU module 210 may comprise a semantic information aggregator 310. The semantic information aggregator 310 may help the NLU module 210 improve the domain classification/selection of the content objects by providing semantic information. In particular embodiments, the semantic information aggregator 310 may aggregate semantic information in the following way. The semantic information aggregator 310 may first retrieve information from a user context engine 315. In particular embodiments, the user context engine 315 may comprise offline aggregators and an online inference service. The offline aggregators may process a plurality of data associated with the user that are collected from a prior time window. As an example and not by way of limitation, the data may include news feed posts/comments, interactions with news feed posts/comments, search history, etc., that are collected during a predetermined timeframe (e.g., from a prior 90-day window). The processing result may be stored in the user context engine 315 as part of the user profile. The online inference service may analyze the conversational data associated with the user that are received by the assistant system 140 at a current time. The analysis result may be stored in the user context engine 315 also as part of the user profile. In particular embodiments, both the offline aggregators and online inference service may extract personalization features from the plurality of data. The extracted personalization features may be used by other modules of the assistant system 140 to better understand user input. In particular embodiments, the semantic information aggregator 310 may then process the retrieved information, i.e., a user profile, from the user context engine 315 in the following steps. At step 311, the semantic information aggregator 310 may process the retrieved information from the user context engine 315 based on natural-language processing (NLP). In particular embodiments, the semantic information aggregator 310 may tokenize text by text normalization, extract syntax features from text, and extract semantic features from text based on NLP. The semantic information aggregator 310 may additionally extract features from contextual information, which is accessed from dialog history between a user and the assistant system 140. The semantic information aggregator 310 may further conduct global word embedding, domain-specific embedding, and/or dynamic embedding based on the contextual information. At step 312, the processing result may be annotated with entities by an entity tagger. Based on the annotations, the semantic information aggregator 310 may generate dictionaries for the retrieved information at step 313. In particular embodiments, the dictionaries may comprise global dictionary features which can be updated dynamically offline. At step 314, the semantic information aggregator 310 may rank the entities tagged by the entity tagger. In particular embodiments, the semantic information aggregator 310 may communicate with different graphs 320 including one or more of the social graph, the knowledge graph, or the concept graph to extract ontology data that is relevant to the retrieved information from the user context engine 315. In particular embodiments, the semantic information aggregator 310 may aggregate the user profile, the ranked entities, and the information from the graphs 320. The semantic information aggregator 310 may then provide the aggregated information to the NLU module 210 to facilitate the domain classification/selection.

In particular embodiments, the output of the NLU module 210 may be sent to the remote reasoning module 214. The reasoning module 214 may comprise a co-reference component 325, an entity resolution component 330, and a dialog manager 335. The output of the NLU module 210 may be first received at the co-reference component 325 to interpret references of the content objects associated with the user request. In particular embodiments, the co-reference component 325 may be used to identify an item to which the user request refers. The co-reference component 325 may comprise reference creation 326 and reference resolution 327. In particular embodiments, the reference creation 326 may create references for entities determined by the NLU module 210. The reference resolution 327 may resolve these references accurately. As an example and not by way of limitation, a user request may comprise "find me the nearest grocery store and direct me there". The co-reference component 325 may interpret "there" as "the nearest grocery store". In particular embodiments, the co-reference component 325 may access the user context engine 315 and the dialog manager 335 when necessary to interpret references with improved accuracy.

In particular embodiments, the identified domains, intents, meta-intents, slots, and meta slots, along with the resolved references may be sent to the entity resolution component 330 to resolve relevant entities. The entity resolution component 330 may execute generic and domain-specific entity resolution. In particular embodiments, the entity resolution component 330 may comprise domain entity resolution 331 and generic entity resolution 332. The domain entity resolution 331 may resolve the entities by categorizing the slots and meta slots into different domains.

In particular embodiments, entities may be resolved based on the ontology data extracted from the graphs 320. The ontology data may comprise the structural relationship between different slots/meta-slots and domains. The ontology may also comprise information of how the slots/meta-slots may be grouped, related within a hierarchy where the higher level comprises the domain, and subdivided according to similarities and differences. The generic entity resolution 332 may resolve the entities by categorizing the slots and meta slots into different generic topics. In particular embodiments, the resolving may be also based on the ontology data extracted from the graphs 320. The ontology data may comprise the structural relationship between different slots/meta-slots and generic topics. The ontology may also comprise information of how the slots/meta-slots may be grouped, related within a hierarchy where the higher level comprises the topic, and subdivided according to similarities and differences. As an example and not by way of limitation, in response to the input of an inquiry of the advantages of a particular brand of electric car, the generic entity resolution 332 may resolve the referenced brand of electric car as vehicle and the domain entity resolution 331 may resolve the referenced brand of electric car as electric car.

In particular embodiments, the output of the entity resolution component 330 may be sent to the dialog manager 335 to advance the flow of the conversation with the user. The dialog manager 335 may be an asynchronous state machine that repeatedly updates the state and selects actions based on the new state. The dialog manager 335 may comprise dialog intent resolution 336 and dialog state tracker 337. In particular embodiments, the dialog manager 335 may execute the selected actions and then call the dialog state tracker 337 again until the action selected requires a user response, or there are no more actions to execute. Each action selected may depend on the execution result from previous actions. In particular embodiments, the dialog intent resolution 336 may resolve the user intent associated with the current dialog session based on dialog history between the user and the assistant system 140. The dialog intent resolution 336 may map intents determined by the NLU module 210 to different dialog intents. The dialog intent resolution 336 may further rank dialog intents based on signals from the NLU module 210, the entity resolution component 330, and dialog history between the user and the assistant system 140. In particular embodiments, instead of directly altering the dialog state, the dialog state tracker 337 may be a side-effect free component and generate n-best candidates of dialog state update operators that propose updates to the dialog state. The dialog state tracker 337 may comprise intent resolvers containing logic to handle different types of NLU intent based on the dialog state and generate the operators. In particular embodiments, the logic may be organized by intent handler, such as a disambiguation intent handler to handle the intents when the assistant system 140 asks for disambiguation, a confirmation intent handler that comprises the logic to handle confirmations, etc. Intent resolvers may combine the turn intent together with the dialog state to generate the contextual updates for a conversation with the user. A slot resolution component may then recursively resolve the slots in the update operators with resolution providers including the knowledge graph and domain agents. In particular embodiments, the dialog state tracker 337 may update/rank the dialog state of the current dialog session. As an example and not by way of limitation, the dialog state tracker 337 may update the dialog state as "completed" if the dialog session is over. As another example and not by way of limitation, the dialog state tracker 337 may rank the dialog state based on a priority associated with it.

In particular embodiments, the reasoning module 214 may communicate with the remote action execution module 226 and the dialog arbitrator 216, respectively. In particular embodiments, the dialog manager 335 of the reasoning module 214 may communicate with a task completion component 340 of the action execution module 226 about the dialog intent and associated content objects. In particular embodiments, the task completion module 340 may rank different dialog hypotheses for different dialog intents. The task completion module 340 may comprise an action selector 341. In alternative embodiments, the action selector 341 may be comprised in the dialog manager 335. In particular embodiments, the dialog manager 335 may additionally check against dialog policies 345 comprised in the dialog arbitrator 216 regarding the dialog state. In particular embodiments, a dialog policy 345 may comprise a data structure that describes an execution plan of an action by an agent 350. The dialog policy 345 may comprise a general policy 346 and task policies 347. In particular embodiments, the general policy 346 may be used for actions that are not specific to individual tasks. The general policy 346 may comprise handling low confidence intents, internal errors, unacceptable user response with retries, skipping or inserting confirmation based on ASR or NLU confidence scores, etc. The general policy 346 may also comprise the logic of ranking dialog state update candidates from the dialog state tracker 337 output and pick the one to update (such as picking the top ranked task intent). In particular embodiments, the assistant system 140 may have a particular interface for the general policy 346, which allows for consolidating scattered cross-domain policy/business-rules, especial those found in the dialog state tracker 337, into a function of the action selector 341. The interface for the general policy 346 may also allow for authoring of self-contained sub-policy units that may be tied to specific situations or clients, e.g., policy functions that may be easily switched on or off based on clients, situation, etc. The interface for the general policy 346 may also allow for providing a layering of policies with back-off, i.e. multiple policy units, with highly specialized policy units that deal with specific situations being backed up by more general policies 346 that apply in wider circumstances. In this context the general policy 346 may alternatively comprise intent or task specific policy. In particular embodiments, a task policy 347 may comprise the logic for action selector 341 based on the task and current state. In particular embodiments, there may be the following four types of task policies 347: 1) manually crafted tree-based dialog plans; 2) coded policy that directly implements the interface for generating actions; 3) configurator-specified slot-filling tasks; and 4) machine-learning model based policy learned from data. In particular embodiments, the assistant system 140 may bootstrap new domains with rule-based logic and later refine the task policies 347 with machine-learning models. In particular embodiments, a dialog policy 345 may a tree-based policy, which is a pre-constructed dialog plan. Based on the current dialog state, a dialog policy 345 may choose a node to execute and generate the corresponding actions. As an example and not by way of limitation, the tree-based policy may comprise topic grouping nodes and dialog action (leaf) nodes. In particular embodiments, the action selector 341 may take candidate operators of dialog state and consult the dialog policy 345 to decide what action should be executed.

The assistant system 140 may use a hierarchical dialog policy with general policy 346 handling the cross-domain business logic and task policies 347 handles the task/domain specific logic. In particular embodiments, the general policy 346 may pick one operator from the candidate operators to update the dialog state, followed by the selection of a user facing action by a task policy 347. Once a task is active in the dialog state, the corresponding task policy 347 may be consulted to select right actions. In particular embodiments, both the dialog state tracker 337 and the action selector 341 may not change the dialog state until the selected action is executed. This may allow the assistant system 140 to execute the dialog state tracker 337 and the action selector 341 for processing speculative ASR results and to do n-best ranking with dry runs. In particular embodiments, the action selector 341 may take the dialog state update operators as part of the input to select the dialog action. The execution of the dialog action may generate a set of expectation to instruct the dialog state tracker 337 to handler future turns. In particular embodiments, an expectation may be used to provide context to the dialog state tracker 337 when handling the user input from next turn. As an example and not by way of limitation, slot request dialog action may have the expectation of proving a value for the requested slot.

In particular embodiments, the dialog manager 335 may support multi-turn compositional resolution of slot mentions. For a compositional parse from the NLU 210, the resolver may recursively resolve the nested slots. The dialog manager 335 may additionally support disambiguation for the nested slots. As an example and not by way of limitation, the user request may be "remind me to call Alex". The resolver may need to know which Alex to call before creating an actionable reminder to-do entity. The resolver may halt the resolution and set the resolution state when further user clarification is necessary for a particular slot. The general policy 346 may examine the resolution state and create corresponding dialog action for user clarification. In dialog state tracker 337, based on the user request and the last dialog action, the dialog manager may update the nested slot. This capability may allow the assistant system 140 to interact with the user not only to collect missing slot values but also to reduce ambiguity of more complex/ambiguous utterances to complete the task. In particular embodiments, the dialog manager may further support requesting missing slots in a nested intent and multi-intent user requests (e.g., "take this photo and send it to Dad"). In particular embodiments, the dialog manager 335 may support machine-learning models for more robust dialog experience. As an example and not by way of limitation, the dialog state tracker 337 may use neural network based models (or any other suitable machine-learning models) to model belief over task hypotheses. As another example and not by way of limitation, for action selector 341, highest priority policy units may comprise white-list/black-list overrides, which may have to occur by design; middle priority units may comprise machine-learning models designed for action selection; and lower priority units may comprise rule-based fallbacks when the machine-learning models elect not to handle a situation. In particular embodiments, machine-learning model based general policy unit may help the assistant system 140 reduce redundant disambiguation or confirmation steps, thereby reducing the number of turns to execute the user request.

In particular embodiments, the action execution module 226 may call different agents 350 for task execution. An agent 350 may select among registered content providers to complete the action. The data structure may be constructed by the dialog manager 335 based on an intent and one or more slots associated with the intent. A dialog policy 345 may further comprise multiple goals related to each other through logical operators. In particular embodiments, a goal may be an outcome of a portion of the dialog policy and it may be constructed by the dialog manager 335. A goal may be represented by an identifier (e.g., string) with one or more named arguments, which parameterize the goal. As an example and not by way of limitation, a goal with its associated goal argument may be represented as {confirm_artist, args:{artist: "Madonna"}}. In particular embodiments, a dialog policy may be based on a tree-structured representation, in which goals are mapped to leaves of the tree. In particular embodiments, the dialog manager 335 may execute a dialog policy 345 to determine the next action to carry out. The dialog policies 345 may comprise generic policy 346 and domain specific policies 347, both of which may guide how to select the next system action based on the dialog state. In particular embodiments, the task completion component 340 of the action execution module 226 may communicate with dialog policies 345 comprised in the dialog arbitrator 216 to obtain the guidance of the next system action. In particular embodiments, the action selection component 341 may therefore select an action based on the dialog intent, the associated content objects, and the guidance from dialog policies 345.

In particular embodiments, the output of the action execution module 226 may be sent to the remote response execution module 232. Specifically, the output of the task completion component 340 of the action execution module 226 may be sent to the CU composer 355 of the response execution module 226. In alternative embodiments, the selected action may require one or more agents 350 to be involved. As a result, the task completion module 340 may inform the agents 350 about the selected action. Meanwhile, the dialog manager 335 may receive an instruction to update the dialog state. As an example and not by way of limitation, the update may comprise awaiting agents' 350 response. In particular embodiments, the CU composer 355 may generate a communication content for the user using a natural-language generator (NLG) 356 based on the output of the task completion module 340. In particular embodiments, the NLG 356 may use different language models and/or language templates to generate natural language outputs. The generation of natural language outputs may be application specific. The generation of natural language outputs may be also personalized for each user. The CU composer 355 may also determine a modality of the generated communication content using the UI payload generator 357. Since the generated communication content may be considered as a response to the user request, the CU composer 355 may additionally rank the generated communication content using a response ranker 358. As an example and not by way of limitation, the ranking may indicate the priority of the response.

In particular embodiments, the response execution module 232 may perform different tasks based on the output of the CU composer 355. These tasks may include writing (i.e., storing/updating) the dialog state 361 retrieved from data store 212 and generating responses 362. In particular embodiments, the output of CU composer 355 may comprise one or more of natural-language strings, speech, actions with parameters, or rendered images or videos that can be displayed in a VR headset or AR smart glass. As a result, the response execution module 232 may determine what tasks to perform based on the output of CU composer 355. In particular embodiments, the generated response and the communication content may be sent to the local render output module 242 by the response execution module 232. In alternative embodiments, the output of the CU composer 355 may be additionally sent to the remote TTS module 238 if the determined modality of the communication content is audio. The speech generated by the TTS module 238 and the response generated by the response execution module 232 may be then sent to the render output module 242.

Figure 4:
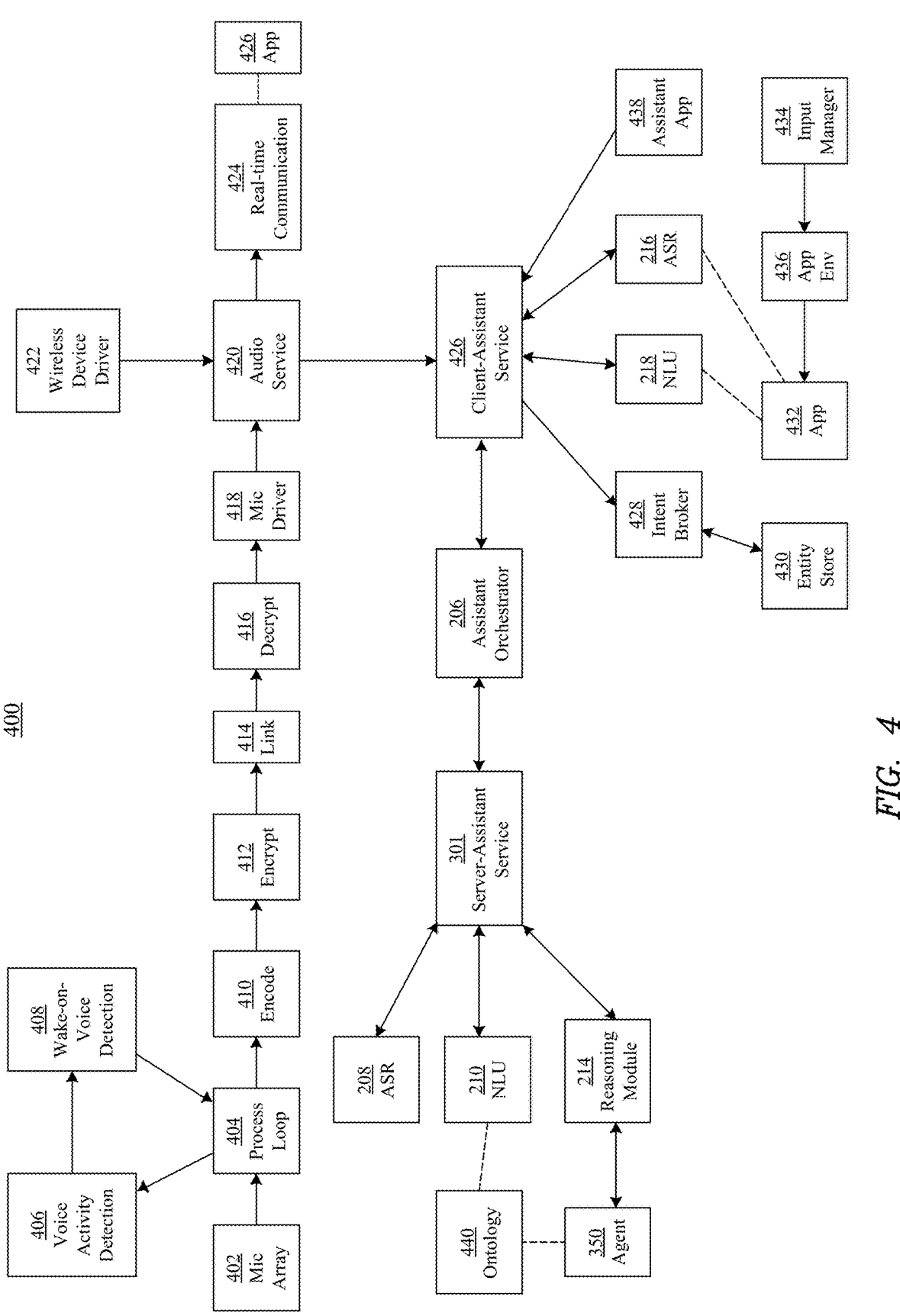
FIG. 4 illustrates an example flow diagram of processing a user input by the assistant system.

FIG. 4 illustrates an example diagram flow of processing a user input by the assistant system 140. As an example and not by way of limitation, the user input may be based on audio signals. In particular embodiments, a mic array 402 of the client system 130 may receive the audio signals (e.g., speech). The audio signals may be transmitted to a process loop 404 in a format of audio frames. In particular embodiments, the process loop 404 may send the audio frames for voice activity detection (VAD) 406 and wake-on-voice (WoV) detection 408. The detection results may be returned to the process loop 404. If the WoV detection 408 indicates the user wants to invoke the assistant system 140, the audio frames together with the VAD 406 result may be sent to an encode unit 410 to generate encoded audio data. After encoding, the encoded audio data may be sent to an encrypt unit 412 for privacy and security purpose, followed by a link unit 414 and decrypt unit 416. After decryption, the audio data may be sent to a mic driver 418, which may further transmit the audio data to an audio service module 420. In alternative embodiments, the user input may be received at a wireless device (e.g., Bluetooth device) paired with the client system 130. Correspondingly, the audio data may be sent from a wireless-device driver 422 (e.g., Bluetooth driver) to the audio service module 420. In particular embodiments, the audio service module 420 may determine that the user input can be fulfilled by an application executing on the client system 130. Accordingly, the audio service module 420 may send the user input to a real-time communication (RTC) module 424. The RTC module 424 may deliver audio packets to a video or audio communication system (e.g., VOIP or video call). The RTC module 424 may call a relevant application (App) 426 to execute tasks related to the user input.

In particular embodiments, the audio service module 420 may determine that the user is requesting assistance that needs the assistant system 140 to respond. Accordingly, the audio service module 420 may inform the client-assistant service module 426. In particular embodiments, the client-assistant service module 426 may communicate with the assistant orchestrator 206. The assistant orchestrator 206 may determine whether to use client-side process or server-side process to respond to the user input. In particular embodiments, the assistant orchestrator 206 may determine to use client-side process and inform the client-assistant service module 426 about such decision. As a result, the client-assistant service module 426 may call relevant modules to respond to the user input.

In particular embodiments, the client-assistant service module 426 may use the local ASR module 216 to analyze the user input. The ASR module 216 may comprise a grapheme-to-phoneme (G2P) model, a pronunciation learning model, a personalized language model (PLM), an end-pointing model, and a personalized acoustic model. In particular embodiments, the client-assistant service module 426 may further use the local NLU module 218 to understand the user input. The NLU module 218 may comprise a named entity resolution (NER) component and a contextual session-based NLU component. In particular embodiments, the client-assistant service module 426 may use an intent broker 428 to analyze the user's intent. To be accurate about the user's intent, the intent broker 428 may access an entity store 430 comprising entities associated with the user and the world. In alternative embodiments, the user input may be submitted via an application 432 executing on the client system 130. In this case, an input manager 434 may receive the user input and analyze it by an application environment (App Env) module 436. The analysis result may be sent to the application 432 which may further send the analysis result to the ASR module 216 and NLU module 218. In alternative embodiments, the user input may be directly submitted to the client-assistant service module 426 via an assistant application 438 executing on the client system 130. Then the client-assistant service module 426 may perform similar procedures based on modules as aforementioned, i.e., the ASR module 216, the NLU module 218, and the intent broker 428.

In particular embodiments, the assistant orchestrator 206 may determine to user server-side process. Accordingly, the assistant orchestrator 206 may send the user input to one or more computing systems that host different modules of the assistant system 140. In particular embodiments, a server-assistant service module 301 may receive the user input from the assistant orchestrator 206. The server-assistant service module 301 may instruct the remote ASR module 208 to analyze the audio data of the user input. The ASR module 208 may comprise a grapheme-to-phoneme (G2P) model, a pronunciation learning model, a personalized language model (PLM), an end-pointing model, and a personalized acoustic model. In particular embodiments, the server-assistant service module 301 may further instruct the remote NLU module 210 to understand the user input. In particular embodiments, the server-assistant service module 301 may call the remote reasoning model 214 to process the output from the ASR module 208 and the NLU module 210. In particular embodiments, the reasoning model 214 may perform entity resolution and dialog optimization. In particular embodiments, the output of the reasoning model 314 may be sent to the agent 350 for executing one or more relevant tasks.

In particular embodiments, the agent 350 may access an ontology module 440 to accurately understand the result from entity resolution and dialog optimization so that it can execute relevant tasks accurately. The ontology module 440 may provide ontology data associated with a plurality of predefined domains, intents, and slots. The ontology data may also comprise the structural relationship between different slots and domains. The ontology data may further comprise information of how the slots may be grouped, related within a hierarchy where the higher level comprises the domain, and subdivided according to similarities and differences. The ontology data may also comprise information of how the slots may be grouped, related within a hierarchy where the higher level comprises the topic, and subdivided according to similarities and differences. Once the tasks are executed, the agent 350 may return the execution results together with a task completion indication to the reasoning module 214.

The embodiments disclosed herein may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Stylizing Text-to-Speech (TTS) Voice Response for Assistant Systems

In particular embodiments, the assistant system may utilize an interactive text-to-speech (TTS) process based on prosody transfer, in which a user's speech style is detected and responded to appropriately during conversations involving machine-generated speech. Machine-generated speech is usually monotonic and out of context, functioning much like an answering machine—the output being delivered in the same style, regardless of the tone/speed/volume of the user. However, stylizing that machine-generated speech may enable users to experience a more natural interaction with an assistant system, thus reducing fatigue and building trust. Accordingly, style embeddings may be extracted from a user's audio query and/or from corresponding response text, to build a customized TTS voice that matches or otherwise corresponds to the style of the speaking user based on various inputs (e.g., the user's audio input, background noise, time, etc.).

With increasing interests in interactive speech systems, speech emotion recognition and multi-style text-to-speech (TTS) synthesis are becoming increasingly important. Thus, the extracted style embeddings may be applied to a customized TTS voice so that the TTS response matches or otherwise corresponds to a speaking style of the input query. In particular embodiments, a multi-modal style classification model is trained using acoustic and textual features of speech utterances. In cases where there is a limited amount of labeled data, an emotional recognition dataset (e.g., the interactive emotional dyadic motion capture database (IEMOCAP)) may be combined with a small labeled subset of internal TTS dataset for style model training. As an example and not by way of limitation, a softmax layer from the style classifier may generate a style prediction, and this style embedding extraction model may then be applied to generate soft style labels for an unlabeled internal TTS dataset. With this semi-supervised approach, reliable style embeddings may be extracted to train the multi-style TTS system. This controllable multi-style TTS system may thus generate responses with particular features depending on a given target style embedding, which may be extracted from the input query or manually assigned. Although this disclosure describes particular types of data and models, this disclosure contemplates the use of any suitable types of data and models.

In particular embodiments, when a voice input is received from a user, a first style of the voice input may be determined, based on first features extracted from the voice input. Subsequently, a second style for a voice response having second features may be selected based on the first style. Finally, the voice response may be generated based on the second features of the second style, and the voice response may be provided in response to the voice input.

In particular embodiments, the assistant system 140 may extract style embeddings from the voice input itself (such as a user query) and/or from generated response text, to build a customized TTS voice that matches or otherwise corresponds to the style of the speaking user based on various inputs (such as the user's audio input, background noise, time, etc.). Extraction of style embeddings may be done through machine learning models that are trained on a diverse dataset from a variety of speakers and speaking conditions. After training the style embedding, a TTS voice may be trained alone with that style embedding to allow disentangling of speech content and style. Once trained, the speech system may apply a style detected from a user query to a customized TTS voice that may thus respond in a style appropriate to the detected style. Particular styles may be either suppressed or boosted depending on the context of the input speech. For example, if a user shouts a question, due to, for example, a high level of background noise, the assistant system may determine to mirror the user's style in order to enable them to hear the response, and this response may thus be shouted back. On the other hand, if the user shouts a question or otherwise asks the question in an angry style, a different style may be selected rather than mirroring the angry style of the user; for example, the response may be delivered in a calm or neutral style.

Speech style classification may be performed with a multimodal dual recurrent encoder (MDRE) model having two separate recurrent encoders, one for audio and one for text. The audio encoder may take MFCC features and prosody features as inputs, while the text encoder may take token representations of the utterance as input. Output from the audio encoder may then be concatenated with output from the text encoder and fed into a fully connected layer of the MDRE model to produce the final style classification.

A TTS pipeline may contain a frontend, prosody models, acoustic models, and neural vocoders to analyze and synthesize speech. The frontend may determine text from input speech, while the prosody models may detect linguistic features such as duration and frequency. Acoustic models, such as those using MFCC, may determine the spoken words, and neural vocoders may output a speech waveform. Typically, the prosody models merely detect duration and frequency of an utterance; however, the present system adds a standalone style extraction unit, which may be added between the duration and frequency detection to further detect emotional features of the utterance, thus separating speech style modeling from speech audio modeling. Each model in the TTS pipeline takes as input the output of the previous model. However, the components with the most influence during training are the duration and frequency determiners within the prosody model; accordingly, the style extraction unit may be added to the prosody model, though it could be added directly to the acoustic model or to any subsequent model. Any subsequent models are still influenced by the style extraction even when added to the prosody model, however, as this affects the inputs of all downstream models. Finally, the style embedding may be added into the output to change or personalize the style of the actual output speech.

In a particular embodiment, the style of both the detected speech and output speech may correspond to characteristics of speech having a certain emotion label. For instance, for a "neutral" style of speech, audio features such as the volume, emphasis, and frequency of the speech may be different than the volume, emphasis, and frequency features of a "happy"

style of speech. Additionally, in the final production of output speech, other user-specific customizations may be added in addition to the style, such as mirroring a user's register (i.e., pronunciation or accent—for example, the output may choose between a British or an American accent). Customizing a voice response based on the user's register is described in U.S. patent application Ser. No. 15/966,455, filed 30 Apr. 2018, which is incorporated herein by reference. Additional factors may further be considered in customizing the final output, such as a level of background noise.

INTRODUCTION

Speech is a crucial part of human-computer interactions and high-quality TTS synthesis plays an important role in mimicking natural human communications. With recent technology advancements in speech synthesis [1-3], TTS systems can achieve near human quality [4]. One popular topic in recent research of TTS is expressive TTS, which is aiming at achieving controllable style synthesis in TTS [5-7]. To avoid the difficulty of hand-labeling prosody and speaking style, style embeddings may be extracted using a style encoder and concatenated with textual features, to guide the attention module of the synthesizer during training/inference [5, 6]. Latent styles may also be factorized using a token table, and results (discussed further below) have shown that the factorized styles are very different and of good quality [7].

These prosody transfer methods may be used to create an interactive TTS system mimicking the style of the input audio query. However, to learn specific styles, there are limitations with unsupervised style factorization learning [7]. Since the disentanglement of different styles is heavily influenced by randomness and the choice of hyper-parameters [8], the learning of target styles may not be controllable. Accordingly, to have interpretable representation learning, some (at least weak) supervision is in need [8]. Under supervision with explicit prosody labels, the styles may be learned with clear guidance [9, 10]. However, supervised learning requires a large amount of labeled data, making development of expressive TTS research and applications difficult.

In [11], an external dataset IEMOCAP [12] is used to train an emotion classifier, and the trained model is then employed to label previously unlabeled TTS training data (Blizzard 2017 [13]). Such an approach enables automatic emotion labeling of the unlabeled dataset production of a controllable TTS. However, the external dataset IEMOCAP and the synthesis dataset of Blizzard 2017 [13] have significant differences in background noise, recording environment, speech quality, etc. With the differences between these two databases, classifiers trained using an external dataset may not be well-adapted to extract representations from the synthesis data. In their study, the emotion classification accuracy on the external dataset is 62.9% on four emotion classes, compared to 72% of the current state-of-the-art [14]. The final emotion synthesis accuracy is 41% on four emotions [11] evaluated by listeners, while the human judgment accuracy on emotions in real speech is around 50% reported in [11, 15]. Since there are no emotion labels on the synthesis dataset of Blizzard 2017, the prediction accuracy of the TTS data cannot be directly evaluated.

Accordingly, a particular embodiment involves a semi-supervised approach to learn reliable style representation on the synthesis dataset. Apart from making use of the external IEMOCAP database to help the learning on four emotion classes as in [11], an improvement of the transfer learning effect using the labeled subset of a TTS dataset is offered by this semi-supervised approach. To increase the quality of the learned style representation and create a more reliable style embedding in the expressive TTS training, the IEMOCAP dataset may be combined with a labeled subset of an internal dataset to create a joint dataset and train a multi-modal style classification model using this joint dataset. Taking the softmax layer of the style classifier as style embedding, the classifier may serve as a style embedding extraction model, which then generates style embeddings for the unlabeled internal TTS dataset. By using the style embeddings as additional auxiliary features for the TTS system, a controllable multi-style TTS system that learns to respect given target styles may be trained. During speech synthesis, style embeddings may be extracted from the input speech query and fed into the TTS system, which may then produce its response in a style corresponding to, such as matching, the input query. As a result, this novel multi-style TTS system may enable natural, expressive human-machine speech interactions. The multi-style TTS system may then be evaluated using comprehensive subjective experiments (discussed below).

Expressive TTS

Expressive TTS has been studied for years, from the HMM-based synthesis using style modeling with control vector [16-18] to the state-of-the-art prosody transfer expressive TTS work [5-7]. In [7], a token table is learned through the "style token layer" to represent a variety of prosodic dimensions. Furthermore, controllable TTS is discussed in [10] for emotion nuances style learning. In [11], an external dataset is used to assist the learning of control dimensions in the TTS dataset. These existing systems rely on statistical parametric speech synthesis (SPSS) with the control vector as an auxiliary input feature to drive the expressive TTS system.

Emotion Recognition

Early approaches on emotion recognition mostly have been inspired by psychology studies [19, 20]. Recently, deep neural networks (DNNs) have been used to learn high-level representations for utterance-level emotion recognition [21]. Trigeorgis et al. further applied convolutional neural networks (CNNs) to model context-aware emotion-relevant features, which are then combined with long term-short memory (LSTM) networks aiming towards end-to-end emotion modeling [22]. Fundamentally, the expression of emotions is usually conveyed through multi-modal behavior channels, including speech, language, body gestures, or facial expressions. Thus, emotion recognition is often formulated as a classification problem of utterances using these multi-modal signals. [14] proposed a multi-modal dual recurrent encoder to simultaneously model the dynamics of both text and audio signals within an utterance to predict emotion classes. This architecture has achieved state-of-the-art performance on the IEMOCAP [12] dataset, which is a multi-modal emotion dataset and has been widely used in the affective computing community. The present style classifier/recognizer is further builds on this architecture.

Semi-Supervised Style Learning

Figure 5:
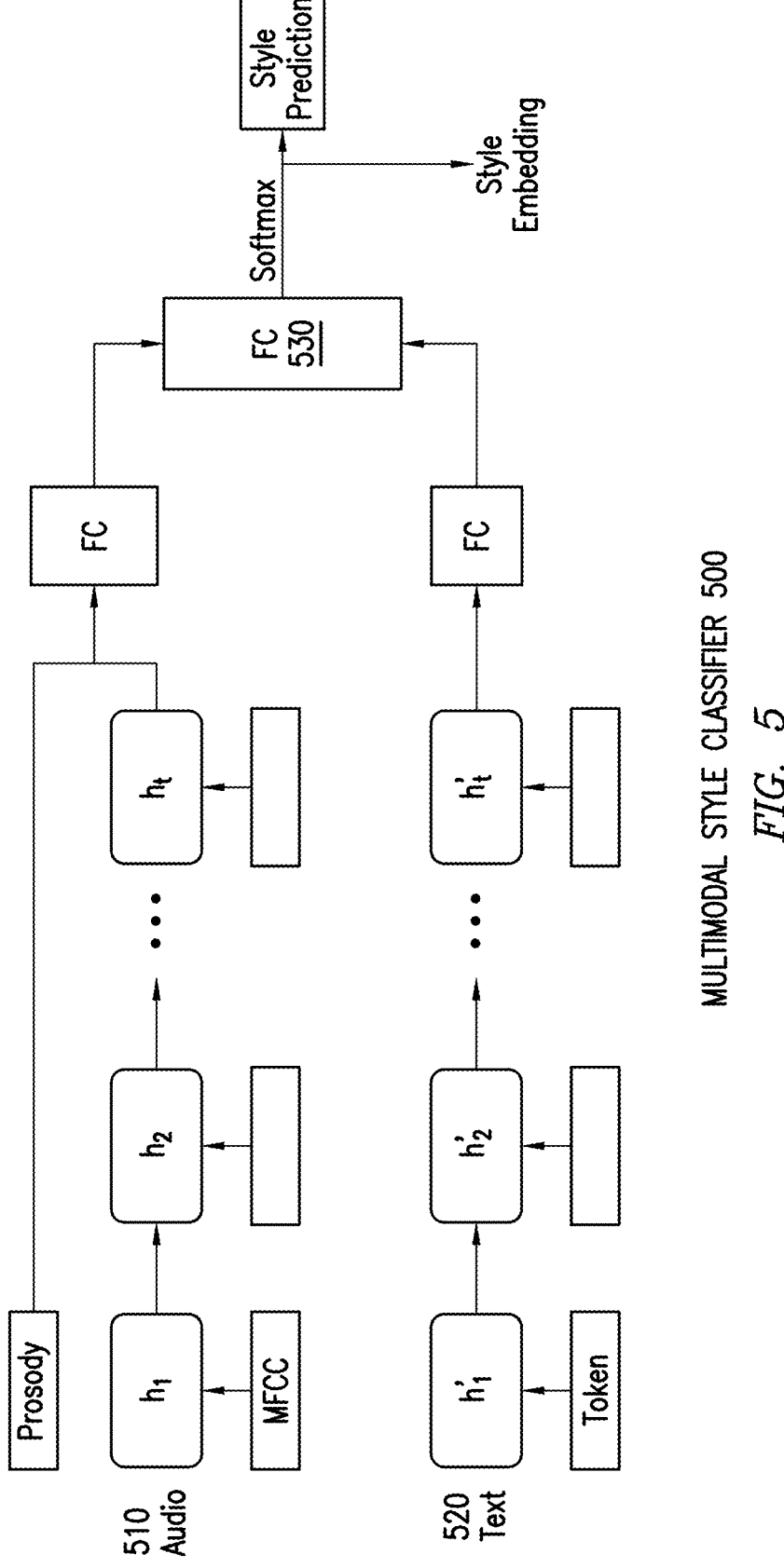
FIG. 5 illustrates a multi-modal style classifier for speech style classification.

The multimodal dual recurrent encoder (MDRE) model 500 used for speech style classification may be adapted from the state-of-the-art emotion recognition model introduced in [14]. As shown in FIG. 5, the model is composed of two separate recurrent encoders 510 and 520 for audio and text modeling, respectively. The audio model 510 may use Mel-frequency Cepstral Coefficients (MFCC) features and utterance level prosody features as inputs, and the text model

520 may use token representations, as described in [14]. Extracted features may be fed into the model to generate internal hidden states $h_t$ that model time series patterns at each time step of the MFCC or text token, as described in [14]. The audio encoder output may be concatenated with the text encoder output and then fed into a fully-connected layer 530 to produce the final classification/style prediction. A loss function based on softmax cross-entropy may produce significantly better results for training tasks, as illustrated by the results described below.

Since the internal dataset is only partially labeled, the semi-supervised style classifier 500 may be trained using the labeled portions, and then the rest of the dataset's style embeddings may be inferred using this style classifier. Experiments comparing style embeddings for 1) the bottleneck layer feature before the final prediction, and 2) the final softmax features show that the softmax layer output may work better. This feature also has the added advantage that it may be interpreted as a probability representation of different speaking styles. As shown in FIG. 5, the softmax feature may be a style embedding.

Style Embedded TTS System

Figure 6:
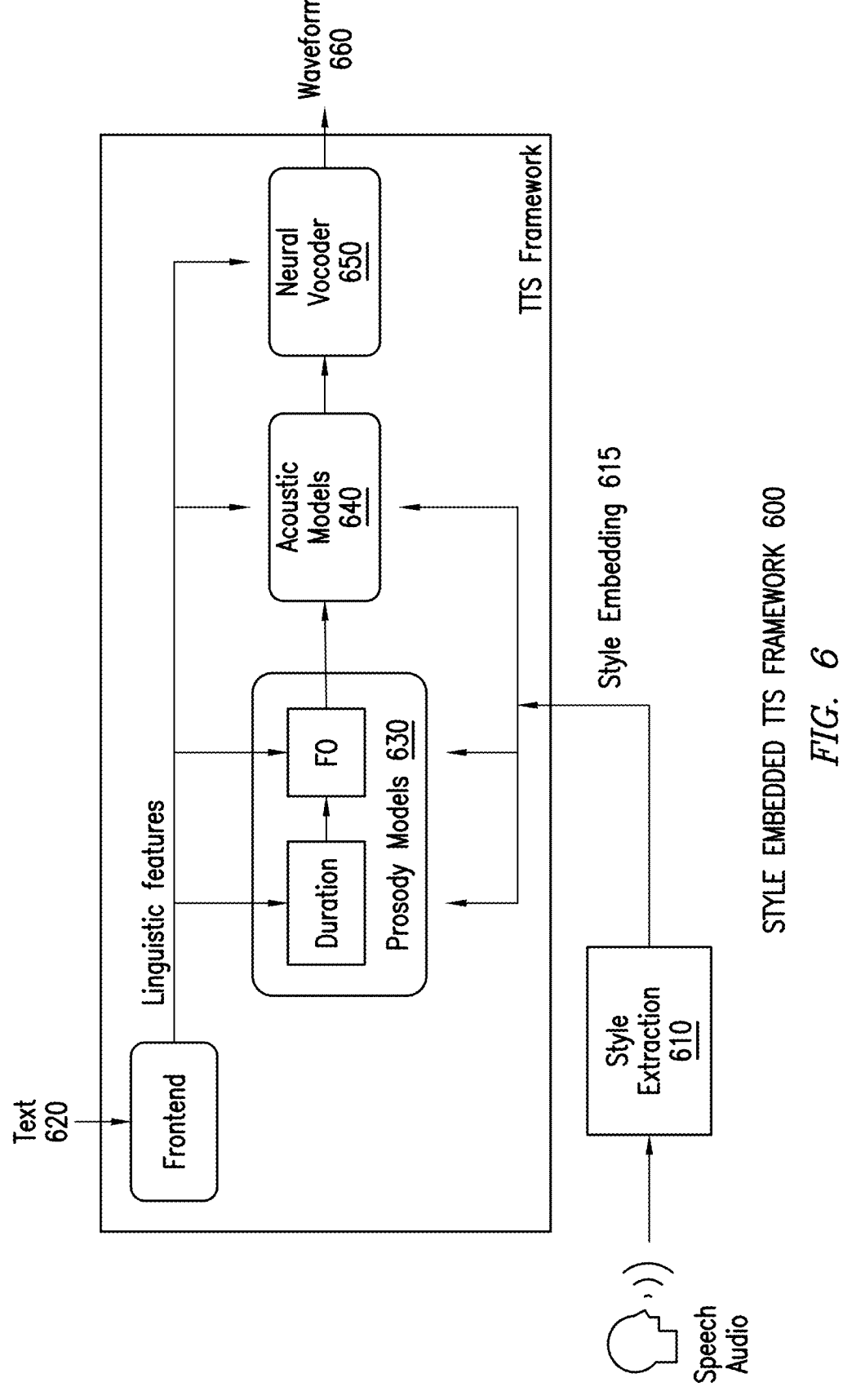
FIG. 6 illustrates a TTS framework using style embeddings.

FIG. 6 illustrates the TTS framework 600 and architecture of an expressive TTS system using style embeddings. A standalone style embedding extraction component 610 may generate a style embedding 615 from audio input, and the TTS framework 600 may then take the style embedding 615 as input and synthesize the response in a matching or otherwise corresponding style appropriate to the style embedding of the audio input.

As shown in FIG. 6, the present TTS pipeline is a multi-model framework that may include a text-processing frontend 620, a set of prosody models 630, acoustic models 640, and a neural vocoder 650. In controllable expressive speech synthesis, this framework offers the advantage of separating speech style modeling from speech audio modeling. Specifically, the input text may first be converted to linguistic features. Then, the linguistic features, along with any conditional features such as style embedding 615 or speaker ID, may be used to produce the prosody features, such as duration and F0. Linguistic features combined with prosody features may then be used to generate spectral acoustic features and, at the last stage, conditional neural vocoder 650 takes in the spectral features to synthesize an output audio waveform 660. Additionally or alternatively, the linguistic features and style embedding 615 may be input directly into acoustic models 640, along with output of prosody models 630. The speaking style of the output synthesized speech may be controlled by the conditional style embedding feature. During inference, the style classifier may be used to extract the style embedding 615 from a short speech segment, either from the input query or manually assigned; this speech segment may be the input utterance itself from the user.

Datasets

Internal Dataset

An internal TTS dataset recorded in a voice production studio by multiple professional voice talents has balanced phonemic and textual information, and its sampling rate is 48 kHz. Only a small subset of the internal dataset may have style labels. In addition to the IEMOCAP styles, the internal data may have two additional styles: fast and soft. Details of the data are summarized in Table 1. These utterances of the professional voice talents may be used to train a multi-speaker style classifier. During the synthesis, only one speaker's voice is used; this may involve, for example, 40,244 utterances, with only around 3000 utterances labeled.

The style representations are extracted from the rest of this unlabeled single speaker dataset and may be used in the TTS training.

TABLE 1

| Total dataset style labels statistics | | | | | | | |
| --- | --- | --- | --- | --- | --- | --- | --- |
| Dataset | Split | Fast | Soft | Neutral | Happy | Angry | Sad |
| Internal | Train | 1145 | 1814 | 4481 | 885 | 140 | 35 |
| | Dev | 105 | 161 | 439 | 79 | 13 | 3 |
| | Test | 124 | 220 | 506 | 93 | 17 | 2 |
| | All | 1374 | 2195 | 5426 | 1057 | 170 | 40 |
| IEMOCAP | Train | — | — | 1390 | 1307 | 865 | 883 |
| | Dev | — | — | 100 | 90 | 61 | 62 |
| | Test | — | — | 218 | 239 | 177 | 139 |
| | All | — | — | 1708 | 1636 | 1103 | 1084 |

IEMOCAP Dataset

The open-source dataset IEMOCAP [12], widely used for emotion recognition, may be used to complement a limited amount of labeled training data in an internal dataset. The IEMOCAP dataset includes both video and audio recorded from a number (for example, ten) of actors in dyadic sessions under both scripted and spontaneous communication scenarios. The database may contain, for example, 12.5 hours of recordings with a sampling rate of 22 kHz. It includes utterance-wise emotion labels such as neutral, happy, sad, anger, surprise, etc. Consistent with former research [11, 14], the following emotions may be selected: neutral, happy, sad, and/or angry. Similar to the approach in [14], utterances may be merged, such as merging utterances with excited emotions with those of happy emotions.

Implementation Details

The present style classification model may be adapted from [14] and is shown in FIG. 5. In one example, a batch normalization layer may be set with, for example, 0.9 momentum to help cross-domain adaptation. To compensate for any imbalance among style labels, the by-class loss function and the per-class accuracy may be weighted with an inverse of style label prior; the neutral label prior may be capped, at, for example, 0.25. In addition, AdaBN [23] may be implemented in this model to boost domain adaptation performance between the internal and external datasets.

The multi-style TTS system may be trained using the internal dataset with style embedding features as conditional input features. Style embedding labels may be generated by passing each utterance through the style classification model as described above with respect to the semi-supervised learning. In the synthesis phase, the style embedding features may be automatically extracted from the input query or manually assigned as a combination of different styles.

Results

Style Classification

Figure 7A:
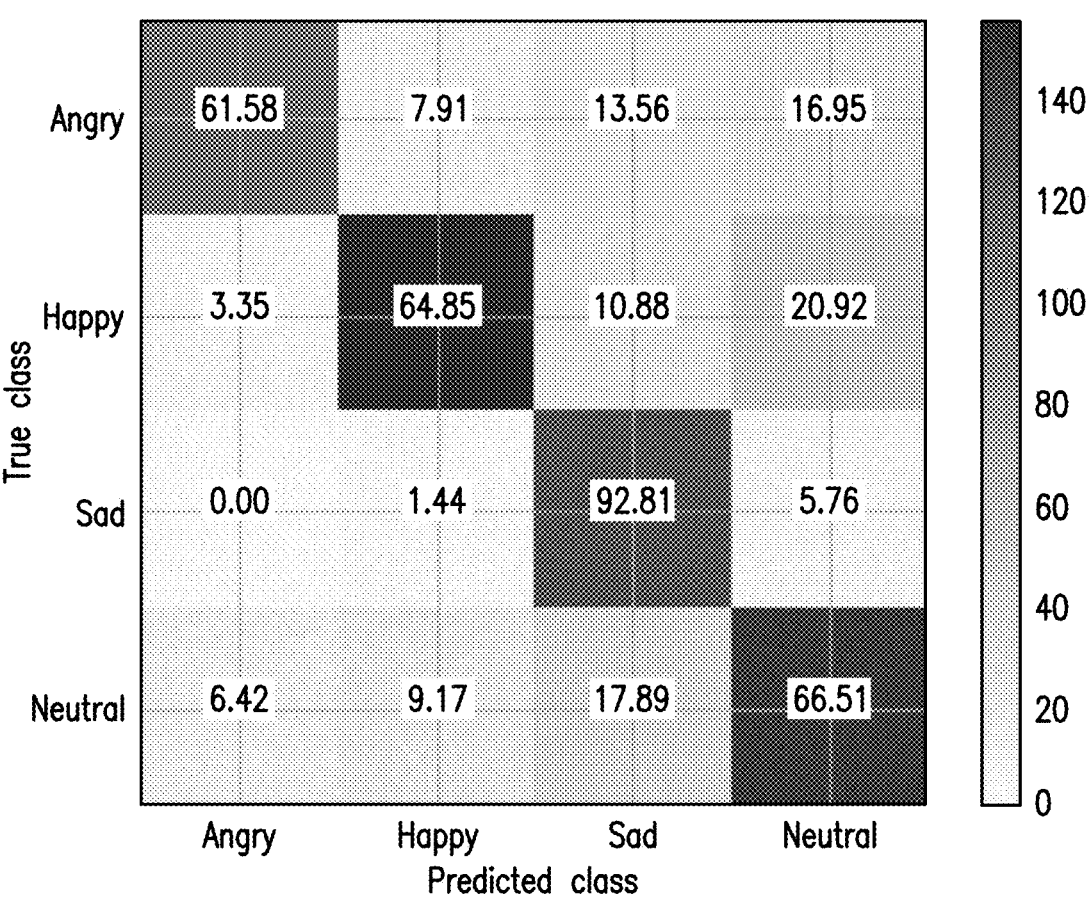
FIGS. 7A-7B illustrate confusion matrices for the performance of a style classifier on various datasets.
Figure 7B:
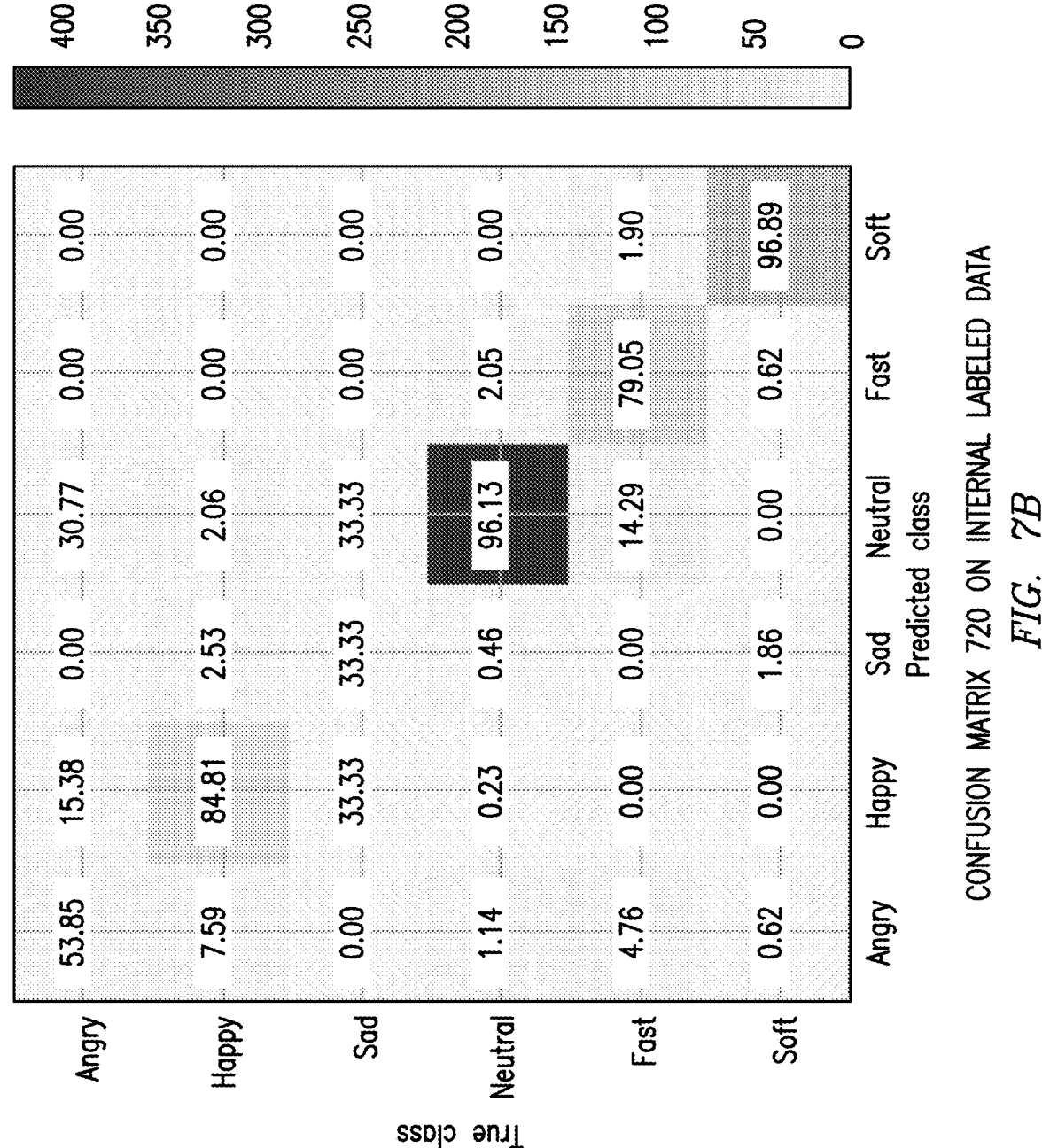

FIGS. 7A-7B illustrate confusion matrices for the performance of a style classifier on various datasets. These may be validation data sets. In testing a style classification task, the style classifier's model performance was tested on the IEMOCAP train/test split. It achieved an overall accuracy of 72.7%, which is similar to the reported state-of-the-art [14]. The confusion matrix 710 of this test is shown in FIG. 7A. To improve the embedding quality on the internal dataset, the IEMOCAP dataset and the labeled subset of the internal dataset were then combined during training. The style classifier then achieved 91.4% overall accuracy and 71.5% weighted accuracy on the internal labeled dataset. FIG. 7B shows the confusion matrix 720 of the internal dataset validation set. As can be seen, the number of utterances among different classes is unbalanced, with the neutral class having the greatest number of utterances, as shown in Table 1. With a lack of labelled data in anger and sadness in the internal dataset, the prediction accuracy of these two classes was not high. The style classification accuracy decreased slightly on the IEMOCAP dataset after joint training, likely due to mismatch between the internal and IEMOCAP datasets.

To choose the best input features, feature normalization experiments were also performed. The normalization may be done corpus-wise to compensate for the domain difference between our internal dataset and the IEMOCAP database. Table 3 shows that normalizing both MFCC and prosody provided the best classification accuracy on the internal dataset's validation set. Thus, in the final model, both MFCC features and prosody features were normalized. The final classification accuracy for the internal dataset is illustrated in Table 2.

Multi-Style TTS with Conditional Style Embedding

To evaluate expressive TTS performance, subjective evaluation responses were collected from 22 subjects. As reported in [11, 15, 24], human perception of the emotions of natural speech is only around 50%, showing the ambiguity of emotion perception. Hence, instead of evaluating the subjective emotion accuracy on the multi-style synthesis results, an ABX test and preference test were performed. The demo page for these synthesis results is at [25]. Table 2. Style classification on internal data

TABLE 5

| TTS data FO statistics | | |
| --- | --- | --- |
| Style | F0 | Count |
| Angry | 195.5 ± 30.8 | 6817 |
| Happy | 214.8 ± 37.3 | 3576 |
| Sad | 197.3 ± 30.8 | 5137 |
| Neutral | 183.7 ± 10.3 | 16431 |
| Fast | 181.9 ± 12.8 | 5579 |
| Soft | 180.5 ± 14.7 | 2704 |

ABX Test and Preference Score

The ABX test was designed as follows. With two different styles, an example from each style was randomly chosen. These two examples will be referred to as A and B. A different sample X from one of these two styles was also chosen; this will be referred to as the reference style. A listener decided which of A or B has the same style as the reference style. Fifteen such tests were prepared. The aggregated results gave an 82.42% accuracy, showing that styles can be distinguished between classes. For the preference score test, the listeners were asked to choose between three styles synthesized with the same text: baseline TTS model (i.e., TTS without style embedding), neutral style, and other hand-chosen styles. As in the conclusion in [11], the listeners preferred appropriate variation over random variation. Thus, soft style labels (rather than neutral style) were manually assigned during inference to accompany the text information in the corresponding utterance. The evaluation results are

TABLE 2

| Style classification on internal data | | | | | | | | | |
| --- | --- | --- | --- | --- | --- | --- | --- | --- | --- |
| | | | | | | | | Accuracy | |
| Dataset | Trick | Neutral | Fast | Soft | Happy | Angry | Sad | Weighted | Unweighted |
| Train | BN | 0.984 | 0.871 | 0.964 | 0.892 | 0.176 | 0.0 | 0.779 | 0.973 |
| | AdaBN | 0.953 | 0.847 | 0.918 | 0.903 | 0.353 | 0.0 | 0.915 | 0.957 |
| Dev | BN | 0.979 | 0.819 | 0.994 | 0.81 | 0.385 | 0.0 | 0.686 | 0.931 |
| | AdaBN | 0.927 | 0.8 | 0.963 | 0.873 | 0.538 | 0.333 | 0.766 | 0.904 |
| Test | BN | 0.984 | 0.871 | 0.964 | 0.892 | 0.176 | 0.0 | 0.683 | 0.940 |
| | AdaBN | 0.953 | 0.847 | 0.918 | 0.903 | 0.353 | 0.0 | 0.715 | 0.914 |

TABLE 3

| Feature selection | | |
| --- | --- | --- |
| | | Accuracy |
| Features | Weighted | Unweighted |
| Unnormalized | 0.726 | 0.875 |
| Normalized MFCC | 0.673 | 0.84 |
| Normalized prosody | 0.494 | 0.62 |
| Normalized both | 0.766 | 0.904 |

TABLE 4

| Subjective Preferences | | | |
| --- | --- | --- | --- |
| | Baseline | Neutral Style | Other Styles |
| Preference (%) | 28.0 | 54.2 | 17.8 | shown in Table 4. The present neutral style was the best accepted by the listeners, illustrating that training the TTS with style labels can improve the quality of synthesis results. However, the other hand-picked styles were not best-accepted by the listeners, who referred to the neutral style as more peaceful and relaxing, which might be influenced by the frequency (F0) preference. This may be further improved by disentangling F0 from prosody variation.

Multi-Style Response to Real Life Input Query

Experiments to evaluate the generalization capacity of the close-loop style extraction and multi-style TTS system were conducted. Speech queries from multiple speakers were recorded by letting them read the queries freely in a conference room. Then, TTS responses for each query were generated by conditioning on its corresponding style embedding.

Ten query/responses pairs were randomly. Listeners were permitted to compare the multi-style TTS responses with the baseline TTS responses, and to select which response's style matched the input query better. Results showed that over 40% of test pairs had a more than 60% matching rate; 10% of test pairs had a less than 40% matching rate; and 50% had around a 50% matching rate. When the speaking style of the input query is strong, the TTS response is thus able to match the input style to a certain extent. Samples are at [25].

CONCLUSIONS

In conclusion, a controllable expressive TTS system has the potential to synthesize a voice response matching the speaking style of the input query. This controllable expressive TTS system may be composed of a multi-modal style classifier and a neural-network-based TTS system. The style classifier may be jointly trained using a labeled internal data and the IEMOCAP open source database. With a limited amount of style labeled TTS data, a semi-supervised approach to train the TTS system may be used, such that controllable multi-style TTS responses may be generated in a reliable manner.

REFERENCES

The following references correspond to the citations above:

[1] Aaron van den Oord, Sander Dieleman, Heiga Zen, Karen Si-monyan, Oriol Vinyals, Alex Graves, Nal Kalchbrenner, Andrew Senior, and Koray Kavukcuoglu, "Wavenet: A generative model for raw audio," *arXiv preprint arXiv:*1609.03499, 2016.

[2] Dzmitry Bahdanau, Kyunghyun Cho, and Yoshua Bengio, "Neural machine translation by jointly learning to align and translate," *arXiv preprint arXiv:* 1409.0473, 2014.

[3] Ashish Vaswani, Noam Shazeer, Niki Parmar, Jakob Uszko-reit, Llion Jones, Aidan N Gomez, Lukasz Kaiser, and Illia Polosukhin, "Attention is all you need," in *Advances in neural information processing systems,* 2017, pp. 5998-6008.

[4] Jonathan Shen, Ruoming Pang, Ron J Weiss, Mike Schuster, Navdeep Jaitly, Zongheng Yang, Zhifeng Chen, Yu Zhang, Yuxuan Wang, Rj Skerrv-Ryan, et al., "Natural tts synthesis by conditioning wavenet on mel spectrogram predictions," in 2018 *IEEE International Conference on Acoustics, Speech and Signal Processing (ICASSP).* IEEE, 2018, pp. 4779-4783.

[5] Yuxuan Wang, RJ Skerry-Ryan, Ying Xiao, Daisy Stanton, Joel Shor, Eric Battenberg, Rob Clark, and Rif A Saurous, "Uncovering latent style factors for expressive speech synthesis," *arXiv preprint arXiv:* 1711.00520, 2017.

[6] RJ Skerry-Ryan, Eric Battenberg, Ying Xiao, Yuxuan Wang, Daisy Stanton, Joel Shor, Ron J Weiss, Rob Clark, and Rif A Saurous, "Towards end-to-end prosody transfer for expressive speech synthesis with tacotron," *arXiv preprint arXiv:*1803.09047, 2018.

[7] Yuxuan Wang, Daisy Stanton, Yu Zhang, RJ Skerry-Ryan, Eric Battenberg, Joel Shor, Ying Xiao, Fei Ren, Ye Jia, and Rif A Saurous, "Style tokens: Unsupervised style modeling, control and transfer in end-to-end speech synthesis," *arXiv preprint arXiv:*1803.09017, 2018.

[8] Francesco Locatello, Stefan Bauer, Mario Lucic, Sylvain Gelly, Bernhard Schölkopf, and Olivier Bachem, "Challenging common assumptions in the unsupervised learning of disentangled representations," *arXiv preprint arXiv:*1811.12359, 2018.

[9] Noe' Tits, Fengna Wang, Kevin El Haddad, Vincent Pagel, and Thierry Dutoit, "Visualization and interpretation of latent spaces for controlling expressive speech synthesis through audio analysis," *arXiv preprint arXiv:*1903.11570, 2019.

[10] Gustav Eje Henter, Jaime Lorenzo-Trueba, Xin Wang, and Ju-nichi Yamagishi, "Principles for learning controllable tts from annotated and latent variation.," in *INTERSPEECH,* 2017, pp. 3956-3960.

[11] Zack Hodari, Oliver Watts, Srikanth Ronanki, and Simon King, "Learning interpretable control dimensions for speech synthesis by using external data.," in *Interspeech,* 2018, pp. 32-36.

[12] Carlos Busso, Murtaza Bulut, Chi-Chun Lee, Abe Kazemzadeh, Emily Mower, Samuel Kim, Jeannette N Chang, Sungbok Lee, and Shrikanth S Narayanan, "Iemo-cap: Interactive emotional dyadic motion capture database," *Language resources and evaluation, vol.* 42, no. 4, pp. 335, 2008.

[13] Simon King and Vasilis Karaiskos, "The blizzard challenge 2017," in *Proc. Blizzard Challenge,* 2017, vol. 2017, pp. 1-10.

[14] Seunghyun Yoon, Seokhyun Byun, and Kyomin Jung, "Multi-modal speech emotion recognition using audio and text," in 2018 *IEEE Spoken Language Technology Workshop (SLT).* IEEE, 2018, pp. 112-118.

[15] Rainer Banse and Klaus R Scherer, "Acoustic profiles in vocal emotion expression.," *Journal of personality and social psychology,* vol. 70, no. 3, pp. 614, 1996.

[16] Junichi Yamagishi, Koji Onishi, Takashi Masuko, and Takao Kobayashi, "Modeling of various speaking styles and emotions for hmm-based speech synthesis," in Eighth European Conference on Speech Communication and Technology, 2003.

[17] Makoto Tachibana, Junichi Yamagishi, Koji Onishi, Takashi Masuko, and Takao Kobayashi, "Hmm-based speech synthesis with various speaking styles using model interpolation," in *Speech Prosody* 2004*, International Conference,* 2004.

[18] Junichi Yamagishi, Makoto Tachibana, Takashi Masuko, and Takao Kobayashi, "Speaking style adaptation using context clustering decision tree for hmm-based speech synthesis," in 2004 *IEEE International Conference on Acoustics, Speech, and Signal Processing.* IEEE, 2004, vol. 1, pp. I-5.

[19] Chi-Chun Lee, Emily Mower, Carlos Busso, Sungbok Lee, and Shrikanth Narayanan, "Emotion recognition using a hierarchical binary decision tree approach," *Speech Communication,* vol. 53, no. 9-10, pp. 1162-1171, 2011.

[20] Emily Mower, Maja J Mataric, and Shrikanth Narayanan, "A framework for automatic human emotion classification using emotion profiles," *IEEE Transactions on Audio, Speech, and Language Processing,* vol. 19, no. 5, pp. 1057-1070, 2010.

[21] Kun Han, Dong Yu, and Ivan Tashev, "Speech emotion recognition using deep neural network and extreme learning machine," in *Fifteenth annual conference of the international speech communication association,* 2014.

[22] George Trigeorgis, Fabien Ringeval, Raymond Brueckner, Erik Marchi, Mihalis A Nicolaou, Björn Schuller, and Stefanos Zafeiriou, "Adieu features?end-to-end speech emotion recognition using a deep convolutional recurrent network," in 2016 *IEEE international conference on acoustics, speech and signal processing (ICASSP).* IEEE, 2016, pp. 5200-5204.

[23] Yanghao Li, Naiyan Wang, Jianping Shi, Xiaodi Hou, and Ji-aying Liu, "Adaptive batch normalization for practical domain adaptation," *Pattern Recognition*, vol. 80, pp. 109-117, 2018.

[24] Klaus R Scherer, Rainer Banse, Harald G Wallbott, and Thomas Goldbeck, "Vocal cues in emotion encoding and decoding," *Motivation and emotion, vol. 15*, no. 2, pp. 123-148, 1991.

[25] Yang Gao, "Demo for 'interactive text-to-speech via semi-supervised style transfer learning'," https:// github.com/Yolanda-Gao/Interactive-Style-TTS, 2019, Accessed: 2019-10-21.

FIG. 8 illustrates an example method 800 for generating a voice response in a style corresponding to the style of a user query. The method may begin at step 810, where the assistant system 140 may receive a voice input from a user. This voice input may be automatically transcribed into an input text for the TTS system. At step 820, the assistant system 140 may determine a first style of the voice input based on one or more first features extracted from the voice input and/or the input text. Examples of these first features may include volume, emphasis, pronunciation, accent, frequency, or prosody of the voice input. The first style may be determined by a machine learning model. At step 830, a second style having one or more second features may be selected for a voice response based on the first style. This second style may be the same as or different from the first style, and the selection of the second style may be further based on numerous factors, such as an environment of the user (for example, a background noise level), or a time of receipt associated with the voice input. Additionally, multiple potential second styles may be weighted based on the first style, and the second style may be selected from among these potential second styles based on the weights (for example, the selected second style may be the potential second style having the largest weight). At step 840, the assistant system 140 may generate voice response based on one or more of the second features of the second style. The generation of this voice response may involve synthesizing the voice response using a text-to-speech (TTS) pipeline comprising a prosody model and an acoustic model. For instance, the prosody model may access a style embedding corresponding to the second style, and subsequently set the duration and/or the frequency of the voice response based on the style embedding, to generate response prosody features. This style embedding corresponding to the second style may be determined based on the first style. Features of the voice response may further be set based on characteristics of the user, such as demographics or user preferences of the user, and these characteristics may be determined from a profile of the user stored in the social-networking system. Finally, at step 850, the modified voice response is provided to the user in response to the voice input.

Alternatively, a voice response having a default style with one or more default features may be generated after determining the first style of the voice input. The generation of this default voice response may similarly involve synthesizing the voice response using the text-to-speech (TTS) pipeline comprising the prosody model and the acoustic model. For instance, the prosody model may determine a default duration and frequency of the default voice response. Then, the assistant system may modify one or more of the default features of the voice response based on one or more of the second features of the second style, thus generating a modified voice response. The prosody model may access the style embedding corresponding to the second style, and subsequently modify the default duration and/or the frequency of the default voice response based on the style embedding, to generate modified prosody features. Finally, this modified voice response may be provided to the user in response to the voice input.

In particular embodiments, one or more steps of the method of FIG. 8 may be repeated, where appropriate. Further, although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for generating a voice response in a style corresponding to the style of a user query including the particular steps of the method of FIG. 8, this disclosure contemplates any suitable method for generating this stylized voice response, including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Social Graphs

Figure 9:
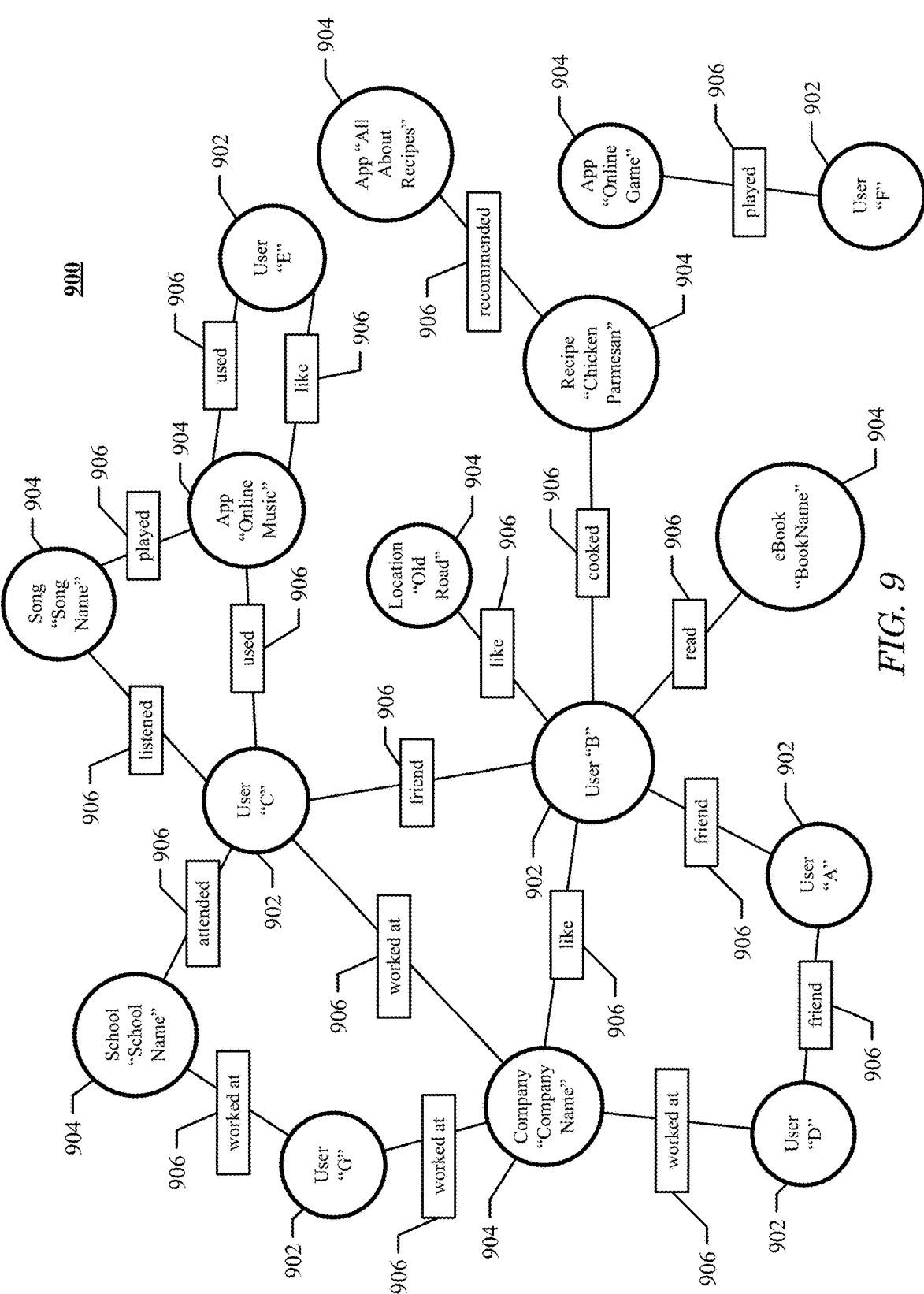
FIG. 9 illustrates an example social graph.

FIG. 9 illustrates an example social graph 900. In particular embodiments, the social-networking system 160 may store one or more social graphs 900 in one or more data stores. In particular embodiments, the social graph 900 may include multiple nodes—which may include multiple user nodes 902 or multiple concept nodes 904—and multiple edges 906 connecting the nodes. Each node may be associated with a unique entity (i.e., user or concept), each of which may have a unique identifier (ID), such as a unique number or username. The example social graph 900 illustrated in FIG. 9 is shown, for didactic purposes, in a two-dimensional visual map representation. In particular embodiments, a social-networking system 160, a client system 130, an assistant system 140, or a third-party system 170 may access the social graph 900 and related social-graph information for suitable applications. The nodes and edges of the social graph 900 may be stored as data objects, for example, in a data store (such as a social-graph database). Such a data store may include one or more searchable or queryable indexes of nodes or edges of the social graph 900.

In particular embodiments, a user node 902 may correspond to a user of the social-networking system 160 or the assistant system 140. As an example and not by way of limitation, a user may be an individual (human user), an entity (e.g., an enterprise, business, or third-party application), or a group (e.g., of individuals or entities) that interacts or communicates with or over the social-networking system 160 or the assistant system 140. In particular embodiments, when a user registers for an account with the social-networking system 160, the social-networking system 160 may create a user node 902 corresponding to the user, and store the user node 902 in one or more data stores. Users and user nodes 902 described herein may, where appropriate, refer to registered users and user nodes 902 associated with registered users. In addition or as an alternative, users and user nodes 902 described herein may, where appropriate, refer to users that have not registered with the social-networking system 160. In particular embodiments, a user node 902 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 902 may be associated with one or more data objects corresponding to information associated with a user. In particular embodiments, a user node 902 may correspond to one or more web interfaces.

In particular embodiments, a concept node 904 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 904 may be associated with information of a concept provided by a user or information gathered by various systems, including the social-networking system 160 and the assistant system 140. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 904 may be associated with one or more data objects corresponding to information associated with concept node 904. In particular embodiments, a concept node 904 may correspond to one or more web interfaces.

In particular embodiments, a node in the social graph 900 may represent or be represented by a web interface (which may be referred to as a "profile interface"). Profile interfaces may be hosted by or accessible to the social-networking system 160 or the assistant system 140. Profile interfaces may also be hosted on third-party websites associated with a third-party system 170. As an example and not by way of limitation, a profile interface corresponding to a particular external web interface may be the particular external web interface and the profile interface may correspond to a particular concept node 904. Profile interfaces may be viewable by all or a selected subset of other users. As an example and not by way of limitation, a user node 902 may have a corresponding user-profile interface in which the corresponding user may add content, make declarations, or otherwise express himself or herself. As another example and not by way of limitation, a concept node 904 may have a corresponding concept-profile interface in which one or more users may add content, make declarations, or express themselves, particularly in relation to the concept corresponding to concept node 904.

In particular embodiments, a concept node 904 may represent a third-party web interface or resource hosted by a third-party system 170. The third-party web interface or resource may include, among other elements, content, a selectable or other icon, or other inter-actable object representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 902 corresponding to the user and a concept node 904 corresponding to the third-party web interface or resource and store edge 906 in one or more data stores.

In particular embodiments, a pair of nodes in the social graph 900 may be connected to each other by one or more edges 906. An edge 906 connecting a pair of nodes may represent a relationship between the pair of nodes. In particular embodiments, an edge 906 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 906 connecting the first user's user node 902 to the second user's user node 902 in the social graph 900 and store edge 906 as social-graph information in one or more of data stores 164. In the example of FIG. 9, the social graph 900 includes an edge 906 indicating a friend relation between user nodes 902 of user "A" and user "B" and an edge indicating a friend relation between user nodes 902 of user "C" and user "B." Although this disclosure describes or illustrates particular edges 906 with particular attributes connecting particular user nodes 902, this disclosure contemplates any suitable edges 906 with any suitable attributes connecting user nodes 902. As an example and not by way of limitation, an edge 906 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 900 by one or more edges 906. The degree of separation between two objects represented by two nodes, respectively, is a count of edges in a shortest path connecting the two nodes in the social graph 900. As an example and not by way of limitation, in the social graph 900, the user node 902 of user "C" is connected to the user node 902 of user "A" via multiple paths including, for example, a first path directly passing through the user node 902 of user "B," a second path passing through the concept node 904 of company "CompanyName" and the user node 902 of user "D," and a third path passing through the user nodes 902 and concept nodes 904 representing school "SchoolName," user "G," company "CompanyName," and user "D." User "C" and user "A" have a degree of separation of two because the shortest path connecting their corresponding nodes (i.e., the first path) includes two edges 906.

In particular embodiments, an edge 906 between a user node 902 and a concept node 904 may represent a particular action or activity performed by a user associated with user node 902 toward a concept associated with a concept node 904. As an example and not by way of limitation, as illustrated in FIG. 9, a user may "like," "attended," "played," "listened," "cooked," "worked at," or "read" a concept, each of which may correspond to an edge type or subtype. A concept-profile interface corresponding to a concept node 904 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("SongName") using a particular application (a third-party online music application). In this case, the social-networking system 160 may create a "listened" edge 906 and a "used" edge (as illustrated in FIG. 9) between user nodes 902 corresponding to the user and concept nodes 904 corresponding to the song and application to indicate that the user listened to the song and used the application. Moreover, the social-networking system 160 may create a "played" edge 906 (as illustrated in FIG. 9) between concept nodes 904 corresponding to the song and the application to indicate that the particular song was played by the particular application. In this case, "played" edge 906 corresponds to an action performed by an external application (the third-party online music application) on an external audio file (the song "SongName"). Although this disclosure describes particular edges 906 with particular attributes connecting user nodes 902 and concept nodes 904, this disclosure contemplates any suitable edges 906 with any suitable attributes connecting user nodes 902 and concept nodes 904. Moreover, although this disclosure describes edges between a user node 902 and a concept node 904 representing a single relationship, this disclosure contemplates edges between a user node 902 and a concept node 904 representing one or more relationships. As an example and not by way of limitation, an edge 906 may represent both that a user likes and has used at a particular concept. Alternatively, another edge 906 may represent each type of relationship (or multiples of a single relationship) between a user node 902 and a concept node 904 (as illustrated in FIG. 9 between user node 902 for user "E" and concept node 904 for "online music application").

In particular embodiments, the social-networking system 160 may create an edge 906 between a user node 902 and a concept node 904 in the social graph 900. As an example and not by way of limitation, a user viewing a concept-profile interface (such as, for example, by using a web browser or a special-purpose application hosted by the user's client system 130) may indicate that he or she likes the concept represented by the concept node 904 by clicking or selecting a "Like" icon, which may cause the user's client system 130 to send to the social-networking system 160 a message indicating the user's liking of the concept associated with the concept-profile interface. In response to the message, the social-networking system 160 may create an edge 906 between user node 902 associated with the user and concept node 904, as illustrated by "like" edge 906 between the user and concept node 904. In particular embodiments, the social-networking system 160 may store an edge 906 in one or more data stores. In particular embodiments, an edge 906 may be automatically formed by the social-networking system 160 in response to a particular user action. As an example and not by way of limitation, if a first user uploads a picture, reads a book, watches a movie, or listens to a song, an edge 906 may be formed between user node 902 corresponding to the first user and concept nodes 904 corresponding to those concepts. Although this disclosure describes forming particular edges 906 in particular manners, this disclosure contemplates forming any suitable edges 906 in any suitable manner.

Vector Spaces and Embeddings

Figure 10:
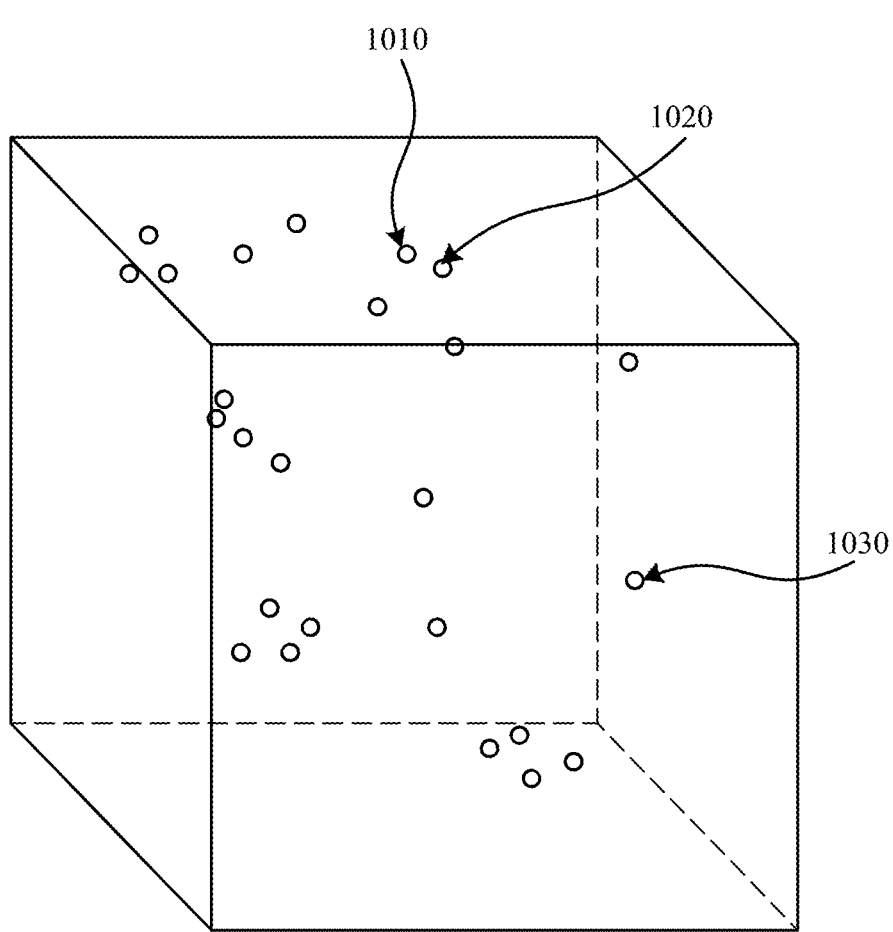
FIG. 10 illustrates an example view of an embedding space.

FIG. 10 illustrates an example view of a vector space 1000. In particular embodiments, an object or an n-gram may be represented in a d-dimensional vector space, where d denotes any suitable number of dimensions. Although the vector space 1000 is illustrated as a three-dimensional space, this is for illustrative purposes only, as the vector space 1000 may be of any suitable dimension. In particular embodiments, an n-gram may be represented in the vector space 1000 as a vector referred to as a term embedding. Each vector may comprise coordinates corresponding to a particular point in the vector space 1000 (i.e., the terminal point of the vector). As an example and not by way of limitation, vectors 1010, 1020, and 1030 may be represented as points in the vector space 1000, as illustrated in FIG. 10. An n-gram may be mapped to a respective vector representation. As an example and not by way of limitation, n-grams $t_1$ and $t_2$ may be mapped to vectors $\vec{v_1}$ and $\vec{v_2}$ in the vector space 1000, respectively, by applying a function $\vec{\pi}$ defined by a dictionary, such that $\vec{v_1} = \vec{\pi}(t_1)$ and $\vec{v_2} = \vec{\pi}(t_2)$. As another example and not by way of limitation, a dictionary trained to map text to a vector representation may be utilized, or such a dictionary may be itself generated via training. As another example and not by way of limitation, a word-embeddings model may be used to map an n-gram to a vector representation in the vector space 1000. In particular embodiments, an n-gram may be mapped to a vector representation in the vector space 1000 by using a machine leaning model (e.g., a neural network). The machine learning model may have been trained using a sequence of training data (e.g., a corpus of objects each comprising n-grams).

In particular embodiments, an object may be represented in the vector space 1000 as a vector referred to as a feature vector or an object embedding. As an example and not by way of limitation, objects $e_1$ and $e_2$ may be mapped to vectors $\vec{v_1}$ and $\vec{v_2}$ in the vector space 1000, respectively, by applying a function $\vec{\pi}$, such that $\vec{v_1} = \vec{\pi}(e_1)$ and $\vec{v_2} = \vec{\pi}(e_2)$. In particular embodiments, an object may be mapped to a vector based on one or more properties, attributes, or features of the object, relationships of the object with other objects, or any other suitable information associated with the object. As an example and not by way of limitation, a function $\vec{\pi}$ may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\vec{\pi}$ may map the object to a vector using a transformed reduced set of features (e.g., feature selection). In particular embodiments, a function $\vec{\pi}$ may map an object e to a vector $\vec{\pi}$ (e) based on one or more n-grams associated with object e. Although this disclosure describes representing an n-gram or an object in a vector space in a particular manner, this disclosure contemplates representing an n-gram or an object in a vector space in any suitable manner.

In particular embodiments, the social-networking system 160 may calculate a similarity metric of vectors in vector space 1000. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\|\|\vec{v_2}\|}.$$

As another example and not by way of limitation, a similarity metric of $\vec{v_1}$ and $\vec{v_2}$ may be a Euclidean distance $\vec{v_1} - \vec{v_2}$ ||. A similarity metric of two vectors may represent how similar the two objects or n-grams corresponding to the two vectors, respectively, are to one another, as measured by the distance between the two vectors in the vector space 1000. As an example and not by way of limitation, vector 1010 and vector 1020 may correspond to objects that are more similar to one another than the objects corresponding to vector 1010 and vector 1030, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Artificial Neural Networks

Figure 11:
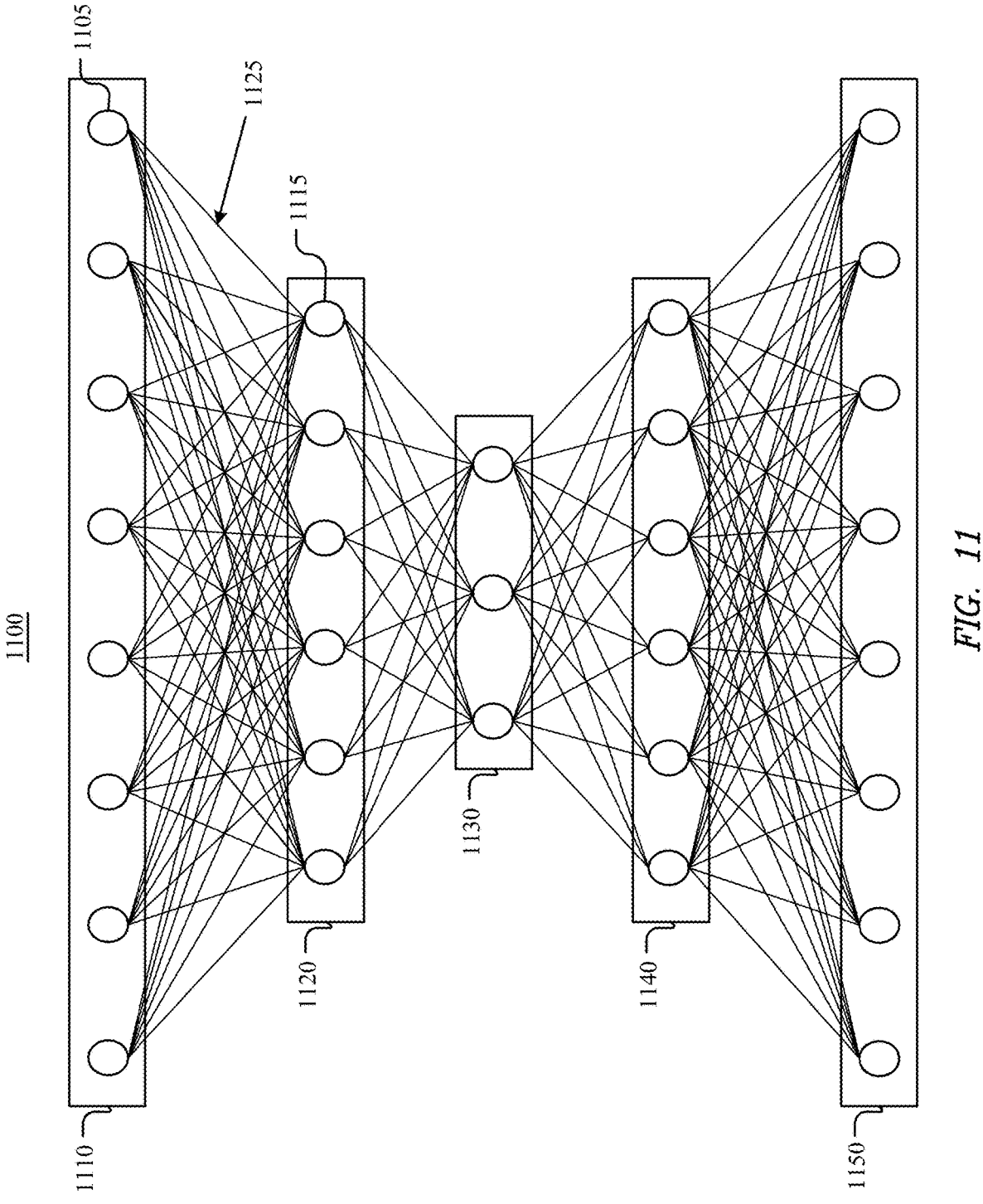
FIG. 11 illustrates an example artificial neural network.

FIG. 11 illustrates an example artificial neural network ("ANN") 1100. In particular embodiments, an ANN may refer to a computational model comprising one or more nodes. Example ANN 1100 may comprise an input layer 1110, hidden layers 1120, 1130, 1140, and an output layer 1150. Each layer of the ANN 1100 may comprise one or more nodes, such as a node 1105 or a node 1115. In particular embodiments, each node of an ANN may be connected to another node of the ANN. As an example and not by way of limitation, each node of the input layer 1110 may be connected to one of more nodes of the hidden layer 1120. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 11 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 11 depicts a connection between each node of the input layer 1110 and each node of the hidden layer 1120, one or more nodes of the input layer 1110 may not be connected to one or more nodes of the hidden layer 1120.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 1120 may comprise the output of one or more nodes of the input layer 1110. As another example and not by way of limitation, the input to each node of the output layer 1150 may comprise the output of one or more nodes of the hidden layer 1140. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1+e^{-s_k}},$$

the hyperbolic tangent function $$F_k(s_k) = \frac{e^{s_k} - e^{-s_k}}{e^{s_k} + e^{-s_k}},$$

the rectifier $F_k(s_k)=\max(0,s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 1125 between the node 1105 and the node 1115 may have a weighting coefficient of 0.4, which may indicate that 0.4 multiplied by the output of the node 1105 is used as an input to the node 1115. As another example and not by way of limitation, the output $y_k$ of node k may be $y_k=F_k(s_k)$, where $F_k$ may be the activation function corresponding to node k, $s_k=\Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 1100 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Privacy

In particular embodiments, one or more objects (e.g., content or other types of objects) of a computing system may be associated with one or more privacy settings. The one or more objects may be stored on or otherwise associated with any suitable computing system or application, such as, for example, a social-networking system 160, a client system 130, an assistant system 140, a third-party system 170, a social-networking application, an assistant application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 904 corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 160 or assistant system 140 or shared with other systems (e.g., a third-party system 170). Although this disclosure describes using particular privacy settings in a particular manner, this disclosure contemplates using any suitable privacy settings in any suitable manner.

In particular embodiments, privacy settings may be based on one or more nodes or edges of a social graph 900. A privacy setting may be specified for one or more edges 906 or edge-types of the social graph 900, or with respect to one or more nodes 902, 904 or node-types of the social graph 900. The privacy settings applied to a particular edge 906 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 160. The object may be associated with a concept node 904 connected to a user node 902 of the first user by an edge 906. The first user may specify privacy settings that apply to a particular edge 906 connecting to the concept node 904 of the object, or may specify privacy settings that apply to all edges 906 connecting to the concept node 904. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system 160 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 160 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 160, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 160 or assistant system 140 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 160 or assistant system 140 may access such information in order to provide a particular function or service to the first user, without the social-networking system 160 or assistant system 140 having access to that information for any other purposes. Before accessing, storing, or using such objects or information, the social-networking system 160 or assistant system 140 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 160 or assistant system 140.

In particular embodiments, a user may specify whether particular types of objects or information associated with the first user may be accessed, stored, or used by the social-networking system 160 or assistant system 140. As an example and not by way of limitation, the first user may specify that images sent by the first user through the social-networking system 160 or assistant system 140 may not be stored by the social-networking system 160 or assistant system 140. As another example and not by way of limitation, a first user may specify that messages sent from the first user to a particular second user may not be stored by the social-networking system 160 or assistant system 140. As yet another example and not by way of limitation, a first user may specify that all objects sent via a particular application may be saved by the social-networking system 160 or assistant system 140.

In particular embodiments, privacy settings may allow a first user to specify whether particular objects or information associated with the first user may be accessed from particular client systems 130 or third-party systems 170. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 160 or assistant system 140 may provide default privacy settings with respect to each device, system, or application, and/or the first user may be prompted to specify a particular privacy setting for each context. As an example and not by way of limitation, the first user may utilize a location-services feature of the social-networking system 160 or assistant system 140 to provide recommendations for restaurants or other places in proximity to the user. The first user's default privacy settings may specify that the social-networking system 160 or assistant system 140 may use location information provided from a client device 130 of the first user to provide the location-based services, but that the social-networking system 160 or assistant system 140 may not store the location information of the first user or provide it to any third-party system 170. The first user may then update the privacy settings to allow location information to be used by a third-party image-sharing application in order to geo-tag photos.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular embodiments, the social-networking system 160 or assistant system 140 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the social-networking system 160 or assistant system 140. The user's privacy settings may specify that such information may be used only for particular processes, such as authentication, and further specify that such information may not be shared with any third-party system 170 or used for other processes or applications associated with the social-networking system 160 or assistant system 140. As another example and not by way of limitation, the social-networking system 160 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system 170 or used by other processes or applications associated with the social-networking system 160. As another example and not by way of limitation, the social-networking system 160 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such image may be used only for a limited purpose (e.g., authentication, tagging the user in photos), and further specify that such image may not be shared with any third-party system 170 or used by other processes or applications associated with the social-networking system 160.

Systems and Methods

Figure 12:
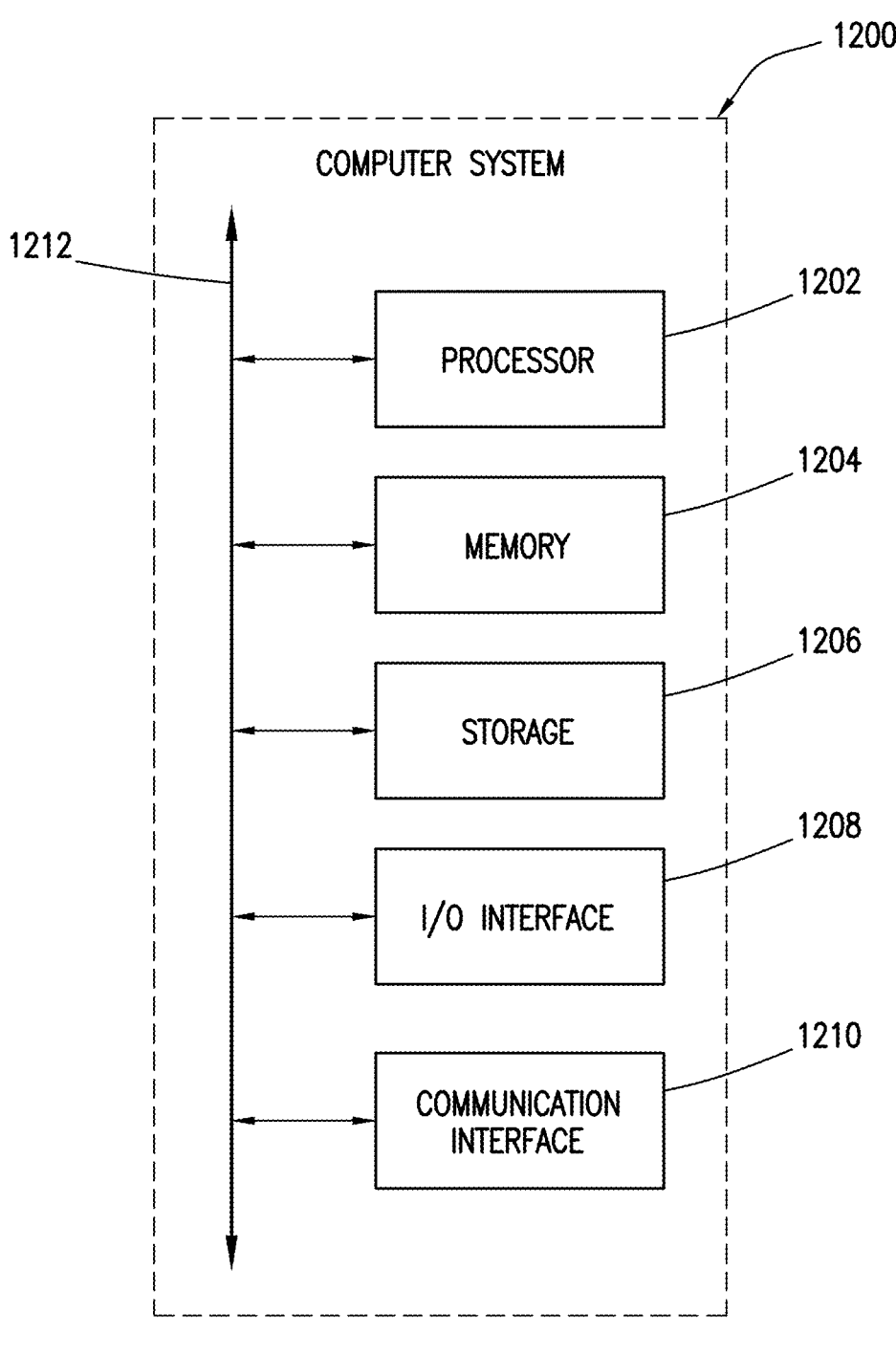
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

MISCELLANEOUS

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:

receiving, at a head-wearable device, a first voice input from a user, the first voice input having one or more first audio features;

determining a first voice input emotion of the first voice input based on the one or more first audio features;

generating a first text response corresponding to the first voice input;

in accordance with a determination, based on the first voice input emotion, that the one or more first audio features are appropriate for responding to the user, generating, by a text-to-speech model on the head-wearable device, a first output audio waveform of the first text response, wherein the first output audio waveform has the one or more first audio features;

in response to the first voice input, presenting, at the head-wearable device, the first output audio waveform;

receiving, at the head-wearable device, a second voice input from the user, the second voice input having one or more second audio features distinct from the first audio features;

determining a background noise level;

determining a second voice input emotion, distinct from the first voice input emotion, of the second voice input based on the one or more second audio features and the background noise level;

generating a second text response corresponding to the second voice input;

in accordance with a determination that the backgrounds noise level does not exceed a background noise threshold and a determination, based on the second voice input emotion, that the one or more second audio features are not appropriate for responding to the user;

generating, by the text-to-speech model on the head-wearable device, a second output audio waveform of the second text response, wherein the second output audio waveform has one or more other audio features, distinct from the one or more second audio features; and in response to the second voice input, presenting, at the head-wearable device, the second output audio waveform;

receiving, at the head-wearable device, a third voice input from the user, the third voice input having the one or more second audio features distinct from the first audio features;

determining a second background noise level;

determining the second voice input emotion based on the one or more second audio features and the second background noise level;

generating a third text response corresponding to the third voice input;

in accordance with a determination that the second background noise level exceeds the background noise threshold and a determination, based on the second voice input emotion, that the one or more second audio features are appropriate for responding to the user;

generating, by the text-to-speech model on the head-wearable device, a third output audio waveform of the third text response, wherein the third output audio waveform has the one or more second audio features; and in response to the third voice input, presenting, at the head-wearable device, the third output audio waveform.

2. The method of claim 1, wherein:

the one or more first audio features include one or more of a first tone, a first speed, a first volume, a first emphasis, a first pronunciation, a first accent, a first frequency, and a first prosody;

the one or more second audio features include one or more of a second tone, a second speed, a second volume, a second emphasis, a second pronunciation, a second accent, a second frequency, and a second prosody; and the one or more other audio features include one or more of another tone, another speed, another volume, another emphasis, another pronunciation, another accent, another frequency, and another prosody.

3. The method of claim 1, further comprising:

before generating the second output audio waveform of the second text response, determining the one or more other audio features based on at least the second voice input emotion and the second voice input.

4. The method of claim 3, wherein the one or more other audio features are further based on one or more of:

environmental features associated with the user;

a time of receipt associated with the second voice input; and one or more user settings associated with the user.

5. The method of claim 3, wherein the determining the first voice input emotion, the determining the second voice input emotion, and the determining the one or more other audio features are performed by a machine-learning model.

6. The method of claim 1, wherein determining the one or more other audio features based on at least the second voice input emotion and the second voice input is in accordance with the determination, based on the second voice input emotion, that the one or more other audio features are more appropriate than the one or more second audio features for responding to the user.

7. The method of claim 1, wherein:

the determination that the one or more first audio features are appropriate for responding to the user includes a determination that the first voice input emotion is one of a positive emotion and a neutral emotion; and the determination that the one or more second audio features are not appropriate for responding to the user includes a determination that the second voice input emotion is a negative emotion; and the determination that the one or more second audio features are appropriate for responding to the user includes a determination that the second voice input emotion is the negative emotion.

8. The method of claim 1, the method further comprising:

after receiving the first voice input, automatically transcribing the first voice input into a first input text, wherein generating the first text response corresponding to the first voice input is further based on the first input text;

after receiving the second voice input, automatically transcribing the second voice input into a second input text, wherein generating the second text response corresponding to the second voice input is further based on the second input text; and after receiving the third voice input, automatically transcribing the third voice input into a third input text, wherein generating the third text response corresponding to the third voice input is further based on the third input text.

9. The method of claim 1, wherein the text-to-speech model is based on a prosody model and an acoustic model.

10. The method of claim 9, wherein the prosody model determines:

a first duration and a first frequency of the first output audio waveform;

a second duration and a second frequency of the second output audio waveform; and a third duration and a third frequency of the third output audio waveform.

11. The method of claim 10, wherein generating the second output audio waveform of the second text response comprises:

accessing, by the prosody model, a style embedding corresponding to the one or more other audio features; and setting one or more of the second duration and the second frequency of the second output audio waveform based on the style embedding to generate response prosody features of the second output audio waveform.

12. The method of claim 1, wherein:

the head-wearable device includes one or more speakers;

presenting the first output audio waveform includes playing the first output audio waveform at the one or more speakers;

presenting the second output audio waveform includes playing the second output audio waveform at the one or more speakers; and presenting the third output audio waveform includes playing the third output audio waveform at the one or more speakers.

13. A system comprising one or more processors and a memory coupled to the one or more processors, the memory including executable instructions that, when executed by the one or more processors, cause the one or more processors to:

receive a first voice input from a user of a head-wearable device, the first voice input having one or more first audio features;

determine a first voice input emotion of the first voice input based on the one or more first audio features;

generate a first text response corresponding to the first voice input;

in accordance with a determination, based on the first voice input emotion, that the one or more first audio features are appropriate for responding to the user of the head-wearable device, generate, by a text-to-speech model, a first output audio waveform of the first text response, wherein the first output audio waveform has the one or more first audio features;

in response to the first voice input, cause the first output audio waveform to be presented to the user of the head-wearable device;

receive a second voice input from the user of the head-wearable device, the second voice input having one or more second audio features distinct from the first audio features;

determine a background noise level;

determine a second voice input emotion, distinct from the first voice input emotion, of the second voice input based on the one or more second audio features and the background noise level;

generate a second text response corresponding to the second voice input;

in accordance with a determination that the background noise level does not exceed a background noise threshold and a determination, based on the second voice input emotion, that the one or more second audio features are not appropriate for responding to the user of the head-wearable device:

generate, by the text-to-speech model, a second output audio waveform of the second text response, wherein the second output audio waveform has one or more other audio features, distinct from the one or more second audio features; and in response to the second voice input, cause the second output audio waveform to be presented to the user of the head-wearable device:

receive a third voice input from the user of the head-wearable device, the third voice input having the one or more second audio features distinct from the first audio features;

determine a second background noise level;

determine the second voice input emotion based on the one or more second audio features and the second background noise level;

generate a third text response corresponding to the third voice input;

in accordance with a determination that the second background noise level exceeds the background noise threshold and a determination, based on the second voice input emotion, that the one or more second audio features are appropriate for responding to the user of the head-wearable device:

generate, by the text-to-speech model, a third output audio waveform of the third text response, wherein the third output audio waveform has the one or more second audio features; and in response to the third voice input, cause the third output audio waveform to be presented to the user of the head-wearable device.

14. The system of claim 13, wherein:

the one or more first audio features include one or more of a first tone, a first speed, a first volume, a first emphasis, a first pronunciation, a first accent, a first frequency, and a first prosody;

the one or more second audio features include one or more of a second tone, a second speed, a second volume, a second emphasis, a second pronunciation, a second accent, a second frequency, and a second prosody; and the one or more other audio features include one or more of another tone, another speed, another volume, another emphasis, another pronunciation, another accent, another frequency, and another prosody.

15. The system of claim 13, wherein the executable instructions further cause the one or more processors to:

before generating the second output audio waveform of the second text response, determine the one or more other audio features based on at least the second voice input emotion and the second voice input.

16. The system of claim 13, wherein:

the determination that the one or more first audio features are appropriate for responding to the user includes a determination that the first voice input emotion is one of a positive emotion and a neutral emotion;

the determination that the one or more second audio features are not appropriate for responding to the user includes a determination that the second voice input emotion is a negative emotion; and the determination that the one or more second audio features are appropriate for responding to the user includes a determination that the second voice input emotion is the negative emotion.

17. A computer-readable non-transitory storage medium including executable instructions that, when executed by one or more processors, cause the one or more processors to:

receive a first voice input from a user of a head-wearable device, the first voice input having one or more first audio features;

determine a first voice input emotion of the first voice input based on the one or more first audio features;

generate a first text response corresponding to the first voice input;

in accordance with a determination, based on the first voice input emotion, that the one or more first audio features are appropriate for responding to the user of the head-wearable device, generate, by a text-to-speech model, a first output audio waveform of the first text response, wherein the first output audio waveform has the one or more first audio features;

in response to the first voice input, cause the first output audio waveform to be presented to the user of the head-wearable device;

receive a second voice input from the user of the head-wearable device, the second voice input having one or more second audio features distinct from the first audio features;

determine a background noise level;

determine a second voice input emotion, distinct from the first voice input emotion, of the second voice input based on the one or more second audio features and the background noise level;

generate a second text response corresponding to the second voice input;

in accordance with a determination that the background noise level does not exceed a background noise threshold and a determination, based on the second voice input emotion, that the one or more second audio features are not appropriate for responding to the user of the head-wearable device;

generate, by the text-to-speech model, a second output audio waveform of the second text response, wherein the second output audio waveform has one or more other audio features, distinct from the one or more second audio features; and in response to the second voice input, cause the second output audio waveform to be presented to the user of the head-wearable device;

receive a third voice input from the user of the head-wearable device, the third voice input having the one or more second audio features distinct from the first audio features;

determine a second background noise level;

determine the second voice input emotion based on the one or more second audio features and the second background noise level;

generate a third text response corresponding to the third voice input;

in accordance with a determination that the second background noise level exceeds the background noise threshold and a determination, based on the second voice input emotion, that the one or more second audio features are appropriate for responding to the user of the head-wearable device:

generate, by the text-to-speech model, a third output audio waveform of the third text response, wherein the third output audio waveform has the one or more second audio features; and in response to the third voice input, cause the third output audio waveform to be presented to the user of the head-wearable device.

18. The computer-readable non-transitory storage medium of claim 17, wherein:

the one or more first audio features include one or more of a first tone, a first speed, a first volume, a first emphasis, a first pronunciation, a first accent, a first frequency, and a first prosody;

the one or more second audio features include one or more of a second tone, a second speed, a second volume, a second emphasis, a second pronunciation, a second accent, a second frequency, and a second prosody; and the one or more other audio features include one or more of another tone, another speed, another volume, another emphasis, another pronunciation, another accent, another frequency, and another prosody.

19. The computer-readable non-transitory storage medium of claim 17, wherein the executable instructions further cause the one or more processors to:

before generating the second output audio waveform of the second text response, determine the one or more other audio features based on at least the second voice input emotion and the second voice input.

20. The computer-readable non-transitory storage medium of claim 17, wherein:

the determination that the one or more first audio features are appropriate for responding to the user includes a determination that the first voice input emotion is one of a positive emotion and a neutral emotion;

the determination that the one or more second audio features are not appropriate for responding to the user includes a determination that the second voice input emotion is a negative emotion; and the determination that the one or more second audio features are appropriate for responding to the user includes a determination that the second voice input emotion is the negative emotion.

* * * * *